US011044348B1

(12) United States Patent
Cannon-Brookes et al.

(10) Patent No.: US 11,044,348 B1
(45) Date of Patent: Jun. 22, 2021

(54) SYSTEM, METHOD, AND COMPUTER PROGRAM PRODUCT FOR IMPROVED EMBEDDED APPLICATION DATA MANAGEMENT

(71) Applicants: ATLASSIAN PTY LTD, Sydney (AU); ATLASSIAN, INC., San Francisco, CA (US)

(72) Inventors: Michael Cannon-Brookes, Sydney (AU); Ali Dasdan, Mountain View, CA (US); Pratima Arora, Mountain View, CA (US); Steven Brooks, Mountain View, CA (US); Jason Phan, Mountain View, CA (US); Aaron Gentleman, Mountain View, CA (US); Renato Galindo, Mountain View, CA (US); Lennon Liao, Mountain View, CA (US); Lisa Panda, Mountain View, CA (US); Ryan-Vincent Alvarez, Mountain View, CA (US)

(73) Assignees: Atlassian Pty Ltd, Sydney (AU); Atlassian, Inc., San Francisco, CA (US)

( * ) Notice: Subject to any disclaimer, the term of this patent is extended or adjusted under 35 U.S.C. 154(b) by 0 days.

(21) Appl. No.: 17/090,648

(22) Filed: Nov. 5, 2020

(51) Int. Cl.
*H04L 12/50* (2006.01)
*H04L 29/06* (2006.01)
*H04L 29/08* (2006.01)

(52) U.S. Cl.
CPC .......... *H04L 69/08* (2013.01); *H04L 67/2804* (2013.01); *H04L 67/2823* (2013.01); *H04L 69/329* (2013.01)

(58) Field of Classification Search
None
See application file for complete search history.

(56) References Cited

U.S. PATENT DOCUMENTS

| | | | |
|---|---|---|---|
| 8,700,719 B1* | 4/2014 | Covitz | G06Q 10/107 709/206 |
| 10,891,535 B1* | 1/2021 | Mancuso | H04L 9/30 |
| 2002/0049834 A1* | 4/2002 | Molnar | H04L 67/06 709/219 |
| 2009/0240698 A1* | 9/2009 | Shukla | G06F 16/20 |
| 2014/0337865 A1* | 11/2014 | Doughty | G06F 8/30 719/328 |
| 2016/0019195 A1* | 1/2016 | Sultanik | G06F 16/958 715/202 |
| 2017/0353468 A1* | 12/2017 | Petys | H04W 12/08 |
| 2018/0067811 A1* | 3/2018 | Mowatt | G06F 11/142 |

(Continued)

*Primary Examiner* — Gerald A Smarth
(74) *Attorney, Agent, or Firm* — Alston & Bird LLP

(57) ABSTRACT

Embodiments of the present disclosure provide for improved interoperable data management between a user-accessed software application and an embedded software application. In some contexts, a user-accessed application provides both its own functionality as well as enabling access to functionality of an embedded application. The embedded application is accessed via a data-driven connection that provides several technical advantages and addresses various data interoperability and persistence problems. In some embodiments, a user-accessed application may be configured to provide functionality of multiple embedded applications consistent with the innovations herein described.

20 Claims, 16 Drawing Sheets

(56) References Cited

U.S. PATENT DOCUMENTS

| | | | | |
|---|---|---|---|---|
| 2018/0189478 A1* | 7/2018 | Richardson | ............. | G06F 21/50 |
| 2018/0267847 A1* | 9/2018 | Smith | ..................... | G06F 9/547 |
| 2018/0365201 A1* | 12/2018 | Hunn | ..................... | G06Q 10/10 |
| 2020/0153711 A1* | 5/2020 | Chauhan | ................. | G06N 20/00 |
| 2020/0364277 A1* | 11/2020 | Wang | ................. | G06F 16/9536 |

* cited by examiner

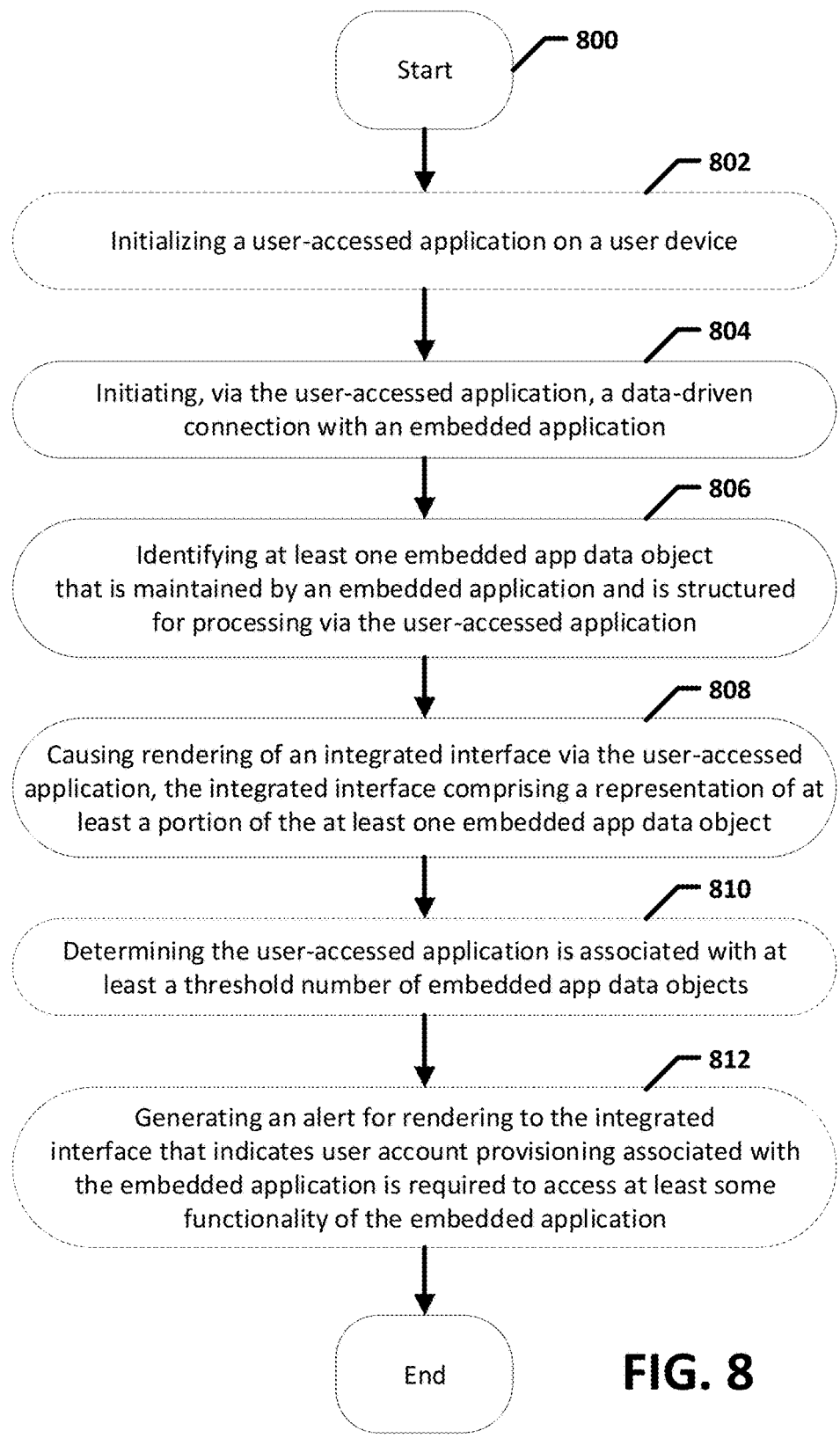

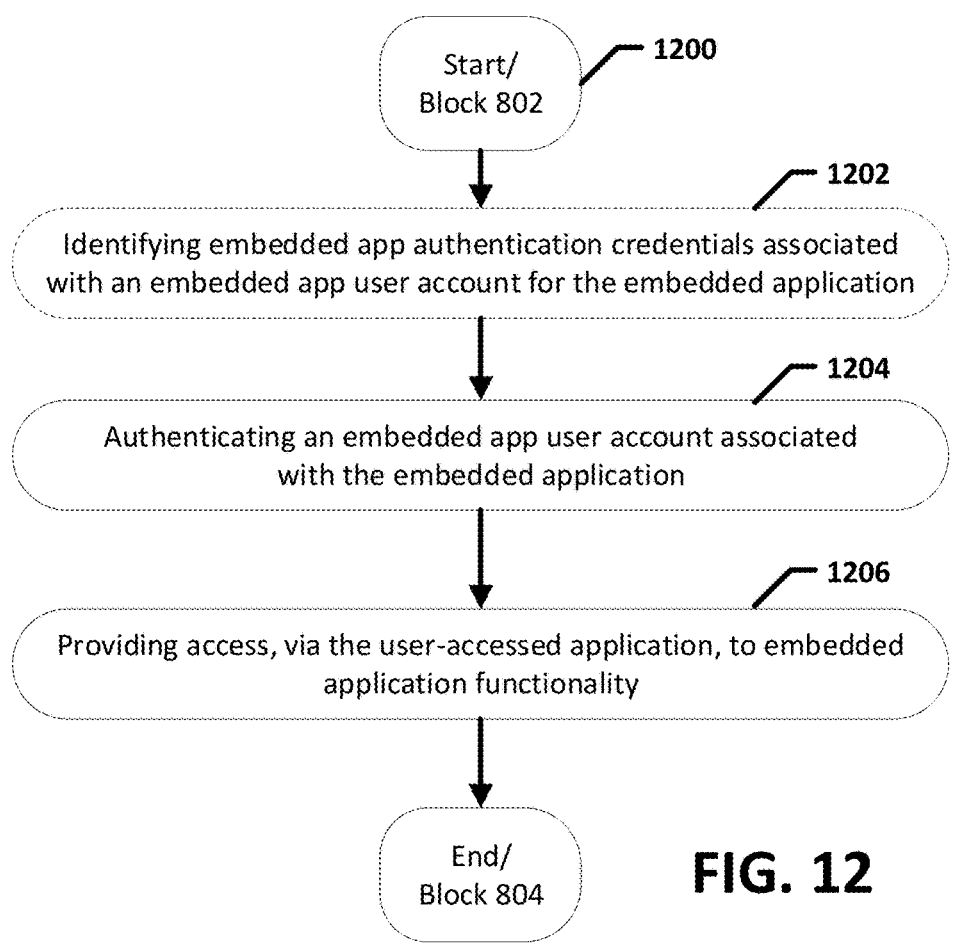

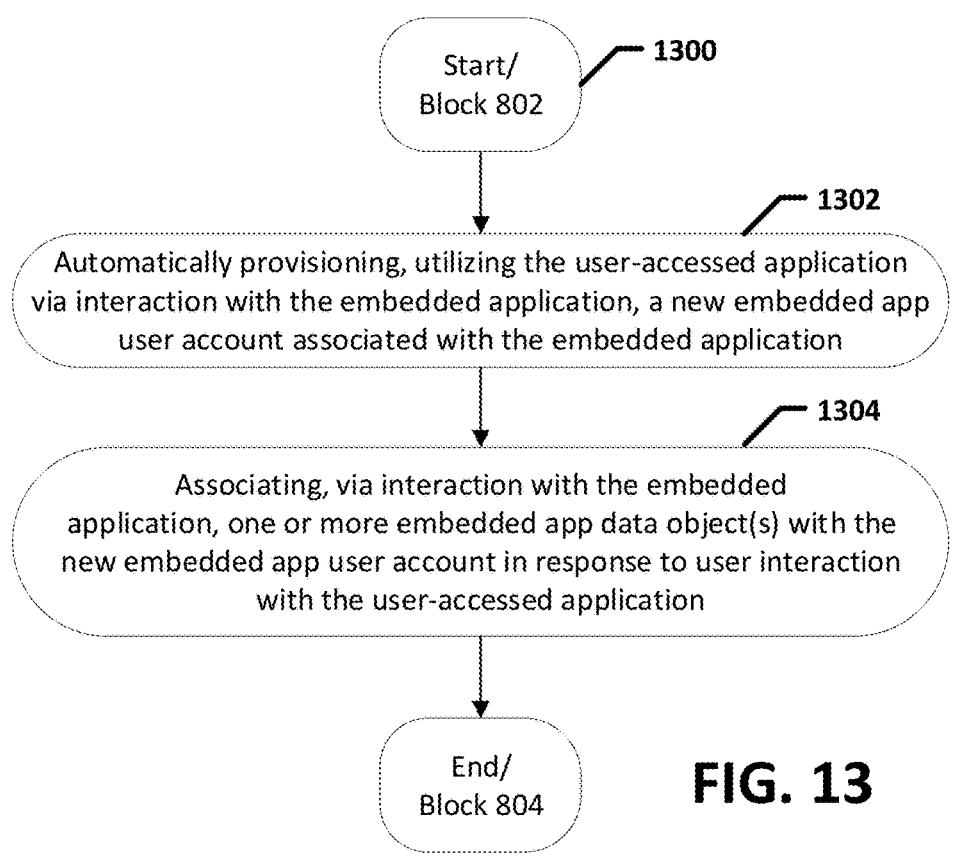

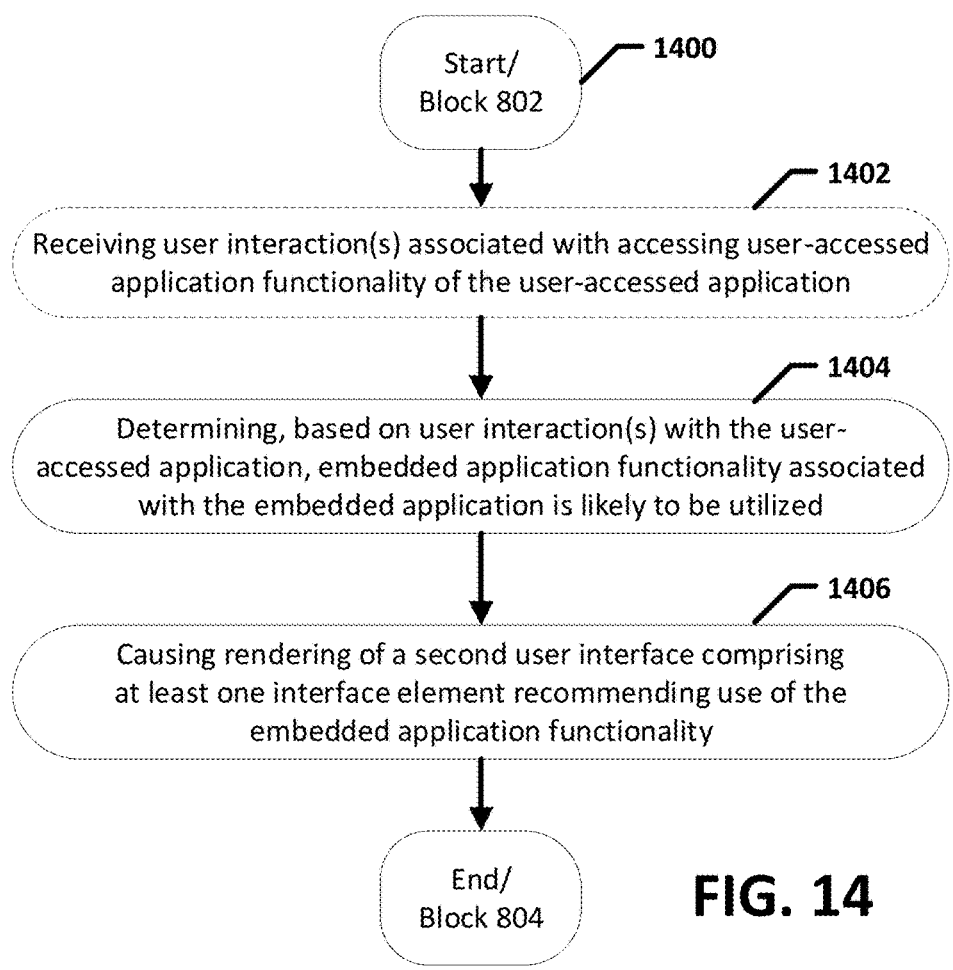

SYSTEM, METHOD, AND COMPUTER PROGRAM PRODUCT FOR IMPROVED EMBEDDED APPLICATION DATA MANAGEMENT

TECHNOLOGICAL FIELD

Embodiments of the present disclosure generally relate to an improved framework for supporting data interoperability between software applications, and specifically to enabling access to and/or manipulation of data associated with an embedded application via a user-accessed application.

BACKGROUND

Discrete software applications are generally designed to enable specific features and functionality without regard to robust principles of data interoperability. Accordingly, discrete software applications are often designed to create and maintain dedicated data repositories that are configured to be populated and updated via specifically designed protocols. Applicant has discovered various technical problems associated with conventional "siloing" of software applications. Through applied effort, ingenuity, and innovation, Applicant has solved many of these identified problems by developing the embodiments of the present disclosure, which are described in detail below.

BRIEF SUMMARY

The appended claims serve as a summary of the disclosure.

BRIEF DESCRIPTION OF THE DRAWINGS

Figure 1:
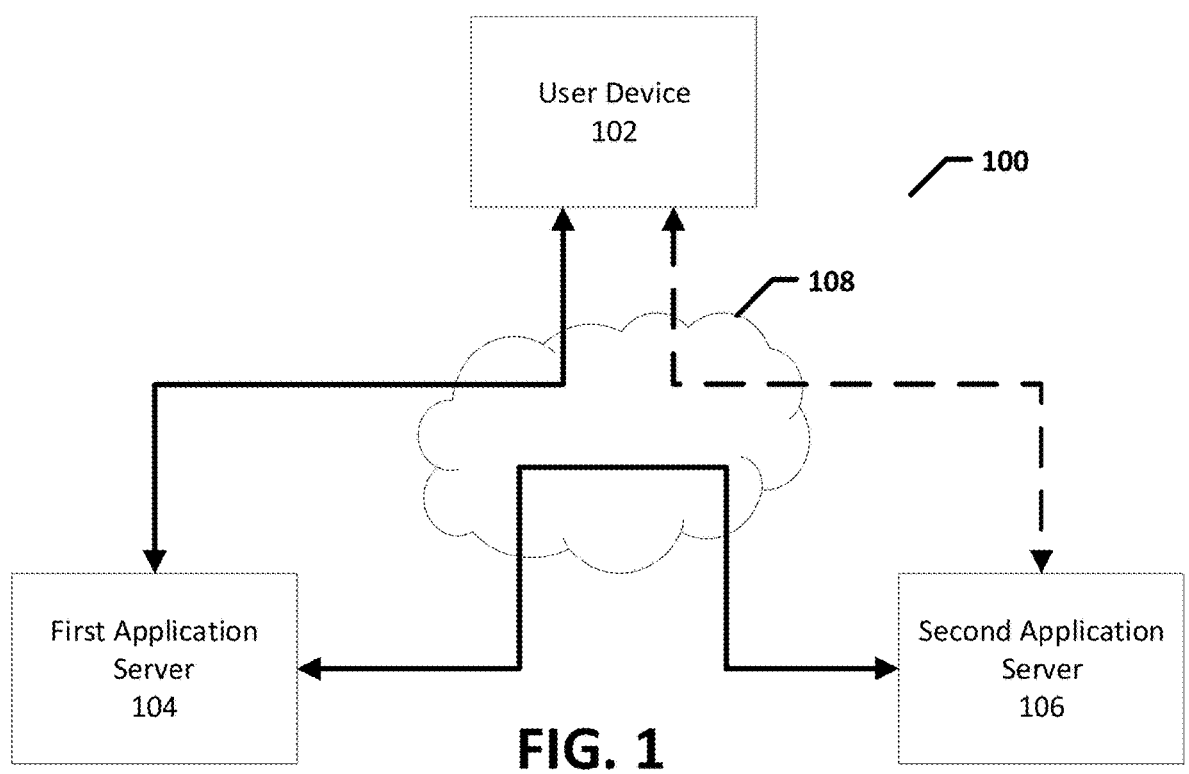
Figure 2A:
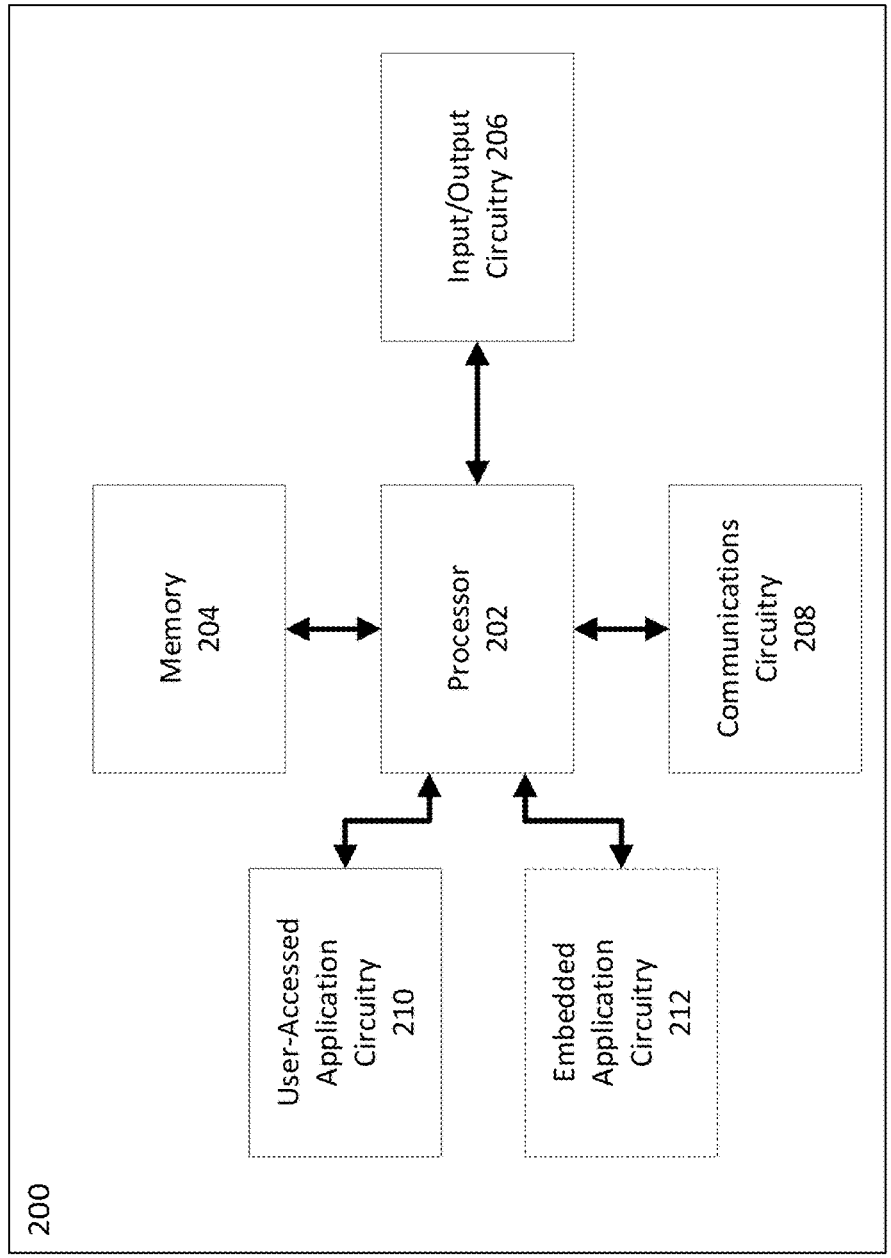
Figure 2B:
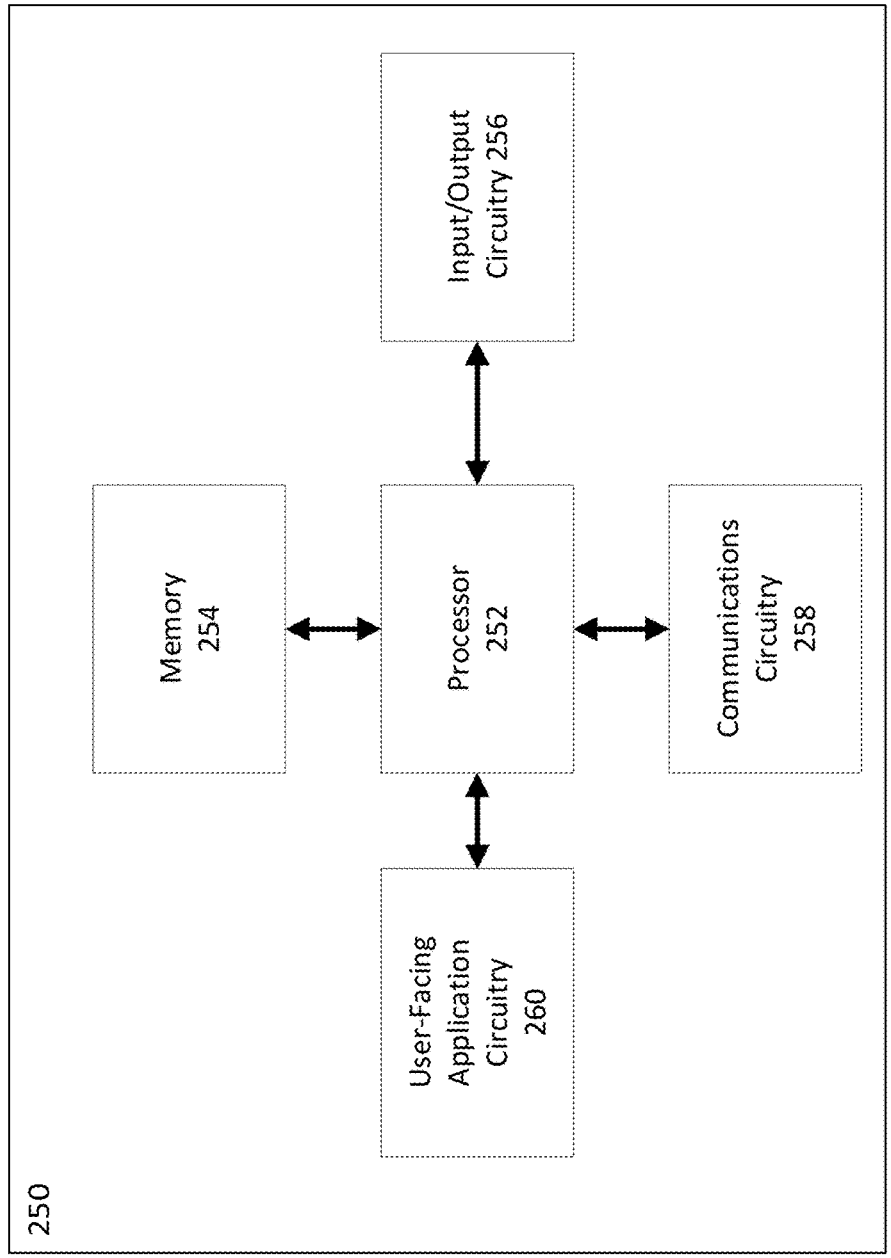
Figure 3:
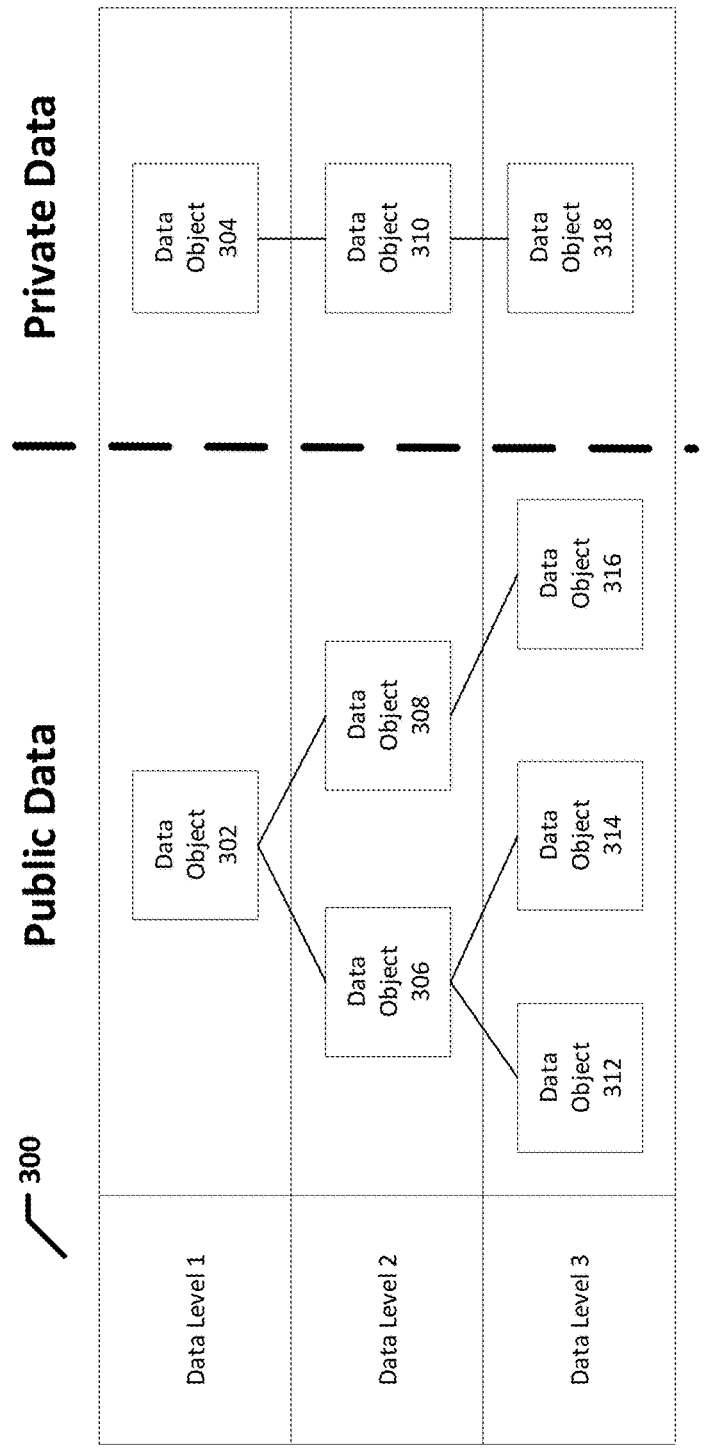
Figure 4:
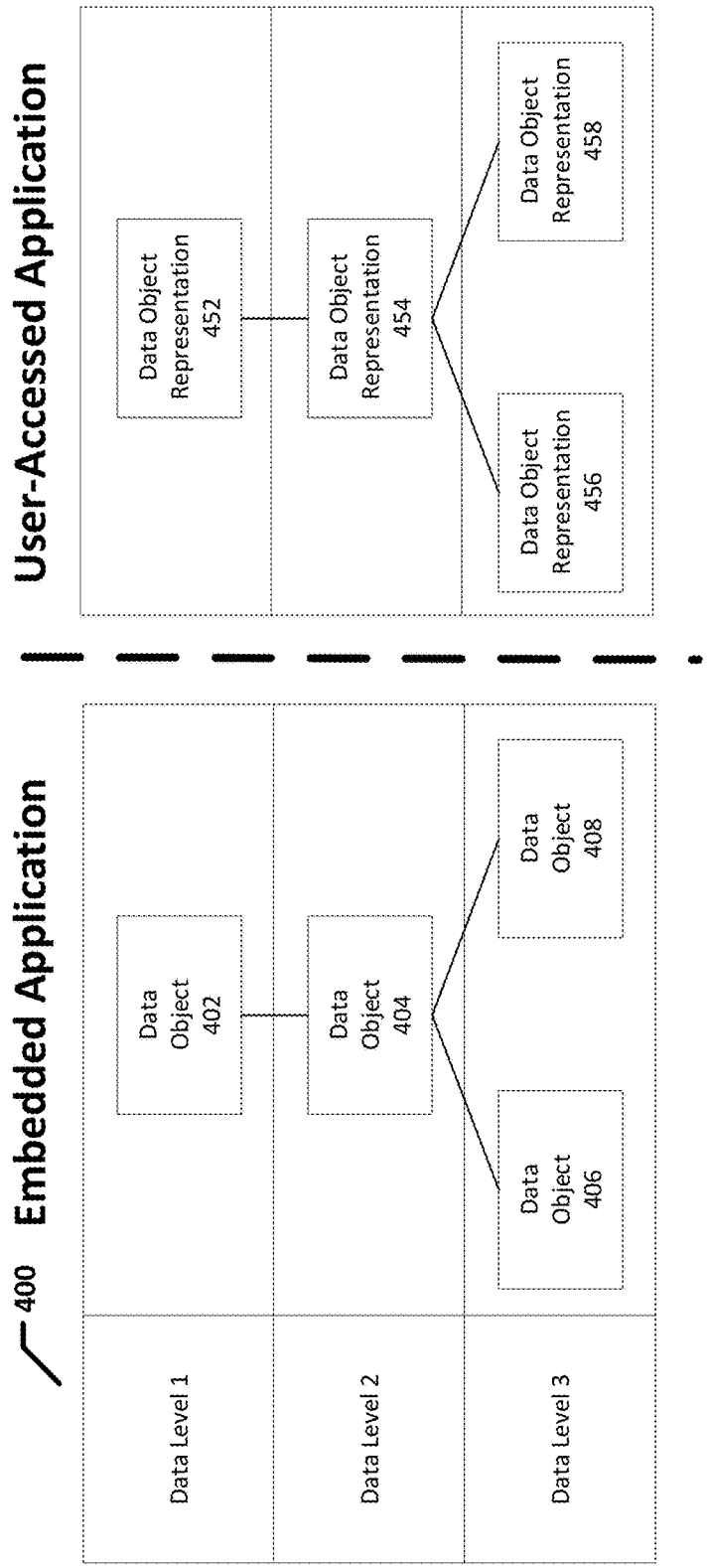
Figure 5:
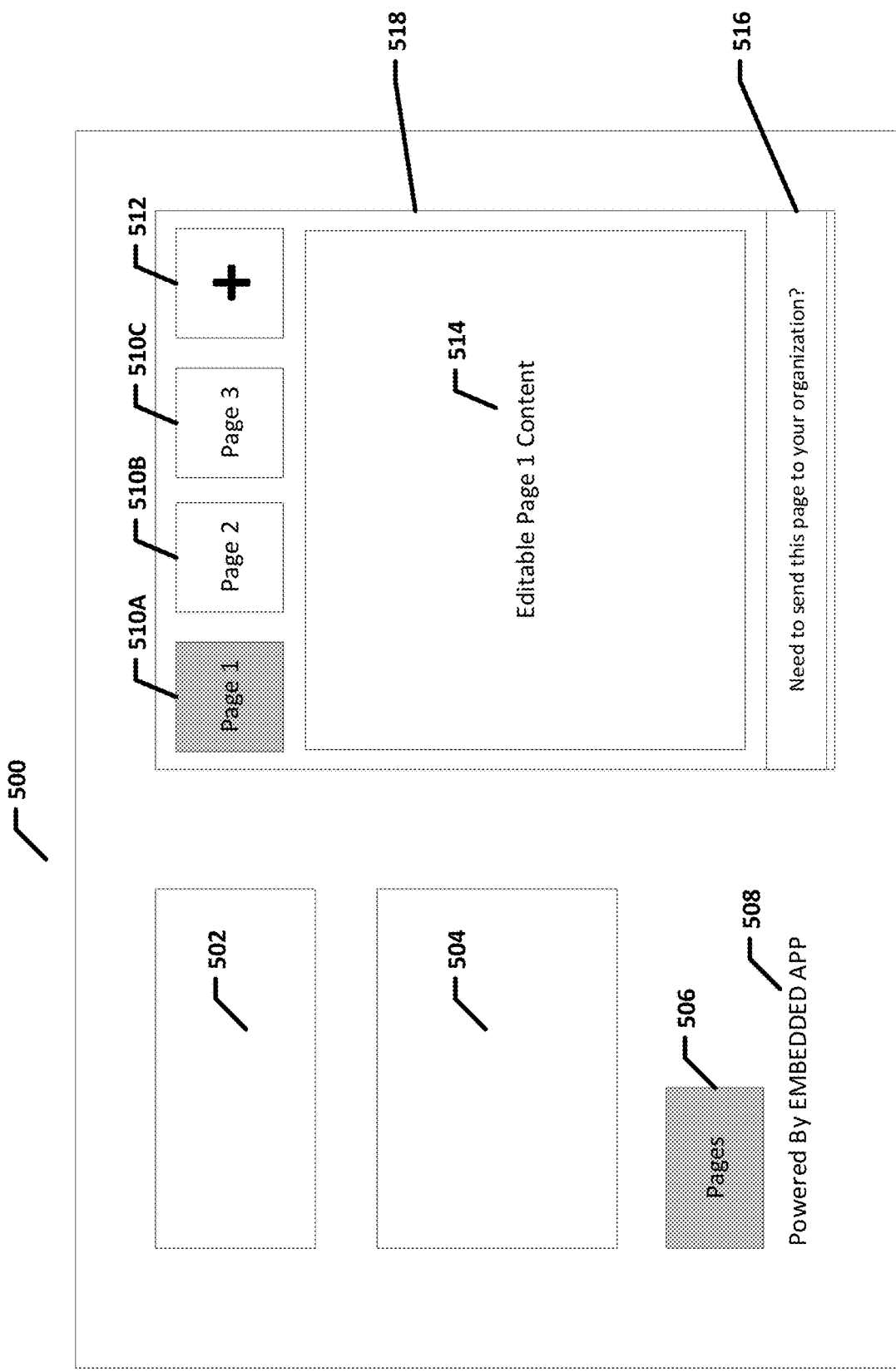
Figure 6:
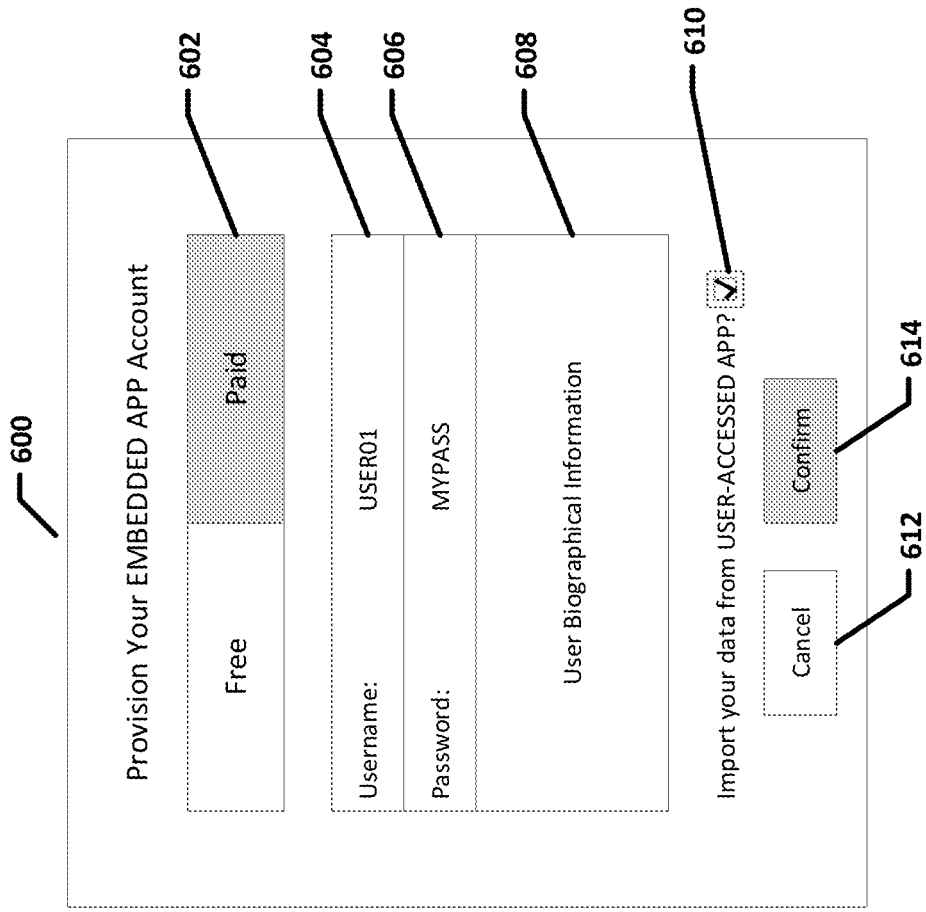
Figure 7A:
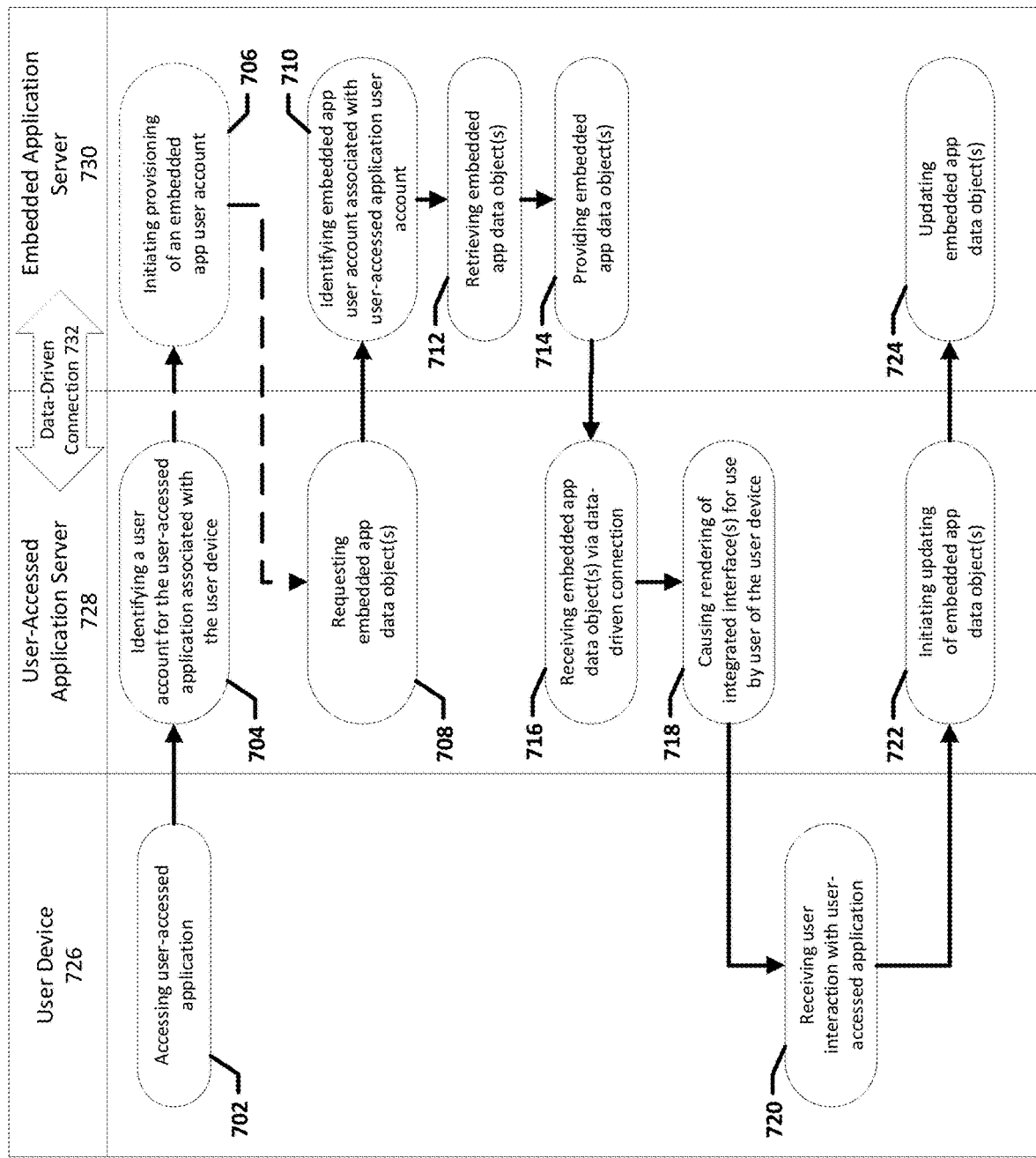
Figure 7B:
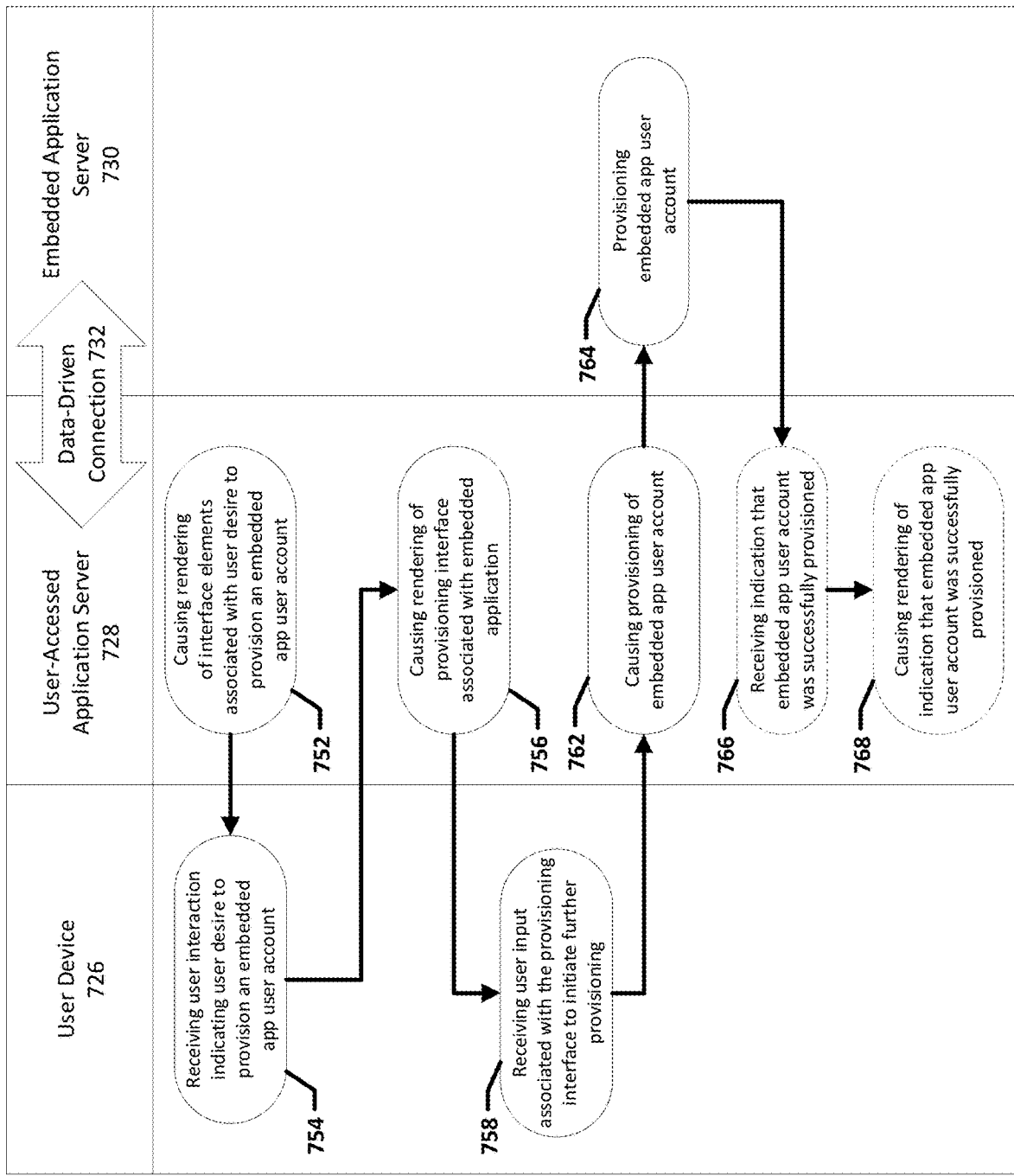
Figure 9:
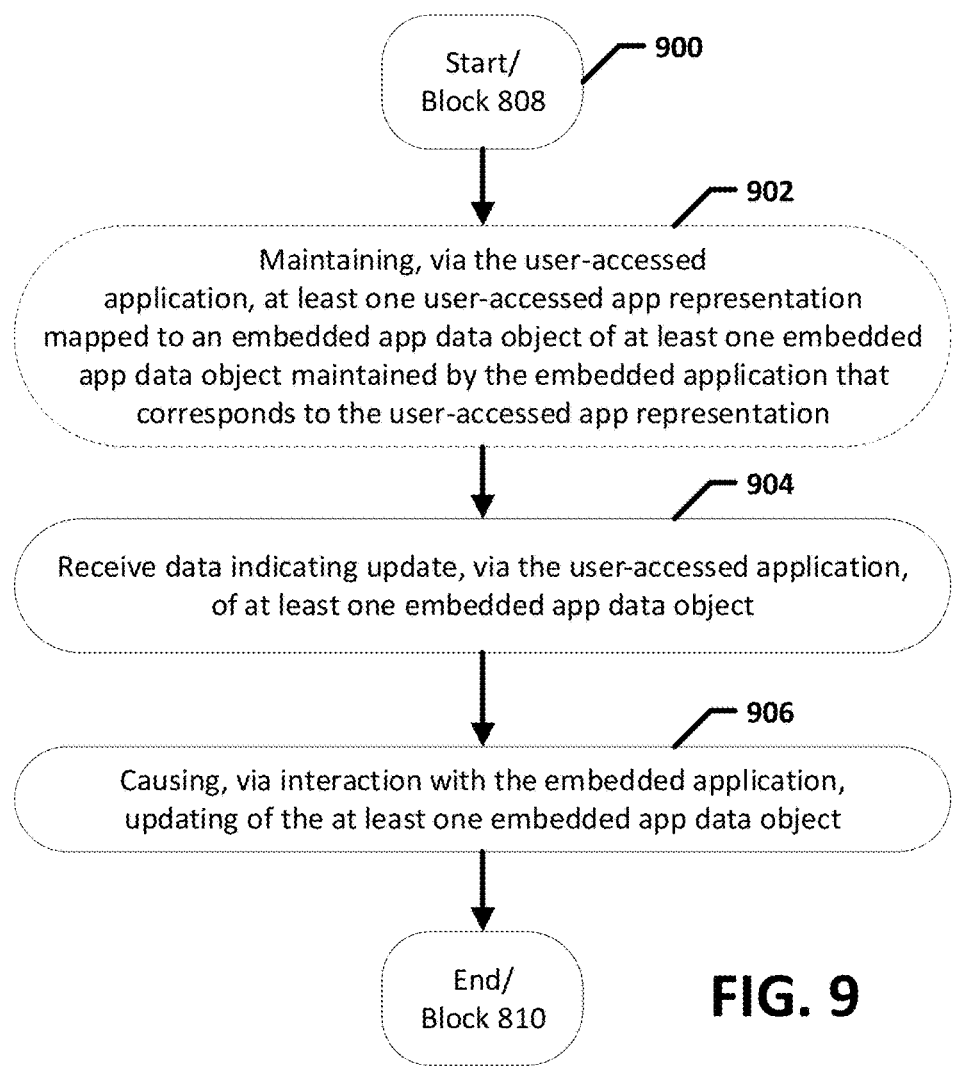
Figure 10:
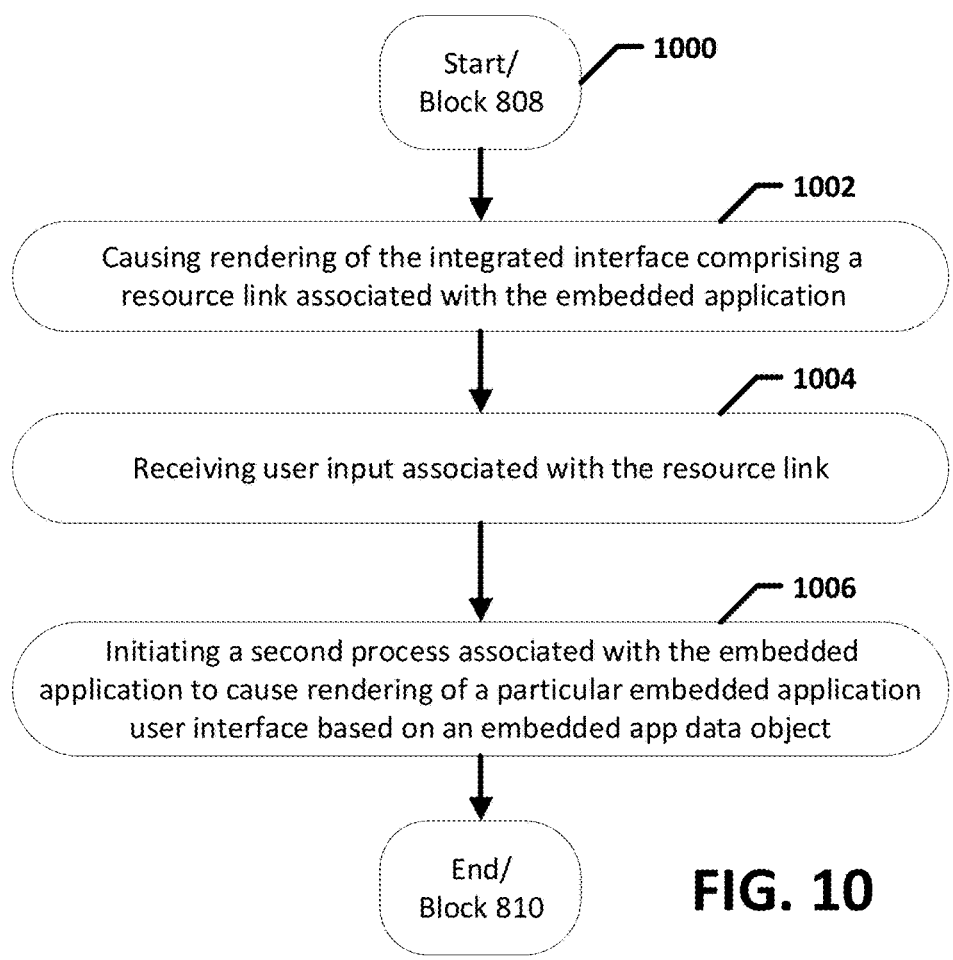
Figure 11:
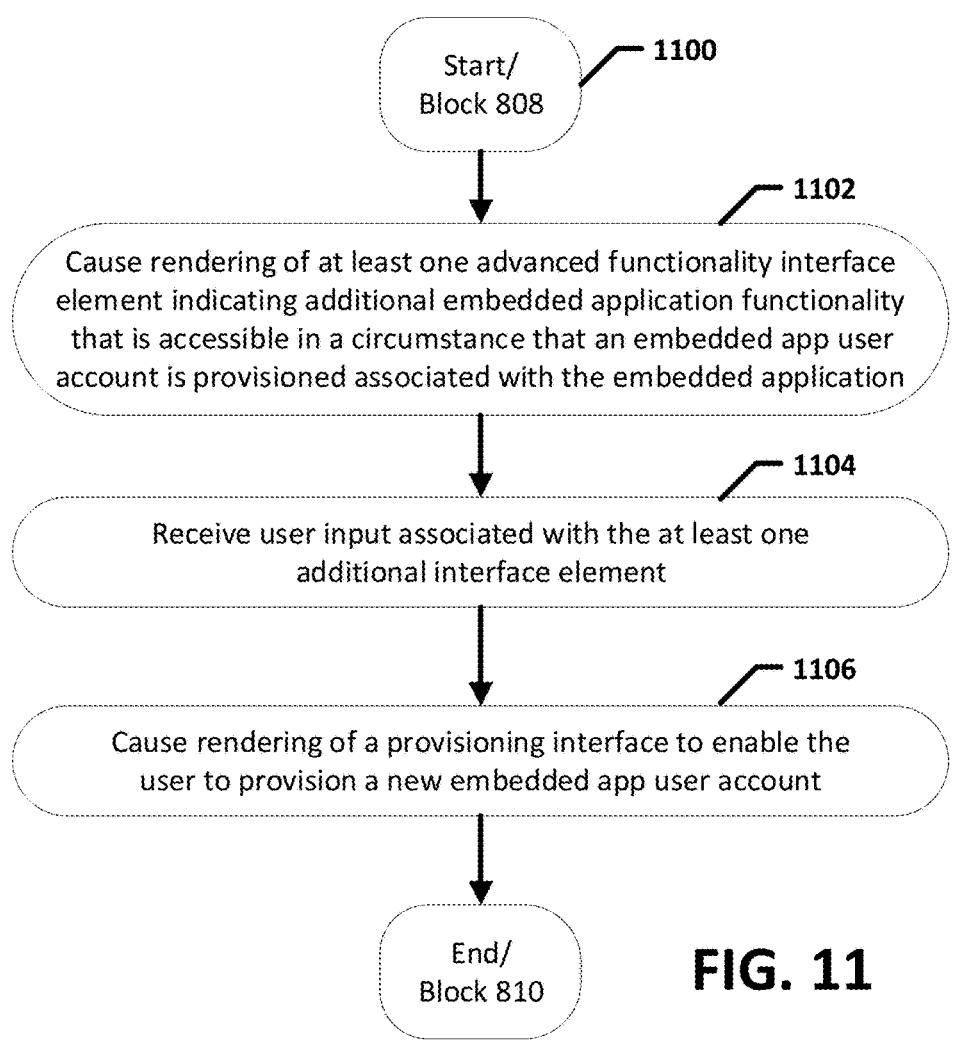

Having thus described the embodiments of the disclosure in general terms, reference now will be made to the accompanying drawings, which are not necessarily drawn to scale, and wherein:

FIG. 1 illustrates a block diagram of an embedded application communication system that may be specially configured within which embodiments of the present disclosure may operate;

FIG. 2A illustrates a block diagram of an example embedded application communication apparatus that may be specially configured in accordance with an example embodiment of the present disclosure;

FIG. 2B illustrates a block diagram of an example apparatus that may be specially configured in accordance with an example embodiment of the present disclosure;

FIG. 3 illustrates an example data visualization of an example application datastore-maintained computing environment in accordance with at least one example embodiment of the present disclosure;

FIG. 4 illustrates an example data visualization of an example embedded computing environment associated with operations of an embedded application and a user-accessed application in accordance with at least one example embodiment of the present disclosure;

FIG. 5 illustrates an example integrated interface rendered by a user-facing application associated with a user-accessed application providing embedded application functionality;

FIG. 6 illustrates an example provisioning interface rendered via a user-facing application associated with a user-accessed application providing access to embedded application functionality, in accordance with at least one example embodiment of the present disclosure;

FIG. 7A illustrates an example data flow diagram illustrating communications occurring between example computing devices in accordance with at least one example embodiment of the present disclosure;

FIG. 7B illustrates another example data flow diagram illustrating additional communications occurring between example computing devices for embedded app user account provisioning via a user-accessed application in accordance with at least one example embodiment of the present disclosure;

FIG. 8 illustrates a flowchart including example operations of an example process for improved data-driven connection application data management associated with interoperability between a user-accessed application and an embedded application, in accordance with at least one example embodiment of the present disclosure;

FIG. 9 illustrates a flowchart including example additional operations of another example process for maintaining embedded app data objects and corresponding user-accessed app representations via a user-accessed application in improved data-driven connection application data management, in accordance with at least one example embodiment of the present disclosure;

FIG. 10 illustrates a flowchart including example additional operations of another example process for utilizing a resource link to initiate a process directly associated with an embedded application from within a user-facing application associated with a user-accessed application in improved data-driven connection application data management, in accordance with at least one example embodiment of the present disclosure;

FIG. 11 illustrates a flowchart including example additional operations of another example process for providing a provisioning interface associated with a user-accessed application in improved data-driven connection application data management, in accordance with at least one example embodiment of the present disclosure;

FIG. 12 illustrates a flowchart including example additional operations of another example process for authenticating an embedded app user account for providing corresponding accessible embedded app functionality in improved data-driven connection application data management, in accordance with at least one example embodiment of the present disclosure;

FIG. 13 illustrates a flowchart including example additional operations of another example process for provisioning and utilizing an automatically provisioned a new embedded app user account for accessing embedded app functionality via a user-accessed application in improved data-driven connection application data management, in accordance with at least one example embodiment of the present disclosure; and FIG. 14 illustrates a flowchart including example additional operations of another example process for providing recommended embedded application functionality for use via a user-accessed application in improved data-driven connection application data management, in accordance with at least one example embodiment of the present disclosure.

DETAILED DESCRIPTION

Embodiments of the present disclosure now will be described more fully hereinafter with reference to the accompanying drawings, in which some, but not all, embodiments of the disclosure are shown. Indeed, embodiments of the disclosure may be embodied in many different forms and should not be construed as limited to the embodiments set forth herein, rather, these embodiments are provided so that this disclosure will satisfy applicable legal requirements. Like numbers refer to like elements throughout.

Overview

Software applications exist in a myriad of configurations and form-factors having varying levels of interoperability. For example, a software application may be developed having a particular set of features in mind, such that the software application is configured to perform an array of operations to support each feature of the set of desired features.

Software applications may also be developed to enable interaction(s) with other software applications. For example, a first software application may be designed to call, or retrieve data from, a second software application to accomplish various tasks or operations. Such interaction(s) are especially useful in circumstances where the first software application and the second software application have a common owner, are provided in a common software suite or tool kit, and/or otherwise where use of the second software application is to be incentivized.

Efforts to achieve seamless software application interactions or true interoperability can create technical challenges and user experience issues. For example, if a first software application fails to provide features that enable persistency of data changes effectuated from interaction with a second software application in both the first software application and the second software application, active features of both software applications may be limited or degraded. Alternatively or additionally, a user may perceive latency delays and other user experience issues associated with the first software application when inadequate software interoperability is not achieved.

Interoperability-based technical problems are particularly acute in circumstances where each of the first software application and the second software applications require authentication and validation of different user access credentials. Credential management software applications attempt to address such problems but they necessarily introduce a third software application into the mix, which tends to compound interoperability complexities.

Further interoperability-based problems arise where a first software application provides features of a second software application by a separate process entirely under the control of the second software application. For example, if a first software application is configured to simply launch a second software application in a separate browser tab or application session, user access to the second software application may be provided without maintaining the look-and-feel associated with the first software application. This can be particularly troublesome in circumstances where the second software application, and its associated user interface, are new or otherwise unfamiliar to the launching user.

Additional interoperability-based technical problems may arise based on the use of particular mechanisms for facilitating communication between the two discrete software applications. For example, some mechanisms that are used to provide at least some level of interoperability between a first software application that is known to a user and a second software application that is unknown, fail to enable the first software application to provide any incentive and/or information regarding the use of desirable features of the second software application that are likely to be of interest based on contextual clues identified through user engagement with the first software application. Such failure may lead to a diminished user experience and/or diminished user device operation efficiency given the high incidence of launched, but not used, second software application sessions.

Problems triggered by the failure to properly incentivize user engagement of an unknown second software application within a first known software application can be compounded in circumstances where the second software application requires additional access credentials, permissions, and/or alternative provisioning of a new user account. Such credentials, permissions, and/or provisioning provide additional obstacles, beyond mere user unfamiliarity, which can operate to limit or preclude user engagement with a second software application.

Additional technical problems are created because in most cases a first software application is not provisioned to trigger specific user-facing functions or operational workflows of a second software application based on user engagement within a user interface of the first software application. Users must be jettisoned from a user interface associated with the first software application to a new user interface of the second software application in order to trigger desirable functions or features of the second software application. Such limitations preclude the first software application from having access to any actions or operations performed by or within the second software application thereby eliminating any possibility of effective cooperation and collaboration of the two software applications in support of any particular user goals.

Each of these deficiencies leads conventional multi-app implementations to operate in a manner that is inefficient and/or otherwise ineffective. Providing efficient, consistent, and effective interoperability between a first software application, a second application, and possibly a variety of other software applications, using an effective framework that enables reciprocal native data access, data updates, and data persistence, where appropriate, is desirable.

Embodiments of the present disclosure address the various deficiencies set forth above and others described herein. In some embodiments, a user-accessed application (e.g., Trello® by Atlassian®) is provided including or otherwise associated with an embedded application (e.g., Confluence® by Atlassian®) with which the user-accessed application may interact. A data-driven connection is established and/or otherwise associated with the user-accessed application that enables interoperability between the user-accessed application and the embedded application. In this regard, in some embodiments, the data-driven connection enables functionality of the embedded application to be performed via the user-accessed application. The user-accessed application operates as a back-end and is hosted by a server. The user-accessed application is configured to communicate with and otherwise support a user-facing application (e.g., a client-side Trello® app) that operates as a front-end at the client or user device. In various embodiments, a user may access functionality of both the user-accessed application and the embedded application via a single point of interaction (i.e., via the user-facing application launched at the client).

The data-driven connection enables interaction between the user-accessed application and the embedded application in a manner that provides various technical advantages, improvements, and/or addresses one or more of the technical problems described herein. In some embodiments, for example, the user-accessed application employs the data-driven connection to cause changes to data of an embedded application in a manner that is persisted to both the user-accessed application and the embedded application. In some embodiments, the data-driven connection is further configured to cause operations of the embedded application that are configured to cause data changes of the user-accessed application.

In one example, a user that utilizes the user-accessed application (e.g., Trello®) to access both data and functionality of the user-accessed application together with data and functionality of an embedded application (e.g., Confluence®) is provided a single interaction point. User engagement of such interaction point, e.g., a user-facing application such as a client-side Trello® app, enables access to create and update data objects (e.g., cloud or server-side Trello® data structures) of the user-accessed application and embedded app data objects (e.g., cloud or server-side Confluence® data structures) of the embedded application. Any data object and/or embedded data object creations or updates are stored and persisted in a manner that is accessible to the user-accessed application and the embedded application respectively. As a result, a user may later directly access the embedded application (e.g., via a separate user-facing application supported by the embedded application such as a client-side Confluence® app) and pick up where they left off based on the updated state of the embedded app data objects.

In some example contexts where a user has not yet provisioned a user account for accessing an embedded application but nonetheless wishes to access functionality of the embedded application during a user-accessed application session, various embodiments described herein automatically provision a user account as a limited user account with respect to the embedded application, and/or automatically provision a new limited embedded app user account for the embedded application to provide such user with at least limited access to such embedded application functionality. In some embodiments, the new limited embedded app user account embodies a placeholder user account not particularly tied to any user or other use account upon creation that provides access to such embedded app functionality only as an embedded application from within the user-accessed application. The user may further provision such a new limited embedded app user account directly via a user-facing application associated with the embedded application or via a provisioning interface provided via the user-accessed application. In some embodiments, the user may access the new limited embedded app user account directly via a user-facing application associated with the embedded application and/or otherwise claim such new embedded app user account through direct operations of the embedded application.

The data-driven connection in some contexts provides further technical advantages with respect to data access and/or analysis. For example, the user-accessed application may have access to the functionality with which a particular user interacts, and/or the data managed by the user via the user-accessed application and the embedded application. In some example contexts, the user-accessed application may process such information for purposes of incentivizing use of certain functionality provided by either or both of the user-accessed application and/or the embedded application. The user-accessed application may similarly process such information to determine if advanced feature(s) requiring one or more actions by a user to access, such as additional user account provisioning, is/are likely to be useful to the user, and therefore if such corresponding actions should be performed. In this regard, such embodiments may enable incentivizing the user to provision a user account to access the embedded application in an instance where a user indicates a desire to access additional, advanced functionality and/or the user-accessed application determines that such additional, advanced functionality is likely to be of use to a user, for example, based on the user's interaction with the user-accessed application.

Some example embodiments further enable use of the data-driven connection to facilitate access to embedded app data objects without negatively affecting the look-and-feel of such access and/or the associated user experience. For example, by utilizing the data-driven connection to access embedded app functionality, a single user-facing application is presentable that provides the user access to such interoperable functionality without secondary processes associated with the embedded application directly. For example, by enabling access without requiring the user to switch between separate user-facing applications, the efficiency with which such functionality can be performed is greatly improved. Additionally, overall user experience is improved by eliminating the tediousness associated with engaging one or more separate applications.

Additionally or alternatively, embodiments described herein provide access to functionality of an embedded application within a user-accessed application while maintaining the look-and-feel of the user-accessed application, such as by presenting specific sub-interfaces within user interfaces that are configured based on the look-and-feel of the user-accessed application. Such user experience-related advantages are provided in addition to the various technical improvements with respect to ensuring the data access and updates made via the user-accessed application are kept persistent in the embedded application.

Embodiments disclosed herein provide for accessing embedded application functionality in any of a myriad of contexts. In some example contexts, for example, the embedded application and the user-accessed application may be controlled by a single entity. For example, an entity controlling a plurality of separate applications may configure a data-driven connection as described herein to provide useful functionality of a second application controlled by the entity within a first application similarly controlled by the entity. In some such contexts, the entity may provide limited access to functionality of the embedded application to encourage or otherwise incentivize use of the embedded application and/or additional provisioning of a user account by the user.

In another context, an entity controlling a user-accessed application enables access to functionality of an embedded application controlled by another entity for any of a myriad of business reasons (e.g., to increase revenue by incentivizing use of advanced features requiring payment by a user) and/or technical reasons (e.g., to provide access to complementary functionality upon which the embedded application is based). In this regard, it should be appreciated that example data-driven connections may be configured as described herein to provide interoperability between a user-accessed application and an embedded application in a manner that provides an improvement to the field of interoperable application data management, as described herein.

For example, consider an entity that provides a suite of associated software tools that are each associated with a separate code base (e.g., Atlassian, Inc., which is hereinafter referred to as "Atlassian" has developed and hosts a federated network and database platform that supports Jira Software™, Jira Service Desk™, Jira Core™, Confluence®, Bitbucket®, Atlassian Access™, Atlassian Cloud Apps™, Trello®, Statuspage™, Opsgenie®, Jira Align™, and the like). A user, Andy, who works as a product manager for developing a particular software tool, Beta Accounting Software ("Beta"), is associated with a user account for Trello® by Atlassian. Andy is a power user of Trello® and uses it for organizing operational workflows of his product management team, and those of various Beta engineering and marketing colleagues.

An Atlassian system (e.g., a native Trello® system or a separate dedicated system configured to programmatically assess a user's interaction with various Atlassian software tools) may store and programmatically parse Andy's interactions with Trello® to make contextual suggestions or predictions as to features of other Atlassian software tools that might serve Andy's programmatically determined goals. For example, a system configured as described herein might store and parse Andy's Trello® interactions to determine that certain of Andy's programmatically predicted goals might be more efficiently accomplished using features supported by Confluence®.

The above referenced Atlassian system may be configured, for example, to identify that a certain Trello® cards and boards tend to be heavily annotated and labeled by Andy and his colleagues. The system may be configured to programmatically predicted and suggest to Andy through a Trello® interface that such heavily annotated cards and boards might be linked to a dedicated Confluence® page, which is better positioned to support and enhance collaborative document creation.

To encourage Andy to further provision his user account for accessing Confluence®, at least some functionality of an embedded application (e.g., Confluence®) is made accessible from within Trello®. In this regard, certain functionality and features of Confluence® are "embedded" within the Trello® instance made available to Andy. In one embodiment, Trello® is configured to provide access to certain Confluence® content collaboration functionality, such as creating new pages, updating page content, and/or sharing page content with a limited list of other Beta team member user accounts. Such functionality is powered by Confluence® but made available all from within a launched instance of Trello®, such that Andy may utilize such functionality from within his Trello® instance without additional manual configuring by him.

Trello® may also provide advanced functionality elements that, when interacted with by Andy, provide an indication that Andy must fully provision his user account with respect to Confluence® (e.g., by agreeing to a software license terms and furnishing additional payment) for accessing such advanced functionality. In this regard, Andy may continue to interact with Trello® functionality as he normally does, and may interact with some Confluence® functionality as well.

To provide such embedded application functionality, Trello® interfaces rendered to Andy's device (e.g., via a Trello® user-facing application executing on Andy's device) are configured to provide integrated interfaces that enable use of Trello® and Confluence® functionality. Additionally, in some embodiments, Andy's user account for accessing Atlassian software tools may be automatically additionally configured with respect to accessing Confluence®. For example, Trello® systems, Confluence® systems, and/or other Atlassian systems associated with access to such software tools may automatically provision Andy's user account as a limited user account with respect to Confluence®. In this regard, Andy's user account being provisioned as a limited user account with respect to Confluence enables Andy to utilize that user account to access the limited Confluence® functionality from within Trello without requiring full provisioning, or any additional provisioning, by Atlassian. In this regard, Andy's overall user experience is improved as such functionality becomes accessible with no additional steps by Andy.

Should such encouragement of Confluence® be of interest, Andy is enabled by the system to continue to utilize the Confluence® functionality from within Trello® to improve productivity and/or Andy's user experience without requiring Andy to execute and/or interact with a second user-facing application (e.g., a separate Confluence® client app) that provides such Confluence® functionality. Should Andy determine that he would like access to advanced Confluence® functionality from within Trello®, and/or would like to access Confluence® independently as well, Andy may proceed with fully provisioning his user account with respect to Confluence®.

It should be appreciated that, in other circumstances, encouragement of use of multiple software tools is enabled from within a single software tool in the manner described. For example, Trello® may be configured in accordance with embodiments herein described to provide Andy with access to limited Confluence® functionality, limited Jira Software™ functionality, and limited Jira Service Desk™ functionality all from within a single instance of Trello®. In this regard, Andy may access functionality associated with each of these software tools without requiring interaction with additional user-facing applications, and without additional configuration by Andy. Such encouragement may result in Andy further provisioning his user account for accessing multiple of the other software tools for which limited functionality was made available.

In yet other embodiments, it should be appreciated that an embedded application and a user-accessed application are controlled by separate entities. For example, in some embodiments, the embedded application and the user-accessed application are not part of a single suite of software tools. In one such example, GitLab™ provided by GitLab Inc. of San Francisco provides access to at least limited Confluence® functionality from within GitLab™. In some such embodiments, Andy is associated with a provisioned first user account for accessing GitLab™, such that Andy can access the account utilizing corresponding user authentication credentials. Upon accessing Andy's GitLab instance, or certain functionality therein, the GitLab™ instance establishes a data-driven connection with Confluence based on Andy's provisioned first user account for GitLab™ to enable access to Confluence functionality from within the GitLab instance as an embedded application, as described herein.

Definitions

In some embodiments, some of the operations above may be modified or further amplified. Furthermore, in some embodiments, additional optional operations may be included. Modifications, amplifications, or additions to the operations above may be performed in any order and in any combination.

Many modifications and other embodiments of the disclosure set forth herein will come to mind to one skilled in the art to which this disclosure pertains having the benefit of the teachings presented in the foregoing description and the associated drawings. Therefore, it is to be understood that the embodiments are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

The term "embedded" with respect to a particular application refers to a combination of functionality and corresponding user interface elements presented from within an instance of a second application. In some embodiments, such separate applications are associated with a different set of provisioned user accounts, such that functionality made available via embedding is controlled by each of the separate applications from within the user-accessed application as described herein, including user account authentication, data management, interface element generation, layout, and/or configuration, and/or associated functionality all performed from within a sub-interface of the user-accessed application.

The term "user device" refers to any computing device embodied in hardware, software, firmware, and/or a combination thereof. In some contexts, a user device is enabled to access functionality of one or more applications executed on the user device and/or accessible via the user device (e.g., web applications accessed through a browser executed on the user device). Non-limiting examples of a user device include a smartphone device, a tablet device, a personal computer, a laptop, a smart device, a wearable device, a custom hardware device, and/or a computing terminal.

The term "executable code base" refers to computer program code stored in one or a plurality of locations that is executed and/or executable via one or more computer devices embodied in hardware, software, firmware, and/or any combination thereof. An executable code base defines at least one particular application to be executed by one or more computing devices. In some embodiments, a memory, storage, and/or other computing device includes and/or otherwise is structured to define any number of separate executable code bases (e.g., a first application and a second application). Alternatively or additionally, in some embodiments, separate executable code bases are embodied by separate computing devices (e.g., a first server embodying a first executable code base and a second server embodying a second executable code base).

The term "user-accessed application" refers to a first executable code base that performs a particular first set of functions and is configured to provide a second set of functions associated with an embedded application embodied by a second executable code base through interaction with a data-driven connection associated with the embedded application. Via the data-driven connection, the user-accessed application enables a user to access functionality of the embedded application without requiring a user to have fully provisioned an embedded app user account corresponding to the embedded application. In some embodiments, the user-accessed application is associated with a first set of user accounts that are provisioned as user-accessed app user accounts to enable access the functionality provided by the user-accessed application, such that a user must authenticate a session associated with a user-accessed app user account before accessing functionality provided by the user-accessed application.

The term "embedded application" refers to an executable code base that performs a particular second set of functions and is configured to be accessed at least through a user-facing application associated with a user-accessed application associated with a separate executable code base from that of the embedded application. An embedded application is associated with a second set of user accounts that are provisioned to enable access to the functionality provided by the embedded application, some of which are provisioned for accessing functionality of the user-accessed application as well such that a user must authenticate a session associated with a user-account provisioned as a user-accessed app user account and an embedded app user account to access functionality of the embedded application from within a user-facing application associated with the user-accessed application. In some embodiments, an embedded application is accessible directly as well as through a user-accessed application, and/or one or more additional and/or alternative functions is accessible through the embedded application when accessed directly rather through a user-accessed application.

The term "user-facing application" refers to computer-coded instructions, an executable code base, and/or a software application that is configured for execution and/or access via a user device to enable the user to interact with functionality provided by at least one remote executable code base. In some embodiments, a user-facing application serves as a client device that provides access to functionality provided by an application server. A server-side application providing various functionality is associated with a user-facing application that is installed to, and/or otherwise executed via, the user device to enable a user of the user device to access the various functionality via interaction with the user device. Separate user-facing applications may be made available for directly accessing separate remote executable code bases, for example to access separate remote application servers. Non-limiting examples of a user-facing application include a native software application downloadable to a user device (e.g., via an "app store," directly from the Internet, and/or the like) that communicates with a remote application server, and a web-based application accessible via a browser application installed and/or executable on the user device.

The term "data-driven connection" refers to a configuration and/or mechanism by which a user-accessed application is enabled to access embedded app data object(s) and/or associated functionality provided by an embedded application. A data-driven connection refers to a library of one or more application programming interface(s) (APIs) that are included in and/or otherwise configured for use by a particular user-accessed application to enable interaction with an embedded application. In some embodiments, the library of APIs are maintained separate from the code base embodying the user-accessed application that, when embedded and/or otherwise integrated into the user-accessed application, enable use of such APIs for interacting with the embedded application. In some embodiments, a data-driven connection includes specially configured software application program(s), interface element(s), and/or other component(s) for embedding within a user-facing application associated with a user-accessed application to provide access to functionality facilitated by the embedded application.

The term "user-accessed app representation" refers to electronically managed data representing a corresponding embedded app data object that is to be rendered associated with a user-accessed application. A user-accessed app representation is rendered via a user-facing application associated with the user-accessed application to enable viewing and/or managing of information of the associated embedded app user data object via interaction with the user-facing application associated with the user-accessed application. A user-accessed app representation is provided based on retrieval, via a data-driven connection between a user-accessed application and an embedded application, of the corresponding embedded app data object from an embedded application.

The term "embedded app data object" refers to electronically managed data representing information maintained by an embedded application. The embedded app data object includes information utilized for any of a myriad of functions provided by the embedded application, metadata associated with the data object, and/or metadata associated with the user account that generated the embedded app data object. A user-accessed application utilizes a data-driven connection to access one or more embedded app data object(s), and/or portions of information thereof, for providing via the user-accessed application.

The term "data level" refers to a particular classification of a tier of data object(s) and/or corresponding information in an informational organization hierarchy maintained by an embedded application for organizing embedded app data objects maintained by the embedded application. In some embodiments, embedded app data objects are organized into a particular informational organization hierarchy including multiple data levels. In some such embodiments, a particular data level is at a higher tier (e.g., "above") a "sub-level data level," which refers to a second particular tier of data object(s) and/or corresponding information in an informational organization hierarchy that is lower than a first data level. In some contexts, a data level is associated with a one-to-one, one-to-many, or many-to-many relationship with data objects of a sub-level data level. A data object at a first data level may be associated with any number of objects of a second data level embodying a sub-level data level lower than the first data level, such that each data object at the second data level embodying the sub-level data level is associated with only one particular data object at the first data level (e.g., a higher-level organizational data object).

The term "manageable directly" with respect to a particular data object refers to a state of access to the data object as being manageable through interaction with a corresponding software application have access to the particular data object. Embedded data objects are manageable directly through an embedded application, for example via a first user-facing application associated with the embedded application, and/or are manageable directly through a user-accessed application interacting with an embedded application via a data-driven connection.

The term "user account" refers to uniquely identifiable data object maintained by one or more computing systems that provide access to some or all functionality of one or more application(s) based on a state of provisioning associated with the data object. A user account is associated with authentication credentials (e.g., a username, a username and password combination, a unique identifier, and/or the like) that validates a user as authenticated to access the user account and/or functionality associated therewith. Upon authenticating access to the user account, a particular user-facing application establishes a connection with at least a user-accessed application initiates and/or otherwise establishes an authenticated session associated with the user account that provides access to functionality accessible to the user account, and such that, as a user utilizes an application after authentication associated with the particular user account, the associated application(s) store data associated with the user account in a manner that is temporarily and/or persistently available by that user account. For example, in some such contexts, a user account is linked and/or otherwise associated with certain data such that the data is later retrievable when a user returns for a subsequent authenticated session associated with the user account.

A user account includes and/or otherwise is associated with provisioning data representing one or more applications with which the user account is provisioned to access. For example, in some embodiments, a user account includes or is associated with licensing information that prescribes specific access to particular software applications and/or functionality thereof, and/or whether payment is exchanged associated with such access via the user account. A single user account may be provisioned differently for accessing different applications, for example such that the user has access to a first software application (or particular functionality thereof) only after provisioning an particular user account for accessing the first software application specifically. In this regard, a user account is individually provisioned for accessing each software application of an associated set of software applications.

For example, in some embodiments, a user provisions their corresponding user account for accessing a first software application but does not provision the user account to access a second software application. Thus, a particular user account may be a fully provisioned user account with respect to accessing functionality of a first software application, and a non-provisioned user account that cannot access functionality of the second software application. In embodiments disclosed herein, a user account provisioned as a limited user account with respect to an embedded application is enabled access to limited embedded application functionality without further provisioning by the user associated with the user account. It should be appreciated that, in some embodiments, separate applications are associated with separate user accounts, such that a user may have created and provisioned a user account associated with a first application and not have created and/or provisioned a user account associated with a second application.

The term "limited embedded app user account" refers to a user account that has not yet been fully provisioned associated with an embedded application and/or that is permitted to access only a limited set of embedded application functionality. A "temporary embedded app user account" refers to a limited embedded app user account that provides access to such limited embedded application functionality for a particular determinable amount of time unless the user account is further provisioned as a fully provisioned embedded app user account before the time lapses. The term "fully provisioned embedded app user account" refers to a user account for which a user has provided provisioning data that enables full and/or permanent access to embedded application functionality. In some embodiments, a fully provisioned embedded app user account is provisioned by a user accepting software licenses and/or furnishing payment or agreeing to furnish a payment associated with accessing the embedded application functionality.

The term "user-accessed app user account" refers to a particular user account provisioned for accessing some or all functionality provided by a user-accessed application. A user-accessed app user account is associated with a type and/or level of provisioning for accessing the user-accessed application, and/or a type and/or level of provisioning for each embedded application indicating a level of access to functionality of each embedded application associated with the user-accessed application. For example, in some embodiments a user-accessed app user account is fully provisioned for accessing a user-accessed application of a suite of software applications, and is associated with a different type and/or level of provisioning for accessing other software applications of the particular suite of software applications.

The term "embedded app user account" refers to a particular user account provisioned for accessing some or all functionality provided by an embedded application. A single user account is provisioned to access none, some, or all functionality of a user-accessed application, and separately provisioned to access none, some, or all functionality of an embedded application. In this regard, a single user account provisioned to access at least some functionality of a user-accessed application and at least some functionality of an embedded application embodies both an embedded app user account and a user-accessed user account. In some embodiments, an embedded app user account is user provisioned via the user-accessed application or via the embedded application. In some embodiments, an embedded app user account is automatically provisioned via a user-accessed application for accessing some or all functionality of an embedded application. In some embodiments, an embedded app user account automatically generated and/or otherwise provisioned by a user-accessed application is provisioned to enable temporary or limited access of functionality provided by the embedded application. Additionally or alternatively, in some contexts, an embedded app user account automatically generated and/or otherwise provisioned by a user-accessed application can be further provisioned by a user for full and/or permanent access to functionality provided by the embedded application.

The term "integrated interface" refers to a user interface rendered via a user-facing application associated with a user-accessed application that is configured to provide access to functionality provided by an embedded application associated with the user-accessed application via a data-driven connection. An integrated interface may include interface elements for accessing functionality of the user-accessed application together with interface elements for accessing functionality of the embedded application. In some embodiments, for example, an integrated interface includes interface elements native to the user-accessed application and/or embedded application for providing access to the embedded application functionality. In some embodiments, for example, an integrated interface includes an iframe interface for providing access to the embedded application functionality.

The term "representation" refers to one or more text, image, or other visual elements indicating at least a portion of information of a data object. A representation is renderable to a visual display of a computing device as part of a user interface, or usable to configure and/or fill content of a visual element renderable to a visual display of a computing device as part of a user interface.

The term "resource link" refers to a user-accessible data object that enables instantiation and/or execution of a user-facing application corresponding to an embedded application through user interaction from within a user-facing application associated with a user-accessed application. Non-limiting examples of a resource link include a URI, a URL, an application link, a pointer to a web-hosted application, and/or other pointer to an executable application for execution on a user device. In some embodiments, a resource link enables access to a download and/or installation of the user-facing application associated with the embedded application in a circumstance where the user-facing application is not already downloaded and/or installed to a user device.

The term "threshold number of embedded app data objects" refers to a determinable number of embedded app data objects that may be maintained associated with a user account through interaction with a user-accessed application for a particular embedded application without additional user account provisioning. A user account embodying a limited and/or temporary embedded app user account is associated with a threshold number of embedded app data objects that are maintainable via interaction with the user-accessed application without further provisioning the user account as a fully provisioned embedded app user account. In some embodiments, the embedded application determines and/or otherwise provides the threshold number of embedded app data objects for a particular user account, a particular user-accessed application, and/or for all user-accessed applications. In some embodiments, the threshold number of embedded app data objects is predetermined associated with a particular user account and/or user-accessed application.

The term "alert" refers to electronically managed data indicating information to be provided to a user. An alert is renderable to a user interface of a user-facing application on a computing device and/or as a sub-interface of another interface of a user-facing application on a computing device. Non-limiting examples of an alert include, without limitation, a popup window, a push notification, an email message, a desktop notification, a sub-interface of a user interface rendered via a native application executed on a computing device, and/or the like.

The term "provisioning interface" refers to one or more user interface(s) rendered by a user-facing application associated with a user-accessed application and/or an embedded application that enables further provisioning of a user account for accessing additional functionality of the embedded application. A provisioning interface as described herein is rendered within a user-facing application of the user-accessed application alone or via interaction with an embedded application to enable such provisioning without leaving the user-facing application associated with the user-accessed application. In some embodiments, a provisioning interface enables creation and/or provisioning of a new user account as an embedded app user account. In some embodiments, a provisioning interface enables further provisioning of an existing user account to embody a fully provisioned embedded app user account.

The term "user input" refers to data representing a user engagement with a computing device. Non-limiting examples of user input include a user-entered touch, mouse movement, mouse click, keyboard press, gesture, voice command, device movement, and/or peripheral input.

The term "manage" with respect to a data object refers to one or more actions performable for altering a data object and/or information therein. Non-limiting examples of actions for managing a data object include deleting a data object, creating a data object, editing a portion of information embodied by and/or otherwise stored in a data object, altering the state of a data object, and/or altering access to a data object.

The term "maintain" with respect to a data object and/or an application refers to a state of read and/or write access to a memory or other storage for persistently and/or temporarily storing the data object by the application. In some such contexts, an application that maintains a data object is permissioned to directly alter information embodied by and/or stored in the data object.

The term "functionality" refers to one or more software-driven processes and/or actions that may be initiated via a particular application. In some embodiments, a functionality of a particular application is separated into full functionality provided to a first set of users and/or user accounts (e.g., those that have fully provisioned user accounts associated with the application), and limited functionality provided to a second set of users and/or user accounts (e.g., those that have not provisioned a user account associated with the application or that had a limited user account automatically provisioned by a user-accessed application).

It should be appreciated that the term "at least partially" refers to any amount of a whole. For example, in some non-limiting example embodiments, "at least partially" refers to a small portion, half, or a selected portion of a whole. In other non-limiting example embodiments, "at least partially" refers to a whole amount.

Example Systems of the Disclosure

FIG. 1 illustrates a block diagram of an embedded application communication system that may be specially configured within which embodiments of the present disclosure may operate. Specifically, FIG. 1 depicts an example embedded application communication system 100. The example embedded application communication system 100 includes a user device 102, first application server 104, and second application server 106. One or more of the user device 102, first application server 104, and/or second application server 106 are communicable over one or more communication channels, for example, including the communication network 108.

In some example contexts, each of the application servers 104 and 106 includes any number of various computing device(s) that maintain one or more particular software application(s). In some embodiments, for example, each of the application servers 104 and/or 106 includes one or more one or more server(s), one or more sub-server(s), one or more database(s), one or more network connection(s) facilitating a communication network between such device(s), and/or the like. In some such embodiments, all components of the first application server 104 are located in the same proximate location, for example in a particular data warehouse and/or other location owned or otherwise under the control of the entity that controls the first application server. In other embodiments, one or more component(s) of the first application server 104 is/are remotely located, for example one or more "cloud" computing device(s), one or more remote database(s), and/or the like. Each of the first application server 104 and the second application server 106 may be specially configured via hardware, software, firmware, and/or a combination thereof, to operate in a specific manner, provide particular functionality, and/or the like.

For example, in some embodiments the first application server 104 maintains and/or otherwise is configured to provide and/or support a first application. In this regard, in some embodiments the first application server 104 configures, provides, and/or otherwise causes rendering of user interfaces, web pages, and/or other specially configured visual and data elements that enable a user to view relevant data controlled by the first application server 104 and/or interact with functionality for managing such data. In other embodiments, the first application server 104 serves as a back-end computing system that provides particular data objects, enables access to particular processing actions, and/or otherwise perform certain functionality to a user of an external user-facing application (e.g., accessed via the user device 102 as described herein). The first application server 104 is, in some embodiments, configured by specific computer-coded instructions embodying a first code base that are executed by computing hardware of the first application server 104, such as a memory device storing at least such computer-coded instructions in conjunction with at least one processor that executes the computer-coded instructions. It should be appreciated that the first application server 104 may be configured to perform any of a myriad of computing functionality, and is not restricted to one particular kind of application, software, computing language, implementation details, and/or the like.

The second application server 106 may similarly maintain and/or otherwise is configured to provide and/or support a second application. In this regard, in some embodiments the second application server 106 is controlled by the same entity as the first application server 104, for example where the second application is a second software application of a software suite of tools each owned by the same entity. In some such embodiments, however, the first application server 104 and the second application server 106 may be remote from one another or centrally located. For example, in some embodiments, the first application server 104 includes device(s) at a first location or set of locations, and the second application server 106 include device(s) located at a second location or set of locations. It should be appreciated that one or more of the devices may be located at the same location, and others located remotely from one another. Additionally or alternatively, in some embodiments the first application server 104 and/or second application server 106 share one or more computing device(s). In one particular example context, the first application server 104 and second application server 106 share an authentication server that performs at least user authentication with respect to one or more provisioned user accounts for one or more particular software application(s).

In other embodiments, the first application server 104 and the second application server 106 are embodied at least partially by the same computing device(s). For example, in some embodiments, the first application server 104 is embodied by a first virtual server and the second application server 106 is embodied by a second virtual server. Each of the virtual servers may be controlled by different computing device(s) and/or the same computing device. For example, in some embodiments, the same one or more computing device is configured to access and/or otherwise execute separate code bases embodying the first application and the second application utilizing the same hardware component(s) such as the same memory(s), display(s), processor(s), and/or the like.

In one example context, the first application facilitated via the first application server 104 and the second application facilitated via the second application server 106 provide distinct but related functionality. For example, the first application server 104 may provide local and/or cloud-based dynamic workflow and task planning between any number of users (e.g., Trello® by Atlassian). In this regard, for example the first application in one particular context maintains data object(s) that organize a set of tasks, for example such that the first application enables creation and/or organization of the tasks by a user, management of created tasks by the user, modification of information associated with tasks by the user, marking as completed the tasks of the user, and/or to share specific tasks and/or sets of tasks with other user accounts representing other users of the first application.

The second application server 106 may provide local and/or cloud-based dynamic page management (e.g., Confluence® by Atlassian). In this regard, for example, the second application in one particular context maintains data object(s) that organize structured electronic documentation, include text and/or image files or combinations thereof, web-pages, and/or the like, for example, such that the second application enables creation and/or organization of the structured electronic documentation, management of created electronic documentation by the user, modification of information associated with the various electronic documentation, and/or to share specific electronic documentation and/or sets of electronic documentation with other user accounts representing other users of the second application.

In certain contexts, such as where the functionality and/or data objects of a first application are related the functionality and/or data objects of a second application, the first application server 104 and/or the second application server 106 may be configured to operate in conjunction with one another via a data-driven connection as described herein. For example, in some embodiments, the data-driven connection is embodied by a library of software applications embedded within the first application executing via the first application server 104, and/or a corresponding user-facing application executing on the user device 102, that provides access to the functionality of the second application.

In some example contexts, the user device 102 includes any one or more computing device embodied in hardware, software, firmware, and/or any combination thereof. It should be appreciated that the user device 102 may maintain and/or otherwise be configured to execute any number of software application(s) downloaded by, installed to, and/or otherwise accessible to the user device 102. For example, in some embodiments, the user device 102 includes and/or otherwise maintains an executable for a user-facing software application associated with the first application server 104, for example where the user-facing software application provides functionality provided by the first application server 104. Additionally or alternatively, in some embodiments, the user device 102 includes and/or otherwise maintains a browser application that enables access to the web and/or to a web-application that provides functionality provided by the first application server 104. In some embodiments, the user device 102 further includes additional application(s), such as a second user-facing software application that provides functionality associated with the second application server 106.

In some example embodiments, the user device 102 is configured to execute a user-facing application that provides direct access to functionality of the user-accessed application, which may further provide indirect access to functionality associated with an embedded application, as described herein. In at least one example context, for example, the user-facing application associated with the first application server 104 in conjunction with data and/or functionality provided by the first application server 104 embodies the user-accessed application, and the user-accessed application provides access to functionality of an embedded application associated with the second application server 106, such that at least some functionality provided by the second application server 106 is accessible from within the user-accessed application.

In some embodiments, in the context where the user-accessed application is associated with the first application server 104, the user device 102 accesses and/or otherwise performs user-accessed application functionality via communication with the first application server 104. In this regard, in some embodiments the user of the user device 102 establishes a secure session with the first application server 104, for example by authentication information with the first application server 104 to initiate a secured session associated with a particular user account provisioned for accessing the first application server 104. In this regard, the authenticated session may be linked to and/or otherwise associated with the identified user account corresponding to the first application (e.g., a user-accessed user account) for use in identifying data associated with the particular authenticated user-accessed user account, store data and/or modify data associated with the user-accessed user account as the user performs various actions, and/or the like.

In some example contexts where the second application associated with the second application server 106 embodies the embedded application, the user device 102 may communicate with one or more servers to provide embedded application functionality. For example, in some embodiments, the user-accessed application embodied by or corresponding to a user-facing application executing and/or otherwise accessed on the user device 102 provides a data-driven connection that enables access to the embedded application (e.g., the software functionality provided by the second application server 106 in the example context). In this regard, the first application server 104 may cause rendering (e.g., to the user device 102 via the user-facing application) of an integrated interface that enables access to both first application functionality and second application functionality. In some such embodiments, the data-driven connection enables communication directly between the user device 102 and the second application server 106.

In yet other embodiments, the data-driven connection enables communication indirectly between the user device 102 and the embedded application (for example, facilitated via the second application server 106) via an intermediary computing device. For example, in some embodiments, the user device 102 communicates with the first application server 104 in a manner specially configured to cause the first application server 104 to communicate with the second application server 106 and provide the response data provided by the second application server 106 back to the user device 102 in circumstances where the response is not directly transmitted. For example, in some embodiments, the first application server 104 serves as a data-driven connection for enabling access to the embedded application functionality provided by the second application server 106.

Each of the computing devices 102, 104, and 106 are is communicable with one another over one or more communication network(s). For example, in some embodiments, each of the computing devices communicates over the communication network 108. In some example contexts, the communication network 108 is embodied by one or more network access points, relays, base stations, data transmission devices, cellular communication towers, and/or other communication devices embodying a public network such as the Internet. Additionally or alternatively, in some embodiments, the communication network 108 includes one or more computing devices of a user's local network, for example one or more network access point(s) such as a modem and/or router that enable access to a public network. It should be appreciated that the user device 102 communicates over the communication network 108 via any of a myriad of communication mechanisms, including without limitation a wired connection, a Wi-Fi connection, a cellular connection, and/or the like.

It should be appreciated that, in some embodiments, a single entity controls any number of application servers associated with a suite of associated software tools. For example in some embodiments, each application server is associated with or otherwise a part of a federated network and database platform, such that the various application server(s) of the federated network and database platform embody an associated suite of software tools. In some such embodiments, one or more aspects of various application servers may be embodied by a separate system that performs such functions for each of the associated application servers. For example, in some embodiments, the application servers are each associated with a shared authentication server that performs user authentication associated with one or more user accounts for each application embodied by an application server of the federated network and database platform.

It should be appreciated that, in some embodiments, a single user-accessed application is associated with multiple embedded applications. In this regard, a single user-facing application associated with a user-accessed application provides access to functionality associated with each of the multiple embedded applications together with functionality associated with the user-accessed application. In some such embodiments, a single user-accessed application embodied by and/or facilitated by an application server may be configured to provide access to multiple embedded applications embodied by and/or facilitated by multiple other application servers. For example, the application server associated with the user-accessed application may communicate with the other application servers associated with each embedded application to provide access to functionality associated with each embedded application.

Example Apparatuses of the Disclosure

Having discussed example systems structured in accordance with the present disclosure, example apparatuses configured in accordance with the present disclosure will now be described. In some embodiments, one or more application servers associated with a user-accessed application integrated with an embedded application via a data-driven connection, such as the first application server 104 as described herein with respect to FIG. 1, is embodied by one or more computing systems, such as the embedded application communication apparatus 200 as depicted and described in FIG. 2A. The embedded application communication apparatus 200 includes processor 202, memory 204, input/output circuitry 206, communications circuitry 208, and user-accessed application circuitry 210. Additionally or alternatively, in some embodiments, the embedded application communication apparatus 200 further includes embedded application circuitry 212. The embedded application communication apparatus 200 may be configured, using one or more of the sets of circuitry 202, 204, 206, 208, 210, and/or 212, to execute the operations described herein.

Although components are described with respect to functional limitations, it should be understood that the particular implementations necessarily include the user of particular computing hardware. It should also be understood that certain of the components described herein may include similar or common hardware. For example, two sets of circuitry for example, may both leverage use of the same processor(s), network interface(s), storage medium(s), and/or the like, to perform their associated functions, such that duplicate hardware is not required for each set of circuitry. The user of the term "circuitry" as used herein with respect to components of the apparatuses described herein should therefore be understood to include particular hardware configured to perform the functions associated with the particular circuitry as described herein.

Particularly, the term "circuitry" should be understood broadly to include hardware and, in some embodiments, software for configuring the hardware. For example, in some embodiments, "circuitry" includes processing circuitry, storage media, network interfaces, input/output devices, and/or the like. Alternatively or additionally, in some embodiments, other elements of the embedded application communication apparatus 200 may provide or supplement the functionality of another particular set of circuitry. For example, the processor 202 in some embodiments provides processing functionality to any of the sets of circuitry, the memory 204 provides storage functionality to any of the sets of circuitry, the communications circuitry 208 provides network interface functionality to any of the sets of circuitry, and/or the like.

In some embodiments, the processor 202 (and/or co-processor or any other processing circuitry assisting or otherwise associated with the processor) may be in communication with the memory 204 via a bus for passing information among components of the embedded application communication apparatus 200. In some embodiments, for example, the memory 204 is non-transitory and may include, for example, one or more volatile and/or non-volatile memories. In other words, for example, the memory 204 in some embodiments includes or embodies an electronic storage device (e.g., a computer readable storage medium). In some embodiments, the memory 204 is configured to store information, data, content, applications, instructions, or the like, for enabling the embedded application communication apparatus 200 to carry out various functions in accordance with example embodiments of the present disclosure.

The processor 202 may be embodied in a number of different ways. For example, in some example embodiments, the processor 202 includes one or more processing devices configured to perform independently. Additionally or alternatively, in some embodiments, the processor 202 includes one or more processor(s) configured in tandem via a bus to enable independent execution of instructions, pipelining, and/or multithreading. The use of the terms "processor" and "processing circuitry" may be understood to include a single core processor, a multi-core processor, multiple processors internal to the embedded application communication apparatus 200, and/or one or more remote or "cloud" processor(s) external to the embedded application communication apparatus 200.

In an example embodiment, the processor 202 may be configured to execute instructions stored in the memory 204 or otherwise accessible to the processor. Alternatively or additionally, the processor 202 in some embodiments is configured to execute hard-coded functionality. As such, whether configured by hardware or software methods, or by a combination thereof, the processor 202 may represent an entity (e.g., physically embodied in circuitry) capable of performing operations according to an embodiment of the present disclosure while configured accordingly. Alternatively or additionally, as another example in some example embodiments, when the processor 202 is embodied as an executor of software instructions, the instructions may specifically configure the processor 202 to perform the algorithms embodied by the specific operations described herein when the instructions are executed.

As one particular example, the processor 202 may be configured to perform various operations associated with facilitating data-driven connection application management, for example such that embedded application functionality is performable via a user-accessed application. In some embodiments, the processor 202 includes hardware, software, firmware, and/or a combination thereof, that initializes a user-accessed application on a user device and/or initiates, via the user-accessed, a data-driven connection with an embedded application. In some such embodiments, the data-driven connection enables access to embedded app data objects maintained by the embedded application and/or embedded application functionality provided by the embedded application.

Additionally or alternatively, in some embodiments, the processor 202 includes hardware, software, firmware, and/or a combination thereof, that identifies at least one embedded app data object that is maintained by the embedded application and is structured for processing via the user-accessed application. Additionally or alternatively, in some embodiments, the processor 202 includes hardware, software, firmware, and/or a combination thereof, that causes rendering of an integrated interface associated with a user-accessed application (e.g., within a user-facing application corresponding to the user-accessed application) comprising a representation of at least a portion of the embedded app data object. In some such embodiments, the processor 202 includes hardware, software, firmware, and/or a combination thereof that enables rendering of representations of embedded app data object(s) and/or interface elements for performing functionality associated therewith.

Additionally or alternatively, in some embodiments, the processor 202 includes hardware, software, firmware, and/or a combination thereof, that determines the user-accessed application is associated with at least a threshold number of embedded app data objects and/or generates an alert for rendering to the interface. Additionally or alternatively, in some embodiments, the processor 202 includes hardware, software, firmware, and/or a combination thereof, that receives data, via a user-accessed application, indicating updating of one or more embedded app data objects (or sub-level embedded app data objects) and/or causes updating, via interaction with an embedded application, for example utilizing a data-driven connection, of the one or more embedded app data objects (or sub-level embedded app data objects).

Additionally or alternatively, in some embodiments, the processor 202 includes hardware, software, firmware, and/or a combination thereof, that causes rendering of the integrated interface comprising a resource link associated with the embedded application, receives user input associated with the resource link, and initiates the embedded application to a particular embedded application user interface (e.g., rendered via a second user-facing application associated with the embedded application) based on an embedded app data object. Additionally or alternatively, in some embodiments, the processor 202 includes hardware, software, firmware, and/or a combination thereof, that causes rendering of at least one advanced functionality interface element indicating additional, advanced embedded application functionality that is accessible in a circumstance that an embedded app user account is provisioned associated with the embedded application, receives user input associated with the at least one additional interface element, and/or causes rendering of a provisioning interface to enable the user to provision a new embedded app user account and/or authenticate an existing embedded app user account.

Additionally or alternatively, in some embodiments, the processor 202 includes hardware, software, firmware, and/or a combination thereof, that identifies an embedded app user account provisioned for accessing the embedded application, authenticates an embedded app user account associated with the embedded application, and/or provides access, via the user-accessed application, to additional embedded application functionality. Alternatively or additionally, in some embodiments, the processor 202 includes hardware, software, firmware, and/or a combination thereof, that automatically provisions, utilizing the user-accessed application via interaction with the embedded application, an embedded app user account associated with the user-accessed application (e.g., by provisioning an existing user account embodying a user-accessed user account to further embody an embedded app user account) and/or associates, via the embedded application, one or more embedded app data object(s) with the new embedded app user account in response to user interaction with the user-accessed application. Additionally or alternatively, in some embodiments, the processor 202 includes hardware, software, firmware, and/or a combination thereof, that receives user interaction with the user-accessed application, determines, based on user interaction with the user-accessed application, embedded application functionality associated with the embedded application is likely to be utilized, and/or causes rendering of a second user interface comprising at least one interface element recommending use of the embedded application.

In some embodiments, the embedded application communication apparatus 200 includes input/output circuitry 206 that may, in turn, be in communication with processor 202 to provide output to the user and, in some embodiments, to receive an indication of a user input. The input/output circuitry 206 may comprise one or more user interface(s) and may include a display that may comprise the interface(s) rendered as a web user interface, an application interface, a user device, a backend system, or the like. In some embodiments, the input/output circuitry 206 may also include a keyboard, a mouse, a joystick, a touch screen, touch areas, soft keys, a microphone, a speaker, or other input/output mechanisms. The processor 202 and/or input/output circuitry 206 comprising the processor may be configured to control one or more functions of one or more user interface elements through computer program instructions (e.g., software and/or firmware) stored on a memory accessible to the processor (e.g., memory 204, and/or the like).

The communications circuitry 208 may be any means such as a device or circuitry embodied in either hardware or a combination of hardware and software that is configured to receive and/or transmit data from/to a network and/or any other device, circuitry, or module in communication with the embedded application communication apparatus 200. In this regard, the communications circuitry 208 may include, for example, a network interface for enabling communications with a wired or wireless communication network. For example, the communications circuitry 208 may include one or more network interface card(s), antenna(s), bus(es), switch(es), router(s), modem(s), and supporting hardware and/or software, or any other device suitable for enabling communications via one or more communication network(s). Additionally or alternatively, the communications circuitry 208 may include circuitry for interacting with the antenna(s) and/or other hardware or software to cause transmission of signals via the antenna(s) or to handle receipt of signals received via the antenna(s).

The user-accessed application circuitry 210 includes hardware, software, or a combination thereof, configured to support various user-accessed application functionality provided by an application server and/or corresponding user-facing application. In some embodiments, the user-accessed application circuitry 210 utilizes processing circuitry, such as the processor 202, to perform one or more of such actions. For example, in some embodiments, the user-accessed application circuitry 210 includes hardware, software, firmware, and/or a combination thereof, that initializes a user-accessed application on a user device, initiates via the user-accessed application a data-driven connection with an embedded application, identifies at least one embedded app data object that is maintained by an embedded application and is structured for processing via the user-accessed application, and causes rendering of an integrated interface associated with the user-accessed application, the integrated interface comprising a representation of at least a portion of the embedded app data object. Additionally or alternatively, in some embodiments, the user-accessed application circuitry 210 includes hardware, software, firmware, and/or a combination thereof, that performs any other user-accessed application functionality.

Additionally or alternatively, in some embodiments, the user-accessed application circuitry 210 includes hardware, software, firmware, and/or a combination thereof, that provides interaction with an embedded application. In some embodiments, for example, the user-accessed application circuitry 210 facilitates one or more of the actions described above with respect to the example context performed by the processor 202. It should be appreciated that, in some embodiments, the user-accessed application circuitry 210 may include a separate processor, specially configured field programmable gate array (FPGA), or a specially programmed application specific integrated circuit (ASIC).

Optionally, in some embodiments, the embedded application communication apparatus 200 includes the embedded application circuitry 212. The embedded application circuitry 212 includes hardware, software, or a combination thereof, configured to support accessing and/or otherwise providing various embedded application functionality. In some embodiments, the embedded application circuitry 212 utilizes processing circuitry, such as the processor 202, to perform one or more of such actions. For example, in some embodiments, the embedded application circuitry 212 includes hardware, software, firmware, and/or a combination thereof, that enables initiation of a data-driven connection between a user-accessed application and an embedded application. Additionally or alternatively, in some embodiments, the embedded application circuitry 212 includes hardware, software, firmware, and/or a combination thereof, that communicates with an external application server (e.g., an application server embodying or otherwise associated with the embedded application), such as by transmitting data to the application server and/or processing response data received from the application server. Alternatively or additionally, in some embodiments, the embedded application circuitry 212 includes hardware, software, firmware, and/or a combination thereof, that maintains one or more embedded app data object(s), maps such embedded app data object(s) to one or more corresponding user-accessed app representations(s) as described herein, and/or causes updating of an embedded app data object associated with a mapped user-accessed app representation as described herein.

Alternatively or additionally, in some embodiments, the embedded application circuitry 212 includes hardware, software, firmware, and/or a combination thereof, that enables provisioning of an embedded app user account, and/or identification and/or authentication of information associated with a previously provisioned embedded app user account. In some embodiments, for example, the embedded application circuitry 212 facilitates one or more of the actions described above with respect to embedded application functionality in the example context performed by the processor 202. It should be appreciated that, in some embodiments, embedded application circuitry 212 may include a separate processor, specially configured field programmable gate array (FPGA), or a specially programmed application specific integrated circuit (ASIC).

It should be appreciated that, in some embodiments, one or more of the sets of circuitry 202-212 are combinable. Alternatively or additionally, in some embodiments, one or more of the modules performs some or all of the functionality described associated with another component. For example, in some embodiments, the sets of circuitry 210 and 212 are combined into a single module embodied in hardware, software, firmware, and/or a combination thereof. Similarly, in some embodiments, one or more of the sets of circuitry 210 and/or 212 is combined such that the processor 202 performs one or more of the operations described above with respect to each of these modules.

In one or more embodiments, the user device 102 is embodied by one or more computing systems, apparatuses, devices, and/or the like, for example embodied by the user apparatus 250 as depicted and described with respect to FIG. 2B. As illustrated in FIG. 2B, the user apparatus 250 includes a processor 252, memory 254, input/output circuitry 256, communications circuitry 258, and user-facing application circuitry 260. In some embodiments, one or more of the circuitry components of the user apparatus 250 provide and/or supplement the functionality provided by other circuitry of the user apparatus 250. For example, in some embodiments, the processor 252 provides processing functionality, the memory 254 provides storage functionality, the input/output circuitry 256 provides user interface and/or rendering functionality and/or user input/output, and/or the communications circuitry 258 provides network inter-facing functionality, and/or the like. As it relates to operations of the present disclosure, the functioning of the processor 252, the memory 254, the input/output circuitry 256, and/or the communications circuitry 258 may perform in a manner similar to that performed by the similarly named components depicted and described above with respect to the embedded application communication apparatus 200 in FIG. 2A. For the sake of brevity, additional description of the mechanics and functionality associated with these components is omitted. Nevertheless, these components, whether operating alone or together in any suitable combination, enable the user apparatus 250 to provide the various functionality associated therewith.

The user-facing application circuitry 260 includes hardware, software, firmware, and/or a combination thereof, that supports client-facing functionality of the user device 102 for interacting with a user-accessed application and/or associated embedded application, for example as described with respect to the first application server 104 and the second application server 106. In some embodiments, the user-facing application circuitry 260 utilizes processing circuitry, such as the processor 252, to perform one or more of these actions. In some embodiments, the user-facing application circuitry 260 includes hardware, software, firmware, and/or a combination thereof, that initializes a user-accessed application and data-driven connection associated with a corresponding embedded application.

Additionally or alternatively, in some embodiments, the user-facing application circuitry 260 includes hardware, software, firmware, and/or a combination thereof, that provides one or more user interfaces to enable access to various functionality associated with the user-accessed application and/or the embedded application from within the user-accessed application. Additionally or alternatively still, in some embodiments, the user-facing application circuitry 260 includes hardware, software, firmware, and/or a combination thereof, that enables download, installation, and/or initializing of a separate application associated with the embedded application.

In this regard, it should be appreciated that in such embodiments the user-facing application circuitry 260 enables access to functionality associated with both the user-accessed application and the embedded application from within a single user-facing application executed and/or otherwise accessed via the user apparatus 250. In some embodiments, the user-facing application circuitry 260 performs one or more of such actions via communication with one or more application servers, for example a first application server associated with the user-accessed application and/or a second application server associated with the embedded application, as described herein. It should be appreciated that, in some embodiments, the user-facing application circuitry 260 may include a separate processor, specially configured FPGA, or a specially programmed ASIC. It should also be appreciated that all or some of the information discussed herein can be based on data that is received, generated, and/or maintained by one or more components of the user apparatus 250.

It should also be appreciated that, in at least some embodiments, one or more of the components 252-260 may be combined. Alternatively or additionally, in some embodiments, one or more of the modules may perform some, or all, of the functionality described associated with another component. For example, in some embodiments, the components 252 and 260 may be combined such that processing circuitry provided and configured to perform the operations described above with respect to each of these components.

As described above and as will be appreciated based on this disclosure, embodiments of the present disclosure may be configured as methods, mobile devices, frontend graphical user interfaces, backend network devices, and the like. Accordingly, embodiments may comprise various means including entirely of hardware or any combination of software and hardware, and/or firmware. Furthermore, embodiments may take the form of a computer program product on at least one non-transitory computer-readable storage medium having computer-readable program instructions (e.g., computer software) embodied in the storage medium. Similarly, embodiments may take the form of a computer program code stored on at least one non-transitory computer-readable storage medium. Any suitable computer-readable storage medium may be utilized including non-transitory hard disks, CD-ROMs, flash memory, optical storage devices, or magnetic storage devices.

As will also be appreciated, any such computer program instructions and/or other type of code may be loaded onto a computer, processor or other programmable apparatus' circuitry to produce a machine, such that the computer, processor, or other programmable circuitry that execute the code on the machine creates the means for implementing various functions, including those described herein.

The computing systems described herein can include client devices and server devices. A client and server are generally remote from each other and typically interact through a communication network. The relationship of client and server arises by virtue of computer programs running on the respective computers and having a client-server relationship to each other. In some embodiments, a server transmits information/data (e.g., an HTML page) to a client device (e.g., for purposes of displaying information/data to and receiving user input from a user interacting with the client device). Information/data generated at the client device (e.g., a result of the user interaction) can be received from the client device at the server.

While this specification contains many specific implementation details, these should not be construed as limitations on the scope of any embodiments or of what may be claimed, but rather as description of features specific to particular embodiments of this disclosure. Certain features that are described herein in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results, unless described otherwise. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products. Any operational step shown in broken lines in one or more flow diagrams illustrated herein are optional for purposes of the depicted embodiment.

Thus, particular embodiments of the subject matter have been described, and will be described below. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results, unless described otherwise. In certain implementations, multitasking and parallel processing may be advantageous.

Example Computing Environments of the Disclosure

Having described example systems and apparatuses of the present disclosure, example computing environments in accordance with the disclosure will now be discussed. It should be appreciated that the example computing environments described herein may be maintained via one or more of the systems and/or apparatuses described herein. For example, in some embodiments, the specially configured apparatuses described herein are configured to maintain a software environment embodying the computing environments depicted and described herein. It should be appreciated that such software environments may be maintained entirely on a single device, apparatus, and/or system, and/or be maintained through interaction with multiple devices, apparatuses, and/or systems. For example, in some embodiments, a portion of the computing environment(s) is maintained by a first application server associated with an embedded application, and a second portion of the computing environment(s) is maintained by a second application server associated with the user-accessed application.

FIG. 3 illustrates an example data visualization of an example application datastore-maintained computing environment in accordance with at least one example embodiment of the present disclosure. Specifically, FIG. 3 depicts an example computing environment 300. In some embodiments, the computing environment 300 is maintained by a particular application server associated with a corresponding application, such as an application server embodied by the embedded application communication apparatus 200. In some embodiments, the computing environment 300 is maintained to facilitate data storage and/or management associated with a user-accessed application and/or an embedded application.

As depicted, the data maintained in the computing environment 300 is organized into several data levels. In this regard, in some embodiments, the data objects maintained within the computing environment is organized such that data objects at a particular data level may be linked to or otherwise associated with any number of data objects at a subsequent level (e.g., any number of sub-level data object(s)). In some such embodiments, each of the data levels organizes data objects in a manner that facilitates particular functionality and/or processing by a user. In an example context of structured electronic documentation management (e.g., for managing web pages, formatted text documents, documentation including text and audio/visual media, and/or the like), for example, data level 1 represents a project space accessible by a particular set of provisioned user accounts and to be associated with any number of pages embodying electronic documentation, data level 2 represents top-level pages in a particular space (e.g., including rich electronic documentation content in any of a myriad of formats), and data level 3 represents sub-level pages of such top-level pages in a particular space (including elements of the rich electronic documentation of a particular top-level page).

In this regard, it should be appreciated that a data object may be linked and/or otherwise associated with a data object of a higher-level and/or sub-level in any of a myriad of ways. For example, in some embodiments, a particular data object includes or is otherwise associated with one or more object identifier(s) that uniquely identify sub-level data object(s) linked to the data object. Additionally or alternatively, in some embodiments, a particular data object includes or is otherwise associated with one or more object identifier(s) that uniquely identify higher-level data object(s) linked to the data object. In this regard, a particular computing device, apparatus, and/or the like may identify linked data object(s) based on the available identifier(s) associated with the various data object(s). It should be appreciated that a computing environment may include any number of data levels (e.g., only a single data level, multiple data levels, and/or the like).

The data objects at each data level may be accessible to any number of user accounts and/or specific sets of user accounts. For example, in some embodiments, permissions are associated with each data level and/or specific data objects thereof that enable particular user accounts and/or sets of user accounts to access such data level(s) and/or specific data object(s). In one example context, for example, the highest data level is associated with a particular organization and/or entity with which a user account may be associated, and one or more user accounts associated with such organization and/or entity are specially provisioned as an administrator that may provide access to particular data object(s), data object(s), and/or sub-level data object(s). Additionally or alternatively, in some embodiments, a user that creates a particular data object may assign permissions to various other user account(s) and/or sets of user account(s) for accessing and/or managing such data object(s), and/or in some embodiments sub-level data objects linked with said data object(s). It should be appreciated that, in some embodiments, each user account is associated with permission(s) for a particular data level that indicate whether the user account may create new data object(s) at the particular data level and/or delete one or more data object(s) at the particular data level.

As depicted, for example, the computing environment 300 includes various data objects at various data levels. For example, the computing environment 300 includes a data object 302 at a top data level 1. With respect to the data object 302, the data object 302 is linked to or otherwise associated with two sub-level data object(s) at the data level 2, specifically data object 306 and data object 308. Further, with respect to the data object 306, the data object 306 is linked to or otherwise associated with sub-level data objects 312 and 314 at data level 3, and with respect to the data object 308, the data object 308 is linked to or otherwise associated with sub-level data object 316. Each of the particular depicted data objects may embody rich electronic documentation content and/or associated organizational structures that enable organization of the various data objects. In this regard, in some embodiments, when a user initiates an authenticated session with the application associated with a user account that is permissioned to access certain data object(s), such data object(s) and/or sub-level data object(s) may be identified and provided for accessing and/or manipulation by the user. For example, where the data object 306 represents a rich electronic document including text and/or audio/visual elements (e.g., a "page"), a permissioned user may access the data object 306 to manipulate the content of the data object 306, create a new sub-level data object linked to the data object 306, and/or otherwise manipulate one or more properties of the data object 306.

In some embodiments, data object(s) and/or data level(s) may be associated with particular permissions granting access to particular sets of user accounts. For example, in some embodiments and as depicted, some data object(s) may be assigned as public data object(s) accessible to one or more user accounts, or all user accounts, not associated with the entity or organization with which the data object(s) are linked. In an example context, such public data objects are publicly accessible, such as in the manner that public Internet web-pages are accessible to various users that access them. Additionally or alternatively, in some embodiments and as depicted, some data object(s) may be assigned as private data object(s) accessible to one certain user account(s) and/or sets of user accounts.

As illustrated for example, the computing environment 300 further includes data object 304 linked to sub-level data object 310, which is further linked to sub-level data object 318. Each of these data object(s) may be configured such that they are accessible only to a particular subset of user accounts intended to access and/or manage the private data objects. For example, in some embodiments, the data object 318 is accessible to one or more user account(s) not associated with the entity and/or organization that created and/or otherwise controls management of the data object 318.

Additionally or alternatively, one or more user account(s) not associated with the entity and/or organization that created and/or otherwise controls management of the data object 310 may similarly have access to the data object 310, and/or the sub-level data object 318. In this regard, the various data objects maintained in the computing environment 300 are organized in a manner that enables the access and functional association in the manner desired by the entity or entities controlling such data object(s).

In some embodiments, to facilitate interoperability between a user-accessed application and an embedded application, each of the applications maintains a separate computing environment with data and/or representations mapped to a corresponding computing environment of the other application. For example, in some such embodiments, the user-accessed application generates and/or maintains user-accessed app representations in a computing environment that map to the embedded app data objects of a second computing environment maintained by the embedded application. FIG. 4 illustrates an example data visualization of such data mappings between an embedded application and user-accessed application environment in accordance with at least one example embodiment of the present disclosure. Specifically, FIG. 4 depicts an example computing environment 400 including a computing environment associated with an embedded application and a computing environment associated with a user-accessed application. In this regard, the computing environment maintained associated with the embedded application may be maintained by a first computing device, apparatus, and/or the like embodying an application server for the embedded application, and the computing environment maintained associated with the user-accessed application may be maintained by a second computing device, apparatus, and/or the like embodying an application server for the user-accessed application. In other embodiments, an embedded application directly maintains rendered representations of embedded app data objects for presentation within a user-facing application associated with the user-accessed application.

In some embodiments, the user-accessed application is associated with a computing environment that maps to the computing environment of the embedded application. In this regard, the embedded application may maintain the embedded app data objects in a manner that is structured for processing via the user-accessed application. For example, such embedded app data objects may be structured in a manner that is readable by the user-accessed application, renderable via the user-accessed application to one or more user interface(s), such as to an integrated interface configured via the user-accessed application, is usable to create and/or maintain corresponding mapped user-accessed app representations, and/or are updateable by interaction with the user-accessed application, for example via an associated data-driven connection.

As depicted, the user-accessed application is associated with or otherwise executes a computing environment that maintains representations of the embedded app data objects in a manner utilizing the same data levels as the computing environment for the embedded application, specifically data levels 1, 2, and 3 as depicted. In some such embodiments, the mappings between embedded app data objects and corresponding user-accessed app representations are maintained utilizing a data-driven connection established between the user-accessed application and the embedded application. In this regard, the computing environment maintained by the user-accessed application maps various embedded app data objects to corresponding embedded app representations to be presented via the user-accessed application. For example, as depicted, the embedded app data object 402 associated with the embedded application maps with the user-accessed app representation 452 associated with the user-accessed application at data level 1. Similarly, the embedded app data object 404 of the embedded application maps with the user-accessed app representation 454 of the user-accessed application at data level 2.

Further, the embedded app data object 406 of the embedded application is mapped to the user-accessed app representation 456 of the user-accessed application, and the embedded app data object 408 of the embedded application is mapped to the user-accessed app representation 458 of the user-accessed application. Additionally, the sub-level relationship between such data object(s) is appropriately mapped as well, such that the embedded app data object 404 is a sub-level embedded app data object with respect to the embedded app data object 402 associated with the embedded application and the corresponding user-accessed app representation 454 and the user-accessed app representation 452 associated with the user-accessed application maintain this sub-level relationship. It should be appreciated that, in some embodiments, the user-accessed application is configured to maintain a computing environment that presents representations according to the data hierarchy and/or relationships between the various embedded app data objects maintained by the embedded application. In other embodiments, the user-accessed application communicates with the embedded application via a data-driven connection in a manner that enables the user-accessed application to identify the embedded app data objects associated with a particular user account and present representations of such data objects in a manner that maintains the data hierarchy of such data objects.

In some such embodiments, updates made associated with a particular representation are made via interaction with the mapped data object itself, such that the updates are reflected in the corresponding mapped data object(s) in the embedded application. For example, in some embodiments, in a circumstance where a user accesses embedded application functionality to update one or more data values of the embedded app data object 406 associated with the user-accessed app representation 456, the update is initiated within the embedded application via the user-accessed application to reflect these updates within the corresponding embedded app data object 406. Alternatively or additionally, for example, where the user accesses embedded application functionality within the user-accessed application to delete the embedded app data object 406 associated with the user-accessed app representation 456, the deletion is initiated within the embedded application via the user-accessed application to reflect this action.

Additionally or alternatively, in a circumstance where the user accesses embedded application functionality within the user-accessed application to create a new embedded application data object, the new data object creation is initiated within the embedded application via the user-accessed application and a corresponding user-accessed app representation is reflected via the user-accessed application. In some embodiments, in circumstances where an embedded app data object is directly updated and/or created via the embedded application (e.g., utilizing a second user-facing application not associated with and/or otherwise distinct from the user-accessed application and/or not through a data-driven connection as described herein), the representations of such data objects presented via the user-accessed application may similarly reflect such actions. It should be appreciated that data-driven connection that provides access to the embedded application via the user-accessed application thus ensures that the embedded application and the user-accessed application remain in synchronized parity as the user accesses embedded application functionality via the user-accessed application or directly via a separate application. In this regard, the embedded app data objects and mapped user-accessed app representations of such embedded app data objects remain synchronized for viewing and/or further manipulation by the user via the user-accessed application.

Example User Interfaces of the Disclosure

Example user interfaces configured according to the present disclosure will now be discussed. In some embodiments, the various user interfaces depicted are rendered by one or more of the specially configured apparatuses, systems, and/or the like as described herein. For example, in some embodiments, one or more of the user interface(s) is rendered by the specially configured user apparatus 250 in communication with one or more application server(s) embodied by the specially configured embedded application communication apparatus 200. In this regard, in some embodiments, the embodiments user interfaces are rendered by a particular executing software application on the specially configured apparatus(es), for example by a user-accessed application associated with an embedded application communicable via a data-driven connection, as described herein. It should be appreciated that the particular example user interfaces are, in some embodiments, configured based on a particular authenticated user account, such that the same user interface may include different rendered content in a circumstance where another user account is utilized and has access to and/or otherwise is associated with different data object(s). For example, a user interface may be rendered within a user-facing application associated with a user-accessed application upon authentication of a user account provisioned as a user-accessed app user account, and a limited embedded app user account or fully provisioned embedded app user account.

FIG. 5 illustrates an example integrated interface rendered by a user-facing application associated with a user-accessed application providing embedded application functionality, in accordance with at least one example embodiment of the present disclosure. Specifically, FIG. 5 depicts an example integrated interface 500 representing a particular interface of a user-accessed application configured to enable access to embedded application functionality from within the integrated interface 500 of the user-accessed application. In this regard, in some embodiments, an executing user-accessed application causes the integrated interface 500 to be rendered to an appropriate display based on various data objects identified by the user-accessed application in communication with the embedded application over a data-driven connection as described herein.

The integrated interface 500 includes various interface elements each rendered to provide various functionality. For example, the integrated interface 500 includes interface elements 502 and 504 that may provide access to user-accessed application functionality. In this regard, in some embodiments, one or more of the interface elements 502 and/or 504 is configured based on data separate from embedded application functionality. The integrated interface 500 further includes a "pages" access interface element 506, which provides access to particular embedded application functionality to manage page data object representing a particular example type of embedded app data object. In this regard, upon selection of the pages access interface element 506 (as is depicted in FIG. 5), the integrated interface 500 may provide interface elements for performing various embedded application functionality, for example associated with page management in the example context depicted.

In some embodiments, the user-accessed application renders an integrated interface 500 including one or more automatic provision initiation interface element(s). The automatic provision initiation interface element(s) may initiate automatic provisioning of an embedded application user account upon user interaction with the automatic provision initiation interface element(s). In some such embodiments, automatic provisioning of the embedded app user account only occurs upon a first instance of accessing the embedded application functionality, and in subsequent instances, the embedded app user account is subsequently associated with the user-accessed application (e.g., via configuration of the data-driven connection) to enable the user to utilize the embedded app user account in accessing embedded application functionality from within the user-accessed application. Additionally or alternatively, the automatic provision initiation interface element(s) may each be associated with one or more aspects of embedded application functionality made available via the user-accessed application. For example, as depicted, the "pages" access interface element 506 may embody and/or otherwise be configured to function as an automatic provision initiation interface.

In this regard, the automatic provisioning of an embedded app user account via an automatic provision initiation interface element is initiated based on the user's indication that they would like to access such embedded application functionality. In this regard, computing resources utilized for the automatic embedded app user account provisioning are conserved for only those instances where such embedded application functionality is to be accessed. In some embodiments, once the embedded app user account is provisioned, and associated with or otherwise linked with the corresponding user-accessed application, the automatic provision initiation interface element may be configured or otherwise rendered in a second state indicating that the embedded app user account has already been provisioned and linked to the instance of the user-accessed application.

In some embodiments, one or more interface elements that provide access to embedded application functionality is rendered together with one or more additional interface elements that specifically indicate that such functionality is provided by a data-driven connection with the embedded application. For example, as depicted, the integrated interface 500 includes an interface element 508 that indicates the page management functionality associated with the pages access interface element 506 is "powered by" an associated embedded application named "EMBEDDED APP."

It should be appreciated that other types of interface elements, such as image interface elements, audio/visual interface elements, and/or the like, may similarly be provided in other embodiments. In some embodiments, the interface element 508 embodies an embedded application resource link that is configured to receive user interface. In response to user interaction with the embedded application resource link, the user-accessed application in some embodiments initiates the embedded application if accessible to the device executing the user-accessed application, directs the user to one or more web pages to provision an embedded app user account associated with the embedded application and/or download the embedded application to the device, and/or otherwise provides an additional or alternative interface that provides information regarding use of the embedded application and/or the integration between the embedded application and the user-accessed application.

In some embodiments, the user-accessed application is associated with an embedded app user account for the embedded application such that the user-accessed application is uniquely associated with the particular embedded app user account. In this regard, the user-accessed application in some embodiments initiates an authenticated session associated with the associated embedded app user account such that the user is provided access only to particular data objects that are accessible to the corresponding user account. In some such embodiments, for example, the embedded app user account is identifiable based on automatically created and/or otherwise temporary authentication credential(s), identifier(s), and/or the like maintained by the user-accessed application that can be automatically identified and provided to the embedded application (e.g., upon initiation of a data-driven connection with the embedded application) to establish a corresponding authenticated session associated with the user account.

Additionally or alternatively, in some embodiments, the user-accessed application provides functionality to enable the user to provide embedded app user authentication credentials utilized to identify a fully provisioned existing embedded app user account and initiate an authenticated session associated with said embedded app user account. In some such embodiments where the user provides such embedded app user authentication credentials, the user-accessed application stores the embedded app user authentication credentials and/or corresponding data representations (e.g., equivalent tokens) to automatically enable initiation of an authenticated session associated with the corresponding embedded app user account.

In some embodiments, the integrated interface 500 includes one or more interface elements that enable access to embedded application functionality via the embedded application from within the user-accessed application. For example, as illustrated, the integrated interface 500 includes embedded application sub-interface 518. In some embodiments, presentation and/or interaction via the embedded application sub-interface 518 is facilitated via the data-driven connection with the embedded application, for example such that the embedded application configures the embedded application sub-interface 518 and/or provides access to embedded application functionality associated therewith. In some such embodiments, the embedded application, via the data-driven connection, configures and/or otherwise lays out the embedded application sub-interface 518 for presentation within the integrated interface 500 of the user-accessed application. In some embodiments, for example, the embedded application sub-interface 518 is embodied by an iframe within the integrated interface 500, which may be controlled directly by the embedded application via a data-driven connection. In other embodiments, one or more custom interface elements are utilized to enable presentation and/or use of the embedded application sub-interface 518.

As depicted, the embedded application functionality accessible via the user-accessed application includes accessing particular embedded app data object(s) associated with or otherwise accessible to a particular embedded app user account, editing at least a portion of the content associated with such embedded app data object(s), and/or creating a new embedded app data object. As illustrated, for example, the embedded app user account with which the authenticated session has been initiated, for example via the data-driven connection with the embedded application, has access to three embedded app data objects representing different pages accessible to the corresponding embedded app user account. For example, as depicted, the integrated interface 500 includes interface element 510A for accessing a first embedded app data object (e.g., representing an embedded app data object "Page 1") and that is currently selected for accessing, interface element 510B for accessing a second embedded app data object (e.g., representing an embedded app data object "Page 2"), and interface element 510C for accessing a third embedded app data object (e.g., representing an embedded app data object "Page 3").

In some embodiments, to identify the embedded app data object(s) accessible to the user, the user-accessed application interacts with the embedded application via an established data-driven connection, as described herein. Additionally or alternatively, in some such embodiments, the user-accessed application interfaces with the embedded application via an established data-driven connection to retrieve such embedded app data object(s) to present user-accessed app representations within a sub-interface of the integrated of the user-accessed application, for example within the embedded application sub-interface 518. In some such embodiments, each of the identified embedded app data object(s) is mapped to one or more corresponding user interface elements embodying a corresponding user-accessed app representation presented within the user-accessed application, for example associated with the interface elements 510A-510C.

The integrated interface 500 includes an embedded app data object editing sub-interface 514 that, in some embodiments, displays the content of the selected data object for editing. For example, as depicted, the interface element associated with the embedded app data object representing "Page 1" is selected, and thus a representation of the corresponding content of the embedded app data object is rendered to the embedded app data object editing sub-interface 514. In this regard, the content of the mapped embedded app data object may be updated as the user interacts with the embedded app data object editing sub-interface 514, and such edits may be made to the embedded app data object maintained by the embedded application through the data-driven connection with the embedded application to ensure that such updates are made persistent. In this regard, the embedded app data object is represented within the integrated interface 500 associated with the user-accessed application in a manner that accurately reflects the most up-to-date values of the embedded app data object as it is updated via the user-accessed application.

Additionally, as depicted, the integrated interface 500 includes an embedded app data object creation interface element 512. In this regard, in some embodiments, the embedded app data object creation interface element 512 is configured to receive user interaction and, in response to the user interaction, initiate embedded application functionality for creating a new embedded app data object via the user-accessed application, for example indirectly in communication with an embedded application via a data-driven connection. For example, in some embodiments, the user-accessed application interacts with the embedded application via an established data-driven connection to cause the embedded application to create a new embedded app data object to be associated with the corresponding embedded app user account. Additionally or alternatively, in some embodiments, a user-accessed representation of the new embedded data object is provided within the user-accessed application, for example via the embedded application sub-interface 518.

In some circumstances, such as where the user has not fully provisioned their account as an embedded app user account with respect to the embedded application (e.g., the user has not executed a software license associated with accessing the embedded application), the user-accessed application is maintained associated with a data-driven connection that enables access to limited embedded application functionality. For example, in some embodiments, the user-accessed application interacts with the embedded application to create a new user account and/or provision the user's existing user account as a limited embedded app user account automatically provisioned to access at least some functionality of the embedded application. In this regard, in some embodiments the embedded application grants the limited embedded app user account access only to a particular subset of embedded application functionality. For example, in some embodiments, the user may only create and/or maintain a particular limited number of embedded app data objects via the user-accessed application, may be restricted from accessing and/or otherwise performing certain data object editing and/or permissioning actions, and/or the like.

Additionally or alternatively, as depicted with respect to the integrated interface 500, one or more interface elements may be rendered associated with inaccessible embedded application functionality that requires fully provisioning an embedded app user account before accessing such functionality. As depicted for example, the integrated interface 500 includes a page sharing interface element 516. In some embodiments, the page sharing interface element 516 is associated with sharing a particular embedded app data object (e.g., representing the currently accessed page as described herein), publishing the page to a particular web portal and/or host, and/or otherwise permissioning access to the embedded app data object by one or more users that may be associated with other provisioned user account(s).

In some embodiments, such embedded application functionality embodies "advanced" functionality that is either only accessible via the embedded application directly, and/or only accessible from within the user-accessed application in a circumstance where the user is associated with a fully provisioned embedded app user account (e.g., rather than a limited embedded app user account or temporary embedded app user account). In some such circumstances where the user is associated with a limited embedded app user account, for example, user interaction with the page sharing interface element 516 directs the user to and/or initiates rendering of one or more interfaces for fully provisioning an embedded app user account (e.g., by creating a new user account and/or provisioning an existing user account for accessing the embedded application). In this regard, the user may interact with a provisioning interface, for example, to fully provision a new embedded app user account via the user-accessed application and gain access to the functionality associated with the page sharing interface element 516 without leaving the user-accessed application associated with the integrated interface 500 and/or initiating a separate process associated with the embedded application associated with such functionality.

It should be appreciated that any number of features may embody "advanced" functionality requiring a fully provisioned embedded app user account before accessing. For example, in other embodiments, a limited embedded app user account not yet fully provisioned is limited to a threshold number of embedded app data object(s) before a fully provisioned embedded app user account is required to create and/or maintain more of such embedded app data object(s).

In other embodiments, functionality for creating, accessing, and/or otherwise maintaining sub-level embedded app data objects may only be accessible via the user-accessed application to fully provisioned embedded app user accounts.

FIG. 6 illustrates an example provisioning interface rendered via a user-facing application associated with a user-accessed application providing access to embedded application functionality, in accordance with at least one example embodiment of the present disclosure. Specifically, FIG. 6 depicts an example provisioning interface 600. In some example contexts, the provisioning interface 600 provides interface elements for inputting and/or submitting, via interaction from within the user-accessed application, data utilized in provisioning an embedded app user account through interaction with the embedded application. It should be appreciated, as described herein, that the provisioning interface 600 may be rendered in response to particular user interaction with one or more interface elements rendered via the user-accessed application, for example in response to one or more interface element(s) associated with advanced features requiring a fully provisioned embedded app user account in a circumstance where the user has yet to authenticate the user-accessed application as associated with a particular fully provisioned embedded app user account. For example, with reference to the integrated interface 500 depicted and described herein with respect to FIG. 5, the provisioning interface 600 in some embodiments is rendered within the user-accessed application in response to user interaction with the interface elements 508 and/or 516.

As depicted, the provisioning interface 600 includes various interface elements for inputting particular user data utilized to provision the new embedded app user account. For example, as depicted, the provisioning interface 600 includes a username input interface element 604 that enables user input of a username to be utilized and associated with the newly provisioned embedded app user account. In some embodiments, the username input interface element 604 comprises and/or otherwise is embodied by a text field, a text area, and/or other input components enabling input of such username data. Further as depicted, the provisioning interface 600 includes a password input interface element 606 that enables user input of a password to be utilized and associated with the newly provisioned embedded app user account.

In some embodiments, the password input interface element 606 comprises and/or otherwise is similarly embodied by a text field, a text area, and/or other input components enabling input of such password data. In this regard, the data input via the username input interface element 604 and the password input interface element 606 are utilized as user authentication credentials for a new embedded app user account. Additionally or alternatively, in some embodiments, the provisioning interface 600 includes user biographical information input interface elements 608. In some embodiments, some or all of the user biographical data inputted via the user biographical information input interface elements 608 is stored as one or more data value(s) of the new embedded app user account.

In some embodiments, a user interacts with the provisioning interface 600 to select from a myriad of embedded app user account types and/or levels of functionality. For example, in some embodiments, the embedded applications supports at least two types of embedded app user account, such as a "free" level for provisioning a limited embedded app user account having access to limited embedded application functionality, and a "paid" level for provisioning a fully-provisioned embedded app user account having access to all embedded application functionality. In some embodiments, the embedded application supports other levels of functionality, for example such that a third embedded app user account type that a fully provisioned embedded app user account may be provisioned for a lower cost than a fully provisioned embedded app user account. It should be appreciated that, in some embodiments, an embedded app user account comprises and/or otherwise is associated with a qualitative and/or quantitative data value representing the type of embedded app user account and/or the level of functionality accessible by the embedded app user account.

In some embodiments, the user-accessed application further provides access to functionality associated with indicating whether to synchronize data associated with a temporary and/or otherwise limited embedded app user account to a new embedded app user account. For example, in some embodiments, the user-accessed application automatically initiates provisioning of a temporary embedded app user account specifically tied to the user-accessed application and/or specific computing device executing the user-accessed application. In this regard, as a user utilizes embedded application functionality provided via the user-accessed application, one or more embedded app data object(s) may be created and/or updated and associated with the temporary embedded app data object. In this regard, should the user access the embedded application utilizing any other mechanism (e.g., by initiating a user-facing application associated with the embedded application so as to directly interact with the embedded application) the user's data may not be accessible.

By synchronizing data associated with a temporary data with the new embedded app user account, the synchronized data may be accessed and/or otherwise interacted with via the new embedded app user account. For example, in a circumstance where the user initiates an authenticated session associated with the new embedded app user account, the user may continue to access embedded app data objects including the same content as the user's embedded app data object(s) created and/or updated before provisioning the new embedded app user account.

In some circumstances, such as where the synchronizing of data to the new embedded app user account is not desirable and/or the user desires to start new, one or more interface elements are provided to indicate whether the embedded app data object(s) associated with a temporary embedded app user account should be synchronized with a new embedded app data object. For example, as depicted, the provisioning interface 600 includes a synchronization indicator interface element 610 that indicates whether such data synchronization should occur based on user input. In this regard, if the synchronization indicator interface element 610 is not marked (e.g., not checked), the embedded app data object(s) created and/or maintained before fully provisioning an embedded app user account may be deleted or otherwise not maintained. associated with the fully provisioned embedded app user account. In some embodiments, if the synchronization indicator interface element 610 is marked (e.g., checked), no additional actions are required once the embedded app user account is fully provisioned, for example in circumstances where the embedded app data object(s) are already associated with the embedded app user account from before the embedded app user account was fully provisioned by the user. As depicted, for example, the synchronization indicator interface element 610 is embodied by a checkbox, toggle switch, and/or other two-state interface element that is configured to represent an on and/or off state. It should be appreciated that, in other embodiments, the synchronization indicator interface element 610 is embodied by any other interface component type that enables indication of whether the described data synchronization should occur.

The provisioning interface 600 may, in some embodiments, further include any of a myriad of interface components associated with cancelling and/or submitting a request. For example, as depicted, the provisioning interface 600 includes a cancel interface element 612, for example that initiates cancellation of provisioning a new embedded app user account in response to user interaction with the cancel interface element 612. Further, as depicted, the provisioning interface 600 includes a confirmation interface element 614, for example that initiates one or more actions associated with completing provisioning of a new embedded app user account in response to the confirmation interface element 614. For example, in some embodiments, the user-accessed application provides information, such as user authentication credentials based on the values of the username input interface element 604 and password input interface element 606 as well as biographical information based on values of the user biographical information input interface element 608 and/or a synchronization indicator value based on the value of the synchronization indicator interface element 610, to the embedded application for use in provisioning the new embedded app user account. In this regard, the new embedded app user account is created and/or otherwise provisioned by the embedded application in response to user interaction with the confirmation interface element 614.

In some embodiments, for example where the user provisions a single user account for functioning as both a fully provisioned user-accessed app user account and a fully provisioned embedded app user account, one or more interface elements may not be rendered and/or is prepopulated in a circumstance where such data value(s) are determinable based on prior provisioning. For example, in some embodiments, a user creates a single user account that includes various user information, user authentication credentials, and/or the like associated with the user. In some such circumstances, the single user account subsequently may be provisioned associated with any of a number of applications including at least the user-accessed application and the embedded application. In this regard, the provisioning interface 600 may provide interface elements for selecting a type of user account (e.g., a free limited embedded app user account or a paid fully provisioned embedded app user account), facilitating payment, and/or otherwise accepting software license terms and/or the like.

Example Data Flows of the Disclosure

Having described example systems, apparatuses, computing environments, and user interfaces in accordance with the disclosure, example data flow diagrams will now be discussed. It should be appreciated that the data flow diagram(s) described herein include data transmissions and/or communication between any of a myriad of computing device(s), software, application(s), and/or the like. For example, in some embodiments, a data flow diagram depicts operations performed by an operating system and/or other software application(s) of a user device in communication with one or more application(s) for performing improved data-driven connection application data management.

FIG. 7A illustrates an example data flow diagram between example computing devices in accordance with at least one example embodiment of the present disclosure. As depicted, FIG. 7A depicts an example data flow diagram including various data flow operations between a user device 726 executing various applications (e.g., an operating system of a user device together with a user-facing application associated with a user-facing application, and/or the like), a user-accessed application server 728 (e.g., facilitating access to and/or otherwise executing the user-accessed application), and an embedded application server 730 (e.g., facilitating and/or otherwise executing the embedded application). In some such embodiments, the user-accessed application server 728 and the embedded application server 730 are configured to interact with one another via a data-driven connection, for example embodied by the data-driven connection 732. In some such embodiments, the data-driven connection 732 is associated with and/or otherwise facilitated via one or more authenticated sessions associated with a particular embedded app user account and/or user-accessed app account, for example such that functionality performed via interaction with the embedded application may be associated with the authenticated embedded app user account. In this regard, the user-accessed application server 728 may be considered embodying the user-accessed application alone and/or in conjunction with a user-facing application executing on the user device 726 and/or the data-driven connection 732, and the embedded application server 730 may be considered embodying the embedded application.

At operation 702, the user device 726 accesses a user-accessed application. In some embodiments, the user device 726 accesses the user-accessed application in response to user interaction with the user device 726 that indicates a user desire to launch and/or otherwise initiate the user-accessed application. In other embodiments, the user-accessed application is accessed and/or otherwise launches automatically, for example into one or more determinable and/or detectable device events, such as powering on of the user device 726.

At operation 704, the user-accessed application server 728 identifies a user account for the user-accessed application associated with the user device. In some embodiments, the user-accessed application server 728 automatically identifies user-accessed app user authentication credentials for use in identifying a corresponding user-accessed app user account. Additionally or alternatively, in some embodiments, the user-accessed application server 728 receives, for example in response to user input, user authentication credentials utilized to identify a corresponding user account for the user-accessed application server 728 associated with the user device 726. In some embodiments, the user submits user authentication credentials utilized to authenticate the user has access to a particular user account, for example by verifying the user authentication credentials are associated with a particular user-accessed app user account. In this regard, the user may initiate the user-accessed application associated with a particular authenticated session corresponding to a user-accessed app user account, such that functionality performed via the user-accessed application is associated with the user-accessed app user account that was authenticated.

In some embodiments, the user-accessed application server 728 establishes a data-driven connection 732 for communicating with the embedded application server 730. In some embodiments, the user-accessed app user account is provisioned as an embedded app user account utilized to access functionality associated with the embedded application server 730. For example, in one embodiment, a user may have previously provisioned the user account as both a user-accessed app user account and an embedded app user account such that authenticating the user account enables access to functionality of both applications.

The data-driven connection 732 may be established and/or maintained by transmission of particular information to the embedded application. For example, in some embodiments, the embedded application receives an IP address or other identifier associated with a user device 726, an IP address or other identifier associated with the user-accessed application server 728, an application identifier associated with a user-facing application on the user device 726 and/or a user-accessed application on the user-accessed application server 728, user-accessed app user account identifier and/or authentication credentials maintained by the user-accessed application server 728, embedded app user account identifier and/or authentication credentials maintained by the user device 726 and/or user-accessed application server 728, and/or the like, that uniquely identifies the user and/or associated user-accessed application by which the user is attempting to access embedded application functionality. Such information may be transmitted as part of a connection request that establishes and/or utilizes the data-driven connection 732. In some such embodiments, for example, the data-driven connection 726 is established associated with a particular embedded-app user account identified based on the information provided. In other embodiments, a connection request including such information is transmitted each time the embedded application is accessed via the data-driven connection (e.g., with each API call via a library of APIs).

For example, in some embodiments, the user-accessed application server 728 maintains a user-accessed app user account associated with a particular user. The user may utilize the user device 726 to connect with the user-accessed application server 728 and authenticate, via the user-accessed application server 728, that the user has access to a particular user-accessed app user account associated with the user-accessed application. The user-accessed application server 728 may automatically, upon user request, and/or upon access of certain features by the user, transmits a connection request to establish and/or utilize the data-driven connection 726. In some embodiments, the embedded application functionality is subsequently accessible via the data-driven connection 726, and/or through subsequent connection requests transmitted via the data-driven connection 726 (e.g., requests for particular embedded application functionality and/or associated data utilized to authenticate access to a particular embedded app user account).

In the depicted embodiment, the user-accessed application server 728 identifies and/or provides authentication credentials and/or other data (e.g., device identifiers associated with the user device 726) that enables the embedded application server 730 to identify and/or authenticate the user is associated with an embedded app user account. In this regard, the embedded app user account may be provisioned to enable access to particular functionality accessible to the embedded app user account, access to specific app data object(s) associated with the user account, and/or the like.

In other embodiments, such as where the user has provisioned a single user account as the user-accessed app user account but not an embedded app user account, the user-accessed app initiates automatic provisioning of the user account as an embedded app user account to enable the user of the user device 726 to access some or all embedded application functionality.

At optional operation 706, the user-accessed application server 728 interacts with the embedded application server 730 to initiate provisioning of an embedded app user account. In some embodiments, the embedded app user account is provisioned as associated with the user-accessed user account and/or user device 726. For example, in some embodiments, the user-accessed application server 728 interacts with the embedded application server 730 to initiate provisioning of the user account associated with the user of the user device 726 as a new limited and/or temporary embedded app user account for the user (e.g., upon first instance of initiating the user-accessed application server 728). In some such embodiments, the single user account embodies both the user-accessed application and the embedded app user account, such that the single user account may be utilized to initiate authenticated sessions with both the user-accessed application and the embedded application to access functionality associated with both such applications.

In some embodiments in which an embedded application is configured to provision one or more temporary embedded app user accounts for multiple user-accessed applications, optional operation 706 may involve comparing one or more user-accessed application identifiers (e.g., domains, UIDs, etc.) for an initiating user-accessed application against a registry of authorized user-accessed applications. For example, a registry of authorized user-accessed applications for Confluence® might indicate that Trello®, Jira®, and GitLab® are authorized user-accessed applications but OpsGenie® is not yet an authorized user-accessed application. Thus, embedded application server 730 may be configured to at operation 706 to analyze any provisioning initiation request for authorized user-accessed application identifiers and provision temporary embedded app user accounts only for those identified on the registry (e.g., yes for Trello®, Jira®, and GitLab® but no for OpsGenie®).

In other embodiments, the user-accessed application server 728 provides additional identified and/or received embedded app user authentication credentials for use in authenticating associated with an associated embedded app user account, and/or to initialize the embedded app user account associated with the data-driven connection 732.

At operation 708, the user-accessed application server 728 requests embedded app data object(s) to be provided within the user-accessed application. In some embodiments, the user-accessed application requests embedded app data object(s) associated with the user account provisioned to access the user-accessed application and embedded application in at least a limited manner. In some embodiments, the user-accessed application interacts with the embedded application via the data-driven connection 732. For example, in some embodiments, the user-accessed application server 728 configures and/or provides a specially configured request to the embedded application server 730 via the data-driven connection 732 that requests all embedded app data object(s) associated with a particular embedded app user account. In some embodiments, the user-accessed application server 728 and/or data-driven connection 732 provides an identifier associated with the corresponding embedded app user account and/or additional information to be utilized in identifying corresponding embedded app data object(s) accessible to the identified embedded app user account.

At operation 710, the embedded application server 730 identifies the embedded app user account associated with the user-access application user account for use in identifying the associated embedded app data object(s). For example, in some embodiments, the user-accessed application server 728 provides information associated with the user-accessed app user account that is utilized to identify the corresponding embedded app user account. Alternatively or additionally, in some embodiments, the embedded application server 730 utilizes user authentication credentials received from the user-accessed application server 728 to identify the corresponding embedded app user account for a particular user-accessed app user account. In yet other embodiments, the data-driven connection 732 is configured associated with the particular embedded app user account, such that the embedded app user account is identifiable automatically in response to receiving information from the user-accessed application server 728 via the data-driven connection 732.

At operation 712, the embedded application server 730 retrieves embedded app data object(s) to be provided to the user-accessed application server 728. In some embodiments, the embedded application server 730 retrieves the embedded app data object(s) based on the identified embedded app user account associated with the user-accessed application and/or a corresponding user-accessed app user account, for example as identified at operation 710 as described herein. In some such embodiments, the embedded application server 730 queries one or more database(s) for embedded app data object(s) accessible by and/or otherwise associated with the embedded app user account, and retrieves such embedded app data object(s). In this regard, the retrieved embedded app data object(s) may include embedded app data object(s) originated or otherwise created by the embedded app user account corresponding to the user-accessed application server 728, embedded app data object(s) shared with the embedded app user account (for example, by other users associated with the same organization and/or higher-level entity as the identified embedded app user account), and/or the like. It should be appreciated that, in some embodiment, the embedded application server 730 retrieves a predetermined number of embedded app data object(s) for providing to the user-accessed application server 728.

At operation 714, the embedded application server 730 provides the retrieved embedded app data object(s) to the user-accessed application server 728. In some embodiments, the embedded application server 730 provides the embedded app data object(s) as response data to one or more transmissions from the user-accessed applications, for example a request transmitted at operation 708. In some embodiments, the embedded application server 730 provides the embedded app data object(s) to the user-accessed application via the data-driven connection established between the user-accessed application server 728 and the embedded application server 730.

At operation 716, the user-accessed application server 728 receives the embedded app data objects from the embedded application maintained by the embedded application server 730. In some embodiments, the embedded app data objects are received via the data-driven connection 732 maintained by the user-accessed application in conjunction with the embedded application. In this regard, in some embodiments, the user-accessed application maintained by the user-accessed application server 728 receives the embedded app data objects in a manner controlled by the embedded application or rendering associated with the user-accessed application.

At operation 718, the cause rendering of user interface(s) for user by user of the user device. In some embodiments, such user interfaces include interface elements for performing any of a myriad of functionality associated with the user-accessed application server 728 and/or embedded application server 730. In one example context, for example, the user interface(s) rendered provide access to functionality for creating and/or editing embedded app data object(s) via the user-accessed application server 728, as described herein. Additionally or alternatively, in another example context for example, the user interface(s), the user interface(s) rendered provide access to functionality for provisioning a new embedded app user account. Additionally or alternatively, in other embodiments, the user interface(s) provide access to any of the other functionality associated with interaction with the user-accessed application server 728 and/or embedded application server 730. In some embodiments, for example, the user-accessed application causes rendering of an integrated interface that includes one or more sub-interfaces including user-accessed app representations of the embedded app data objects via the data-driven connection 732. In some such embodiments, for example, the user-accessed application causes rendering of such integrated interface(s) within a user-facing application executing on the user device 726.

At operation 720, the user device 726 receives user interaction with the user-accessed application associated with the user-accessed application server 728. For example, in some embodiments, the user device 726 executes a user-facing application associated with accessing the user-accessed application and/or associated embedded application functionality via the established data-driven connection. In this regard, the user may interact with the user device 726 via one or more touch(es), tap(s), mouse, keyboard, peripheral(s), and/or the like, to engage certain interface elements of the rendered user interfaces. In some embodiments, functionality of the user-accessed application server 728 is initiated in response to such user interaction(s). For example, in some embodiments, the user interacts with one or more user-accessed app representations mapped to corresponding embedded app data objects identified at an earlier step. In some such embodiments, the user interaction is associated with updating one or more embedded app data objects through the user-accessed application, creating a new embedded app data object through the user-accessed application, and/or performing other embedded app functionality from within the user-accessed application.

At operation 722, the user-accessed application server 728 initiates updating of a set of embedded app data object(s), for example associated with the embedded app user account for which a data-driven connection 732 is established. In some embodiments, for example, the user-accessed application initiates, via the data-driven connection 732, updating of one or more embedded app data object(s) with which the user interacted via an integrated interface rendered in an earlier step. For example, in one example context, the user performs various user interactions to update one or more properties, data value(s), and/or other content of an embedded app data object mapped to a user-accessed app representation. It should be appreciated that, as descried herein, any of a myriad of content may be updated, including access permissions, image content, text content, and/or the other content portions of an embedded app data object.

Additionally or alternatively, in some embodiments, for example, the user-accessed application initiates, via the data-driven connection 732, updating of the set of embedded app data object(s) to delete one or more embedded app data object(s) from the set and/or add one or more new embedded app data objects via the embedded application. In some embodiments, to initiate the updating of the embedded app data objects, for example of an embedded app data object set associated with a particular user account, the user-accessed application transmits one or more specially configured transmissions to the embedded application server 730 via the data-driven connection 732 upon performance of user interactions corresponding to such updates. In this regard, the user's interaction with the user-accessed application indirectly enables updating of the embedded applications via the embedded application through the user-accessed application.

At operation 742, the embedded application server 730 performs the updates of one or more embedded app data object(s) maintained by the embedded application. For example, in this regard, the embedded application may update one or more stored data values based on the updated information provided by the user through interaction with the user-accessed application. Upon updating the embedded app data object(s), the changed data values for one or more properties of the embedded app data object(s), for example, may be persistently reflected. Alternatively or additionally, in some embodiments, the embedded application deletes embedded app data object(s) from a persistent storage and/or newly creates one or more embedded app data object(s) stored in the persistent storage maintained by the embedded application for storing such embedded app data objects.

FIG. 7B illustrates another example data flow diagram between example computing devices in accordance with at least one example embodiment of the present disclosure. As depicted, FIG. 7B depicts an example data flow diagram including various additional and/or alternative data flow operations between a user device 726 (e.g., an operating system of a user device, and/or the like), a user-accessed application server 728, and an embedded application server 730. In some such embodiments, the user-accessed application server 728 and the embedded application server 730 are configured to communicate with one another via a data-driven connection, for example embodied by the data-driven connection 732. In some such embodiments, the data-driven connection 732 is associated with a particular embedded app user account, for example such that functionality performed may be associated with the authenticated embedded app user account.

At operation 752, the user-accessed application server 728 causes rendering of user interface elements associated with a user desire to further provision an embedded app user account. It should be appreciated that, in some embodiments for example, the user is previously and/or automatically provisioned associated with a limited embedded app user account to provide access to embedded application functionality from within the user-accessed application. In this regard, in some such contexts, the further provisioning of the embedded app user account may represent fully provisioning the embedded app user account for accessing additional embedded application functionality by providing additional user authorizations, provisioning one or more software licenses in exchange for payment, and/or the like. In some embodiments, for example, the user-accessed application server 728 causes rendering of one or more interface elements associated with accessing advanced functionality of an embedded application. Such interface elements may be rendered together with any of the user interfaces for accessing other user-accessed application functionality and/or embedded application functionality, as described herein. For example, in some embodiments, the user interface elements associated with a user desire to provision an embedded app user account are rendered as part of the integrated interface 500 as described and depicted with respect to FIG. 5.

At operation 754, the user device 726 receives user interaction indicating a user desire to further provision an embedded app user account. For example, in some embodiments, the user device 726 receives user interaction associated with the user-accessed application server 728, such as via a user-facing application executed thereon. In one example embodiment, for example, the user interacts, via the user device 726, with a particular user interface element within an interface associated with the user-accessed application server 728 that is rendered via the user device 726. In some embodiments, for example, the user interaction is received in response to user interaction with one of the interface elements rendered associated with the integrated interface 500 as described herein.

At operation 756, the user-accessed application server 728 causes rendering of a provisioning interface associated with the embedded application. In some embodiments, for example, the provisioning interface includes one or more user interface elements that enables a user to select a type of embedded app user account to provision (e.g., a free account versus a paid account), authorize particular software licenses, furnish payment associated with fully provisioning an embedded app user account, and/or the like. In some embodiments, such as where a user account is utilized as both a user-accessed application user account and an embedded app user account, subsequent creation of a new user account is not required. In some such embodiments, for example, to fully provision the embedded app user account, the embedded application associated with the embedded application server 730 adjusts one or more permission settings associated with the embedded app user account such that creation of a new user account is not required.

In this regard, the provisioning interface may not include interface elements associated with user authentication credentials, and may only include user interface elements that enable a user to review various software licenses associated with accessing additional embedded application functionality and/or other aspects of the embedded application, provide authorization for the various software licenses, payment associated with fully provisioning the embedded app user account, and/or the like. Alternatively or additionally, in some embodiments, the provisioning interface includes interface elements that enable a user to provide user authentication credentials for a user-accessed app user account to be similarly provisioned as a fully provisioned embedded app user account.

In some embodiments, the rendered interface elements include one or more inputs for receiving user authentication credentials to be associated with a new embedded app user account. Additionally or alternatively, in some embodiments, the user interface elements include one or more inputs for receiving biographical information regarding the user provisioning the new embedded app user account. The provisioning interface may include one or more interface components for submitting the inputted information for use in generating a corresponding embedded app user account. In at least one example context, the user-accessed application server 728 causes rendering of the interface elements described with respect to the provisioning interface 600 as depicted and described with respect to FIG. 6.

At operation 758, the user device 726 receives user input associated with the provisioning interface to initiate further provisioning. For example, in some embodiments, the user input is received in response to particular user interaction(s), such as one or more tap(s), gesture(s), and/or the like, for engaging the provisioning interface rendered via the user device 726. The user may interact with the provisioning interface to perform various actions, including viewing and/or authorizing certain software license(s), furnishing payment associated with further provisioning of an embedded app user account, and/or the like. In some embodiments, for example, the user interacts with at least one interface element specifically configured to indicate completion of other user interactions associated with the provisioning interface and initiate further provisioning associated with the embedded application. In some embodiments, the user interaction causes transmission of one or more specially configured transmission via the user-accessed application.

At operation 762, the user-accessed application server 728 causes further provisioning of an embedded app user account, for example in response to receiving the user interaction submitting the user input. In some embodiments, the user-accessed application server 728 transmits a specially configured transmission that causes the provisioning of the embedded app user account via the embedded application. For example, the specially configured transmission may be transmitted through the data-driven connection 732, in some example contexts, to enable the embedded application provided by the embedded application server 730 to perform the provisioning. In some such embodiments, the user-accessed application server 728 provides user-inputted data provided via the provisioning interface, for example authorization information, payment details, data value indicating whether to keep existing embedded app data object(s) associated with the embedded app user account, the user inputted authentication data and/or associated information (e.g., biographical information), to the embedded application server 730 for use in further provisioning the embedded app user account.

At operation 764, the embedded application server 730 further provisions the embedded app user account. In some embodiments, for example, the embedded application provided via the embedded application server 730 updates one or more permissions and/or data values to indicate the embedded app user account is fully provisioned. In some such embodiments, the embedded app user account is provisioned without requiring additional user account creation to enable efficient and simplified further provisioning. For example, in some embodiments, the embedded app user account is associated with an updated account type indicating the embedded app user account is fully provisioned. Additionally or alternatively, in some embodiments, the embedded application initiates processing of a payment associated with fully provisioning the embedded app user account. Additionally or alternatively still, in some embodiments, the embedded application stores authorization data from the user, for example associated with the user's authorization with respect to one or more software licenses.

In some such embodiments where a single user account is utilized as a user-accessed app user account and an embedded app user account, the embedded application may update the single user account to be associated with one or more data values indicating the single user account is fully provisioned for accessing at least some functionality of the embedded application. It should be appreciated, as described herein, that the user may further provision the embedded app user account to any of a myriad of functionality access tiers. In some embodiments, for example associated with different levels of payment (e.g., a free tier having limited functionality access and a paid tier having full functionality access).

In some other embodiments, the embedded application server 730 creates and stores the new embedded app user account associated with other provisioned user accounts. The new embedded app user account may include or otherwise be associated with various information received from the user-accessed application server 728 and/or inputted from by the corresponding user. In some embodiments, for example, the new embedded app user account is associated with authentication credentials inputted by the user and received from the user-accessed application server 728, such as an inputted username and password. Additionally or alternatively, in some embodiments, the new embedded app user account is provisioned associated with a user-selected level of functionality and/or user account type, for example such that the embedded app user account is enabled to access particular embedded application functionality. Additionally or alternatively still, in some embodiments, the embedded application server 730 associates the newly provisioned user account with a particular identifier representing an entity and/or organization with which the new embedded app user account is associated.

In some embodiments, the identifier representing the entity and/or organization is automatically identified by the embedded application server 730 automatically, and in other embodiments the identifier is inputted by a user via the user-accessed application server 728 and received from the user-accessed application server 728, for example via the data-driven connection 732. It should be appreciated that, in some embodiments, the identifier that an embedded app user account is associated with is utilized to group a set of embedded app user accounts. For example, in some embodiments where the embedded application server 730 provides data object sharing functionality, the identifier is utilized to identify other embedded app user accounts associated with the same entity and/or organization as a particular user, and to provide interface elements for sharing the embedded app data object(s) with such user accounts similarly associated with the identifier.

Upon successfully further provisioning an embedded app user account, the embedded application server 730 may provide access to additional and/or advanced embedded application functionality compared to the default and/or standard embedded application functionality accessible by all embedded app user accounts regardless of level of provisioning, including a temporary embedded app user account and/or limited embedded app user account automatically created for example. In this regard, the user may authenticate themselves via the user-accessed application server 728 and/or embedded application server 730 to access this functionality, and/or all functionality provided by an embedded application server 730 in some circumstances, via the user-accessed application server 728 and/or corresponding configured data-driven connection 732.

In some embodiments, in response to successfully further provisioning the embedded app user account. at optional operation 766 the embedded application server 730 provides one or more indications that the embedded app user account was successfully provisioned. In some contexts, for example, the embedded application server 730 provides one or more response transmissions via the data-driven connection 732 that indicates the embedded app user account was successfully provisioned. Additionally or alternatively, in some embodiments, the embedded application server 730 provides information to be utilized by the user-accessed application server 728 for initiating an authentication session associated with the embedded app user account either for the current session and/or for storing for use in subsequent sessions via the user-accessed application server 728. At optional operation 768, the embedded application server 730 causes rendering of an indication that the embedded app user account was successfully provisioned. For example, in some embodiments, the user-accessed application server 728 causes rendering of one or more interface elements that include various content that indicates the embedded app user account was successfully provisioned by the embedded application server 730.

Example Processes of the Disclosure

Having described example systems, apparatuses, computing environments, user interfaces, and data flows, example processes in accordance with the present disclosure will now be described. It should be appreciated that each of the flowcharts depicts an example computer-implemented process that may be performed by one or more of the apparatuses, systems, and/or devices described herein, for example utilizing one or more of the components thereof. The blocks indicating operations of each process may be arranged in any of a number of ways, as depicted and described herein. In some such embodiments, one or more blocks of any of the processes described herein occur in-between one or more blocks of another process, before one or more blocks of another process, and/or otherwise operates as a sun-process of a second process. Additionally or alternative, any of the processes may include some or all of the steps described and/or depicted, including one or more optional operational blocks in some embodiments. With regard to the flowcharts illustrated herein, one or more of the depicted blocks may be optional in some, or all, embodiments of the disclosure. Optional blocks are depicted with broken (or "dashed") lines. Similarly, it should be appreciated that one or more of the operations of each flowchart may be combinable, replaceable, and/or otherwise altered as described herein.

FIG. 8 illustrates a flowchart including example operations of an example process for improved interoperable data management, such as improved data-driven connection application data management, in accordance with at least one example embodiment of the present disclosure. Specifically, FIG. 8 depicts an example process 800 for improved data-driven connection application data management. In some embodiments, the process 800 is embodied by computer program code stored on a non-transitory computer-readable medium of a computer program product configured for execution to perform the computer-implemented process described. Alternatively or additionally, in some embodiments, the process 800 is performed by one or more specially configured computing devices, such as the embedded application communication apparatus 200 and/or user apparatus 250 in communication with one or more external devices.

In this regard, in some such embodiments, the embedded application communication apparatus 200 and/or the user apparatus 250 is specially configured by computer program instructions stored thereon, for example in the memory 204 and/or another component depicted and/or described herein, and/or otherwise accessible to the embedded application communication apparatus 200 and/or user apparatus 250, for performing the operations depicted and described. In some embodiments, the specially configured embedded application communication apparatus 200 and/or specially configured user apparatus 250 is in communication with one or more external apparatus(es), system(s), device(s), and/or the like, to perform one or more of the operations as depicted and described. For purposes of simplifying the description, the process 800 is described with respect to performance by the embedded application communication apparatus 200.

The process 800 begins at optional operation 802. At optional operation 802, the embedded application communication apparatus 200 includes means, such as the user-accessed application circuitry 210, embedded application circuitry 212, communications circuitry 208, input/output circuitry 206, processor 202, and/or the like, and/or a combination thereof, to initialize a user-accessed application on a user device. In some embodiments, the user-accessed application is initialized via execution of a user-facing application on the user device and/or configuring of the user-facing application to access user-accessed application functionality. For example, in some embodiments, initializing the user-accessed application on the user device includes establishing an authenticated session associated with the user-accessed application for the user device. For example, in some embodiments, the user of the user device provides user-accessed app user authentication credentials utilized for user authentication and to initialize the authenticated session associated with a corresponding previously provisioned user-accessed user account.

At operation 804, the embedded application communication apparatus 200 includes means, such as the user-accessed application circuitry 210, embedded application circuitry 212, communications circuitry 208, input/output circuitry 206, processor 202, and/or the like, and/or a combination thereof, to initiate, via the user-accessed application, a data-driven connection with an embedded application. In some embodiments, for example, the user-accessed application identifies embedded app user authentication data associated with a corresponding embedded app user account to be utilized to establish the data-driven connection. In some such embodiments, the data-driven connection enables communication directly between the user-accessed application and the embedded application, for example such that a user may interact with the user-accessed application to access embedded application functionality.

In some embodiments, for example, the data-driven connection is facilitated by one or more application programming interface(s) that enables the user to access particular embedded application functionality based on the authenticated identity of the user and/or provisioning of the corresponding embedded app user account. In other embodiments, the data-driven connection is facilitated by embedding of the embedded application and/or an associated computer-executable tool (e.g., a plugin, SDK, and/or the like) within the user-accessed application. In yet other embodiments, the data-driven connection is embodied by particular configuration of the user-accessed application to enable the user-accessed application to access a second physical and/or virtual memory space associated with the embedded application.

For example, in some embodiments, the user-accessed application and/or user device is associated with a temporary embedded app user account that is permissioned only to access limited embedded application functionality. The data-driven connection with the embedded application, in some embodiments, is automatically initiated by the user-accessed application upon initiation utilizing one or more identifiers associated with the user-accessed application and/or user device. In other embodiments, the user-accessed application maintains previously-submitted embedded app user authentication credentials and/or corresponding information utilized for authentication (e.g., a corresponding token) that is utilized to establish the data-driven connection with the connection application. The established data-driven connection may be utilized to facilitate transmissions between the user-accessed application and embedded application, facilitate a data request and response schema associated with communication between the user-accessed application and the embedded application, and/or the like.

At operation 806, the embedded application communication apparatus 200 includes means, such as the user-accessed application circuitry 210, embedded application circuitry 212, communications circuitry 208, input/output circuitry 206, processor 202, and/or the like, and/or a combination thereof, to identify at least one embedded app data object that is maintained by an embedded application and is structured for processing via the user-accessed application. In some such embodiments, the user-accessed application alone or in conjunction with the embedded application utilize the data-driven connection to identify the embedded app data object(s) in a manner that enables processing of such embedded app data object(s) by the user-accessed application (e.g., by mapping to corresponding user-accessed app representations(s) rendered via interaction with the embedded application, processing the embedded app data object, and/or the like). In some embodiments, for example, the user-accessed application utilizes the data-driven connection to identify such at least one embedded app data object via the embedded application.

For example, in one or more example embodiments, the user-accessed application requests such at least one embedded app data object from the embedded application via the data-driven connection, and/or receives the embedded app data object in response to the requests. In some embodiments, for example, the embedded application identifies all embedded app data object(s) associated with and/or otherwise accessible to the authenticated embedded app user account for the user utilizing the user-accessed application. For example, in some embodiments, the embedded app user account is identified based on data received from the user-accessed application, a corresponding user-accessed app user account, provided embedded app user authentication credentials, and/or the like. In some embodiments, the embedded application queries one or more databases configured to store embedded app data object(s) to identify the embedded app data object(s) for the user.

At operation 808, the embedded application communication apparatus 200 includes means, such as the user-accessed application circuitry 210, embedded application circuitry 212, communications circuitry 208, input/output circuitry 206, processor 202, and/or the like, and/or a combination thereof, to cause rendering of an integrated interface via the user-accessed application. In some such embodiments, the integrated interface comprises a representation of at least a portion of the at least one embedded app data object, for example as identified via the embedded application at operation 806.

In some embodiments, the user-accessed application causes rendering to the user device of the integrated interface to include data sufficient to enable a user to identify one or more embedded app data object(s) they want to view, edit, and/or the like. For example, in some embodiments, an embedded app data object name provided by a user associated with each embedded app data object is rendered via the integrated interface together with one or more interface elements for selecting each embedded app data object for viewing and/or updating. Additionally or alternatively, in some embodiments, the integrated interface further includes one or more additional interface elements for performing any of a myriad of accessible embedded application functionality. In some embodiments, the user-accessed application causes rendering of the integrated interface to a particular user-facing application executing on the user device to enable viewing and/or interaction of the integrated interface by a user of the user device.

In some such embodiments, the user may interact with the integrated interface to access and/or perform any of a myriad of functionality. In one example context, for example, the user interacts with the integrated interface provided via the user-accessed application to, through interaction between the user-accessed application and the embedded application: update the content of one or more embedded app data object(s), create one or more embedded app data object(s), delete one or more embedded app data object(s), alter permissions associated with accessing one or more embedded app data object(s), share one or more embedded app data object(s) with other user(s), and/or the like. In some embodiments, one or more portions of embedded application functionality is not accessible to the user (e.g., where the corresponding embedded app user account is a limited and/or temporary embedded app user account). In some such embodiments, attempts to access such inaccessible functionality result in initiation of one or more processes for incentivizing the user to provision a new embedded app user account, such as via a provisioning interface as described herein.

In some embodiments, for example, a user associated with a temporary embedded app user account is restricted to only maintain a threshold number of embedded app data objects, such that embedded application functionality is inaccessible to create additional embedded app data object(s) above the threshold number. In this regard, at optional operation 810, the embedded application communication apparatus 200 includes means, such as the user-accessed application circuitry 210, embedded application circuitry 212, communications circuitry 208, input/output circuitry 206, processor 202, and/or the like, and/or a combination thereof, to determine the user-accessed application is associated with at least a threshold number of embedded app data objects.

It should be appreciated that the user-accessed application may be utilized to update the number of associated embedded app data object(s), such as by interacting with one or more rendered user interface elements to delete existing embedded app data object(s) and/or create new embedded app data object(s). The user-accessed application may maintain the embedded app data object(s) and/or corresponding mapped user-accessed app representation(s) as described herein, such that the number of embedded app data objects associated with the user-accessed application is determinable by the user-accessed application based on the amount of maintained and/or existing embedded app data object(s) and/or corresponding user-accessed app representation(s) at a particular time. In some such embodiments, the embedded application communication apparatus 200 compares the current number of embedded app data objects, or a corresponding current number of user-accessed app representations mapped to such embedded app data objects for a certain user, to the threshold number of embedded app data objects to determine the threshold number of embedded app data objects has been reached (or exceeded).

At operation 812, the embedded application communication apparatus 200 includes means, such as the user-accessed application circuitry 210, embedded application circuitry 212, communications circuitry 208, input/output circuitry 206, processor 202, and/or the like, and/or a combination thereof, to generate an alert for rendering via the integrated interface that indicates user account provisioning associated with the embedded application is required to access at least some functionality of the embedded application. For example, in some embodiments, the user-accessed application generates and/or causes rendering of an alert that indicates that, to create more embedded app data object(s), the user must fully provision a new embedded app user account and/or alter provisioning of their current embedded app user account (e.g., to change the type of the embedded app user account to a "advanced" tier that may access such functionality).

It should be appreciated that the alert may be generated and/or otherwise provided in any of a myriad of manners. For example, in some embodiments, the user-accessed application causes rendering of the alert within an integrated application provided by a user-facing application associated with the user-accessed application and executing on the user device. In other embodiments, the user-accessed application causes an email transmission to a user email associated with the embedded app user account for rendering via a user device, a push notification to the user device, a popup window to be rendered to the user device, and/or the like. In this regard, the user is informed without leaving the user-accessed application that such provisioning associated with the embedded application is required, and in some embodiments can similarly perform such provisioning without leaving the user-accessed application, and/or can perform such provisioning without initiating a separate application for directly accessing the embedded application, as described herein. Such embodiments thus conserve computing resources (e.g., processing, memory, networking, and/or other resources) that would otherwise be consumed by a second process that would otherwise be required for interacting with the embedded application directly.

FIG. 9 illustrates a flowchart including example additional operations of another example process for improved data-driven connection application data management in accordance with at least one example embodiment of the present disclosure. Specifically, FIG. 9 depicts an example process 900 for maintaining embedded app data objects and corresponding user-accessed app representations via a user-accessed application. In some embodiments, the process 900 is embodied by computer program code stored on a non-transitory computer-readable medium of a computer program product configured for execution to perform the computer-implemented process described. Alternatively or additionally, in some embodiments, the process 900 is performed by one or more specially configured computing devices, such as the embedded application communication apparatus 200 and/or user apparatus 250 in communication with one or more external devices.

In this regard, in some such embodiments, the embedded application communication apparatus 200 and/or the user apparatus 250 is specially configured by computer program instructions stored thereon, for example in the memory 204 and/or another component depicted and/or described herein, and/or otherwise accessible to the embedded application communication apparatus 200 and/or user apparatus 250, for performing the operations depicted and described. In some embodiments, the specially configured embedded application communication apparatus 200 and/or specially configured user apparatus 250 is in communication with one or more external apparatus(es), system(s), device(s), and/or the like, to perform one or more of the operations as depicted and described. For purposes of simplifying the description, the process 900 is described with respect to performance by the embedded application communication apparatus 200.

The process 900 begins at optional operation 902. In some embodiments, the process 900 begins after one or more operations of another process, such as the operation 808 of the process 800 as depicted and described. Additionally or alternatively, in some embodiments, upon completion of the process 900 flow proceeds to one or more operations of another process, such as the operation 810 of the process 800 as depicted and described. In other embodiments, the flow ends upon completion of the process 900.

At optional operation 902, the embedded application communication apparatus 200 includes means, such as the user-accessed application circuitry 210, embedded application circuitry 212, communications circuitry 208, input/output circuitry 206, processor 202, and/or the like, and/or a combination thereof, to maintain, via the user-accessed application, at least one user-accessed app representation mapped to an embedded app data object, of the at least one embedded app data object maintained by the embedded application, that corresponds to the user-accessed app representation. In some such embodiments, the at least one embedded app data object is maintained by the embedded application. In some such embodiments, the user-accessed application interacts with the embedded application via a data-driven connection to identify the embedded app data object(s) to be presented via the user-accessed application via corresponding maintained user-accessed app representations mapped to each of such embedded app data objects. For example, in some embodiments, the user-accessed application provides one or more integrated interfaces, utilizing the data-driven connection, that includes the user-accessed app representation mapped to each identified embedded app data object.

At operation 904, the embedded application communication apparatus 200 includes means, such as the user-accessed application circuitry 210, embedded application circuitry 212, communications circuitry 208, input/output circuitry 206, processor 202, and/or the like, and/or a combination thereof, to receive data indicating update, via the user-accessed application, at least one embedded app data object. In some embodiments, the data comprises user input data associated with updating the at least one embedded app data object(s). In some embodiments, the user interacts with one or more interfaces rendered via the user-accessed application, for example as described with respect to operation 808. In some embodiments, the embedded application communication apparatus 200 initiates the updating in response to interaction with the user-accessed application, for example interaction with one or more user-accessed app representations rendered via the user-accessed application. For example, in the context where the embedded app data object embodies electronic documentation, the user may update text context, audio/visual content, and/or image content of the embedded app data object utilizing embedded app functionality provided within the user-accessed application. In other embodiments, the embedded app data object is updated to change access permissions for one or more user accounts (e.g., to "share" the corresponding embedded app data object with one or more new user account(s) and/or removing access permissions from one or more user account(s) with which the embedded app data object was already shared). In some embodiments, for example, the rendered interface includes interface element(s) for performing such functionality.

At operation 906, the embedded application communication apparatus 200 includes means, such as the user-accessed application circuitry 210, embedded application circuitry 212, communications circuitry 208, input/output circuitry 206, processor 202, and/or the like, and/or a combination thereof, to cause, via interaction with the embedded application, each of the at least one embedded app data object. In some embodiments, the user-accessed application causes updating of at least one embedded app data object via the data-driven connection with the embedded application. In this regard, by updating the embedded app data object(s) enables persistence and/or consistency of the updates via the embedded application. For example, in some embodiments, the user-accessed application interacts with the embedded application via the data-driven connection to initiate such updates the mapped data object(s). In this regard, in some such embodiments, the user-accessed application transmits one or more specially configured transmission(s) via the data-driven connection to cause the embedded application to permanently reflect the updates in the embedded app data object(s) maintained by the embedded application. In some embodiments, the updates are caused at any of a myriad of times and/or in response to one or more triggers. For example, in some embodiments, the embedded application communication apparatus 200 causes the update in real-time upon receiving data indicating the update. In other embodiments, the embedded application communication apparatus 200 causes the update upon saving and/or submission of the update data.

In some embodiments, the embedded application similarly maintains one or more sub-levels of embedded app data object, as described herein. In some such embodiments, the embedded application communication apparatus 200 maintains user-accessed app representations mapped with corresponding sub-levels of embedded app data objects. In this regard, interaction with the user-accessed app representation(s) indicate updates to the corresponding mapped embedded app data object(s). Additionally or alternatively, in some embodiments, the user-accessed app representations are represented in a manner that maintains the data hierarchy associated with the sub-level relationship between the embedded data object(s).

It should be appreciated that, in some embodiments, each sub-level embedded app data object is maintained in a manner described herein with respect to the embedded app data object at a higher level, for example as described herein with respect to operation 902. In this regard, a user may similarly update such embedded app data object(s) via use of the user-accessed application. For example, the embedded application communication apparatus 200 may receive data indicating update, via the user-accessed application, of at least one sub-level embedded app data object and cause, via interaction with the embedded application, updating of the at least one sub-level embedded app data object. In some such embodiments, updates facilitated through the user-accessed application may be performed while maintaining the appropriate data hierarchy organization associated with the embedded application.

FIG. 10 illustrates a flowchart including example additional operations of another example process for improved data-driven connection application data management in accordance with at least one example embodiment of the present disclosure. Specifically, FIG. 10 depicts an example process 1000 for utilizing a resource link to initiate a process directly associated with an embedded application from within a user-facing application associated with a user-accessed application. In some embodiments, the process 1000 is embodied by computer program code stored on a non-transitory computer-readable medium of a computer program product configured for execution to perform the computer-implemented process described. Alternatively or additionally, in some embodiments, the process 1000 is performed by one or more specially configured computing devices, such as the embedded application communication apparatus 200 and/or user apparatus 250 in communication with one or more external devices. In this regard, in some such embodiments, the embedded application communication apparatus 200 and/or the user apparatus 250 is specially configured by computer program instructions stored thereon, for example in the memory 204 and/or another component depicted and/or described herein, and/or otherwise accessible to the embedded application communication apparatus 200 and/or user apparatus 250, for performing the operations depicted and described.

In some embodiments, the specially configured embedded application communication apparatus 200 and/or specially configured user apparatus 250 is in communication with one or more external apparatus(es), system(s), device(s), and/or the like, to perform one or more of the operations as depicted and described. For purposes of simplifying the description, the process 1000 is described with respect to performance by the embedded application communication apparatus 200.

The process 1000 begins at optional operation 1002. In some embodiments, the process 1000 begins after one or more operations of another process, such as the operation 808 of the process 800 as depicted and described. Additionally or alternatively, in some embodiments, upon completion of the process 800 flow proceeds to one or more operations of another process, such as the operation 810 of the process 800 as depicted and described. In other embodiments, the flow ends upon completion of the process 1000.

At optional operation 1002, the embedded application communication apparatus 200 includes means, such as the user-accessed application circuitry 210, embedded application circuitry 212, communications circuitry 208, input/output circuitry 206, processor 202, and/or the like, and/or a combination thereof, to cause rendering of the integrated interface comprising a resource link associated with the embedded application. In this regard, in at least some embodiments, the resource link is configured to provide particular functionality in response to user interaction. For example, in some embodiments, the embedded application communication apparatus 200 causes rendering of the integrated interface via the user-accessed application, and the resource link comprise one or more interface element(s) including a text interface element, an image interface element, another audio/visual interface element, and/or the like, and/or any combination thereof. In at least some embodiments, the resource link is configured such that user engagement with the resource link initiates a process for initiating a particular user interface to be rendered associated with the embedded application based on a particular embedded app data object. In some embodiments, the user interface associated with the embedded application is initiated by initiating a second application or process (e.g., a second user-facing application) on a user device, where the second application is associated with directly accessing the embedded application.

At operation 1004, the embedded application communication apparatus 200 includes means, such as the user-accessed application circuitry 210, embedded application circuitry 212, communications circuitry 208, input/output circuitry 206, processor 202, and/or the like, and/or a combination thereof, to receive user input associated with the resource link. In some embodiments, for example, the user input is received in response to a user interaction with the user device. For example, in one example context, the user clicks on the resource link via the interface rendered to the user device to access the resource link. In some such embodiments, in response to the user interaction with the user device, the user device configures and/or transmits one or more transmissions an external application server, for example associated with the user-accessed application and/or embedded application.

At operation 1006, the embedded application communication apparatus 200 includes means, such as the user-accessed application circuitry 210, embedded application circuitry 212, communications circuitry 208, input/output circuitry 206, processor 202, and/or the like, and/or a combination thereof, to initiate a second process associated with the embedded application to cause rendering of a particular embedded application user interface based on an embedded app data object. In some embodiments, for example, the embedded application communication apparatus 200 initiates a second user-facing application on the user device, such as a user-facing application directly associated with the embedded application. In this regard, the second user-facing application may have been previously downloaded and/or installed to the user device. Alternatively or additionally, in some embodiments, the second user-facing application is downloaded and/or installed to the user device in response to the user input with the resource link.

By causing rendering of a particular embedded application user interface based on the embedded app data object, the second process is initiated to a particular interface such that subsequent user interaction is reduced. For example, in one example circumstance, the resource link is provided such that the second process associated with directly accessing the embedded application can be quickly accessed by the user. In this regard, for example, the second process may provide functionality not made available via the user-accessed application having a data-driven connection associated with the embedded application. In some such embodiments, the second process is initiated to a particular embedded application user interface that enables functionality associated with the embedded app data object being displayed and/or accessed via the user-accessed application at the time the resource link was engaged. By initiating the second process (e.g., a second user-facing application specifically associated with directly accessing the embedded application) to a particular embedded application user interface based on the embedded app data object being accessed and/or updated via the user-accessed application, such embodiments enhance the user experience by eliminating user interactions conventionally required to initiate the process to the particular embedded application.

FIG. 11 illustrates a flowchart including example additional operations of another example process for improved data-driven connection application data management in accordance with at least one example embodiment of the present disclosure. Specifically, FIG. 11 depicts an example process 1100 for providing a provisioning interface associated with a user-accessed application. In some embodiments, the process 1100 is embodied by computer program code stored on a non-transitory computer-readable medium of a computer program product configured for execution to perform the computer-implemented process described.

Alternatively or additionally, in some embodiments, the process 1100 is performed by one or more specially configured computing devices, such as the embedded application communication apparatus 200 and/or user apparatus 250 in communication with one or more external devices. In this regard, in some such embodiments, the embedded application communication apparatus 200 and/or the user apparatus 250 is specially configured by computer program instructions stored thereon, for example in the memory 204 and/or another component depicted and/or described herein, and/or otherwise accessible to the embedded application communication apparatus 200 and/or user apparatus 250, for performing the operations depicted and described. In some embodiments, the specially configured embedded application communication apparatus 200 and/or specially configured user apparatus 250 is in communication with one or more external apparatus(es), system(s), device(s), and/or the like, to perform one or more of the operations as depicted and described. For purposes of simplifying the description, the process 1100 is described with respect to performance by the embedded application communication apparatus 200.

The process 1100 begins at operation 1102. In some embodiments, the process 1100 begins after one or more operations of another process, such as the operation 808 of the process 800 as depicted and described. Additionally or alternatively, in some embodiments, upon completion of the process 1100 flow proceeds to one or more operations of another process, such as the operation 810 of the process 800 as depicted and described. In other embodiments, the flow ends upon completion of the process 1100.

At operation 1102, the embedded application communication apparatus 200 includes means, such as the user-accessed application circuitry 210, embedded application circuitry 212, communications circuitry 208, input/output circuitry 206, processor 202, and/or the like, and/or a combination thereof, to cause rendering of at least one advanced functionality interface element indicating additional embedded application functionality is accessible in a circumstance that an embedded app user account is provisioned associated with the embedded application. In some embodiments, for example, the additional functionality embodies "advanced" functionality requiring a fully provisioned embedded app user account and/or embedded app user account of a certain type (e.g., a paid account having a higher tier of functionality access).

It should be appreciated that, in various contexts, any of various functionality may be provided as additional embedded application functionality only accessible to particular types of embedded app user account(s), such as embedded app user accounts of a particular type (e.g., fully provisioned embedded app user accounts rather than temporary embedded app user accounts and/or limited embedded app user accounts). For example, in some embodiments within the context of electronic documentation management, functionality associated with generating above a threshold number of embedded app data object(s), sharing embedded app data object(s) with other embedded app user account(s), and/or the like, embodies advanced embedded application functionality accessible through the user-accessed application only for certain embedded app user account(s).

At operation 1104, the embedded application communication apparatus 200 includes means, such as the user-accessed application circuitry 210, embedded application circuitry 212, communications circuitry 208, input/output circuitry 206, processor 202, and/or the like, and/or a combination thereof, to receive user input associated with the at least one additional interface element. In some embodiments, for example, the user input is received in response to user interaction with the user device. For example, in one example context, the user clicks and/or taps the additional interface element to indicate the user is interested in accessing the additional, advanced embedded application functionality. In some such embodiments, in response to the user interaction with the user device, the user device configures and/or transmits one or more transmissions to an external application server, for example associated with the user-accessed application and/or embedded application, that indicates the user interacted with additional interface element and/or otherwise is attempting to access the additional, advanced embedded application functionality.

At operation 1106, the embedded application communication apparatus 200 includes means, such as the user-accessed application circuitry 210, embedded application circuitry 212, communications circuitry 208, input/output circuitry 206, processor 202, and/or the like, and/or a combination thereof, to cause rendering of a provisioning interface to enable the user to provision a new embedded app user account. In some such embodiments, the provisioning interface comprises interface elements that enable the user to input user authentication credentials and/or other user information utilized for provisioning a new embedded app user account. In some example contexts, for example, the provisioning interface additionally or alternatively includes one or more user interface elements for selecting an embedded app user account type to provision, for example choosing between a paid, fully provisioned user account and a free, limited user account. Additionally or alternatively still, the provisioning interface includes a user interface element for submitting the information inputted by the user to the user-accessed application for processing. In some embodiments, the user-accessed application causes rendering of the provisioning interface to a particular user-facing application executing on the user device to enable viewing and/or interaction of the user interface by a user of the user device.

FIG. 12 illustrates a flowchart including example additional operations of another example process for improved data-driven connection application data management in accordance with at least one example embodiment of the present disclosure. Specifically, FIG. 12 depicts an example process 1200 for authenticating an embedded app user account for providing corresponding accessible embedded app functionality. In some embodiments, the process 1200 is embodied by computer program code stored on a non-transitory computer-readable medium of a computer program product configured for execution to perform the computer-implemented process described. Alternatively or additionally, in some embodiments, the process 1200 is performed by one or more specially configured computing devices, such as the embedded application communication apparatus 200 and/or user apparatus 250 in communication with one or more external devices. In this regard, in some such embodiments, the embedded application communication apparatus 200 and/or the user apparatus 250 is specially configured by computer program instructions stored thereon, for example in the memory 204 and/or another component depicted and/or described herein, and/or otherwise accessible to the embedded application communication apparatus 200 and/or user apparatus 250, for performing the operations depicted and described.

In some embodiments, the specially configured embedded application communication apparatus 200 and/or specially configured user apparatus 250 is in communication with one or more external apparatus(es), system(s), device(s), and/or the like, to perform one or more of the operations as depicted and described. For purposes of simplifying the description, the process 1200 is described with respect to performance by the embedded application communication apparatus 200.

The process 1200 begins at operation 1202. In some embodiments, the process 1200 begins after one or more operations of another process, such as the operation 808 of the process 800 as depicted and described. Additionally or alternatively, in some embodiments, upon completion of the process 1200 flow proceeds to one or more operations of another process, such as the operation 810 of the process 800 as depicted and described. In other embodiments, the flow ends upon completion of the process 1200.

At optional operation 1202, the embedded application communication apparatus 200 includes means, such as the user-accessed application circuitry 210, embedded application circuitry 212, communications circuitry 208, input/output circuitry 206, processor 202, and/or the like, and/or a combination thereof, to identify embedded app authentication credentials associated with an embedded app user account for the embedded application. In some such embodiments, for example, the user-accessed application stores the embedded app authentication credentials for the associated embedded app user account.

Additionally or alternatively, in some embodiments, the embedded app authentication credentials are identified based on one or more device identifiers associated with a user device and/or one or more unique identifiers associated with the user-accessed application. In yet other embodiments, the user-accessed application identifies the embedded app authentication credentials in response to user input of the embedded app authentication credentials via one or more user interfaces rendered via the user-accessed application for purposes of performing user authentication. In yet other embodiments still, the user-accessed application identifies the embedded app authentication credentials based on a corresponding particular user-accessed user account utilized for establishing an authenticated session with the user-accessed application and/or otherwise accessing user-accessed application functionality. For example, the user-accessed application in some embodiments provides information identifying the user-accessed application (e.g., a data identifier, corresponding user-accessed app authentication credentials, and/or the like) to the embedded application via the data-driven connection and identifies the embedded app authentication credentials from response information received from the embedded application.

It should be appreciated that, in some embodiments, the embedded app authentication credentials are the same as user-accessed app authentication credentials. For example, in some such circumstances a single user account is provisioned both as a user-accessed app user account and an embedded app user account.

At operation 1204, the embedded application communication apparatus 200 includes means, such as the user-accessed application circuitry 210, embedded application circuitry 212, communications circuitry 208, input/output circuitry 206, processor 202, and/or the like, and/or a combination thereof, to authenticate an embedded app user account associated with the embedded application. In some embodiments, the user-accessed application authenticates an embedded app user account via interaction with the embedded application, for example utilizing a data-driven connection. In some embodiments, the user-accessed application provides identified embedded app authentication credentials, such as those identified at operation 1202, to the embedded application via a data-driven connection, to authenticate an embedded app user account via the embedded application. For example, in some embodiments the embedded application communication apparatus 200 authenticates a single user account embodying the embedded app user account to authenticate that the single user account is provisioned for accessing the embedded application embodying an embedded app user account.

In other embodiments, the user-accessed application provides token information and/or other data associated with an embedded app user account to the embedded application for authenticating the corresponding embedded app user account. For example, in some embodiments where the user has already authenticated a single user account embodying a user-accessed app user account to access the user-accessed account, the embedded application communication apparatus 200 may maintain a token utilized for further authentication during an authenticated session associated with the single user account, and in a circumstance where the single user account similarly embodies the embedded app data object, the embedded application communication apparatus 200 may utilize the same token for authenticating the embedded app user account. It should be appreciated that, in this regard, the user-accessed application provides any of a myriad of data to the embedded application, for example via the data-driven connection, to authenticate the embedded app user account. In some such embodiments, the embedded application provides response data indicating the embedded app user account was successfully authenticated, and/or otherwise provides response data including various information to be utilized for initiating and/or maintaining an authenticated session associated with the embedded app user account. Additionally or alternatively, in some embodiments, upon authenticating the embedded app user account, the embedded application provides information indicating a set of functionality and/or level of functionality accessible by the authenticated embedded app user account.

At operation 1206, the embedded application communication apparatus 200 includes means, such as the user-accessed application circuitry 210, embedded application circuitry 212, communications circuitry 208, input/output circuitry 206, processor 202, and/or the like, and/or a combination thereof, to provide access, via the user-accessed application, to embedded application functionality. In some embodiments, the user-accessed application provides access to additional embedded application functionality that is otherwise inaccessible without authenticating a provisioned embedded app user account. For example, in some contexts, the user-accessed application provides access to a first set of functionality to all users regardless of whether any embedded app user account has been authenticated, and/or provides access to a second set of functionality (e.g., additional embedded application functionality) upon authenticating an embedded app user account and/or an embedded app user account of a particular type, such as a fully provisioned embedded app user account. In some embodiments, the user-accessed application reconfigures one or more interface elements of a user interface to enable user interaction with the interface element(s) to initiate the intended functionality as opposed to alternative functionality, for example functionality associated with provisioning an embedded app user account.

FIG. 13 illustrates a flowchart including example additional operations of another example process for improved data-driven connection application data management in accordance with at least one example embodiment of the present disclosure. Specifically, FIG. 13 depicts an example process 1300 for provisioning and utilizing an automatically provisioned a new embedded app user account for accessing embedded app functionality via a user-accessed application. In some embodiments, the process 1300 is embodied by computer program code stored on a non-transitory computer-readable medium of a computer program product configured for execution to perform the computer-implemented process described. Alternatively or additionally, in some embodiments, the process 1300 is performed by one or more specially configured computing devices, such as the embedded application communication apparatus 200 and/or user apparatus 250 in communication with one or more external devices. In this regard, in some such embodiments, the embedded application communication apparatus 200 and/or the user apparatus 250 is specially configured by computer program instructions stored thereon, for example in the memory 204 and/or another component depicted and/or described herein, and/or otherwise accessible to the embedded application communication apparatus 200 and/or user apparatus 250, for performing the operations depicted and described.

In some embodiments, the specially configured embedded application communication apparatus 200 and/or specially configured user apparatus 250 is in communication with one or more external apparatus(es), system(s), device(s), and/or the like, to perform one or more of the operations as depicted and described. For purposes of simplifying the description, the process 1300 is described with respect to performance by the embedded application communication apparatus 200.

The process 1300 begins at operation 1302. In some embodiments, the process 1300 begins after one or more operations of another process, such as the operation 802 of the process 800 as depicted and described. Additionally or alternatively, in some embodiments, upon completion of the process 1300 flow proceeds to one or more operations of another process, such as the operation 804 of the process 800 as depicted and described. In other embodiments, the flow ends upon completion of the process 1300.

At operation 1302, the embedded application communication apparatus 200 includes means, such as the user-accessed application circuitry 210, embedded application circuitry 212, communications circuitry 208, input/output circuitry 206, processor 202, and/or the like, and/or a combination thereof, to automatically provision, utilizing the user-accessed application via interaction with the embedded application, a new embedded app user account associated with the embedded application. In some embodiments, for example, the user-accessed application identifies a data identifier that uniquely represents and/or is otherwise associated with the user-accessed application, and provides the data identifier to the embedded application for use in generating a new, temporary embedded app user account to be associated with the user-accessed application. In this regard, the data identifier and/or other data provided for provisioning the new embedded app user account (e.g., a secret code randomly generated and/or identified by the user-accessed application) serves as user authentication credentials for initiating an authenticated session with the embedded application and/or initiating a data-driven connection for communication between the user-accessed application and the embedded application. It should be appreciated that, in some embodiments as described herein, the provisioning a new embedded app user account comprises creating the new embedded app user account via and/or associated with the embedded application. In other embodiments, automatically provisioning a new embedded app user account comprises provisioning an existing user account (e.g., a user-accessed app user account) as an embedded app user account.

Alternatively or additionally, in some embodiments, the user-accessed application executing on a user device automatically identifies a device identifier associated with the user device, and provides the device identifier to the embedded application for use in generating a new, temporary embedded app user account to be associated with the user device. In this regard, the device identifier and/or other data provided for provisioning the new embedded app user account serves as user authentication credentials for initiating an authenticated session with the embedded application and/or initiating a data-driven connection for communication between the user-accessed application and the embedded application. In some such embodiments, the user-accessed application is configured to automatically identify the information utilized to automatically provision the user-accessed application upon subsequent initiation of the user-accessed application, and provides such information for authentication by the embedded application to initiate the data-driven connection and/or an associated authenticated session.

In some embodiments, the embedded application communication apparatus 200 automatically provisions an existing user account as the new embedded app user account associated with the embedded application. For example, in some embodiments, a user authenticates a single user account already provisioned as a user-accessed app user account to access the user-accessed application. In some such embodiments, the single user account is subsequently provisioned, by the embedded application and/or user-accessed application, as the new embedded app user account to enable the single user account to access both applications. In this regard, the user may utilize the same single user account to access functionality of both the user-accessed application and the embedded application. In some such embodiments, the single user account is further provisioned to embody the new embedded app user account by altering one or more data values of the user account, storing authorization data associated with accessing the embedded application, and/or the like, as described herein.

For example, in some embodiments, a user-accessed application identifies and/or otherwise provides, to the embedded application via the data-driven connection, information (e.g., an IP address or other identifier associated with the user device and/or user-accessed application, an application identifier associated with a user-facing application on the user device and/or a user-accessed application, a user-accessed app user account identifier and/or corresponding authentication credentials, an embedded app user account identifier and/or authentication credentials, and/or the like) that uniquely identifies or is utilized to identify an existing user account for use. Such information may be stored in a circumstance where the user has previously created a user account that is usable by the embedded application (e.g., by the embedded application itself or another application in a shared suite of software tools, for example).

Alternatively or additionally, in some embodiments, the embedded application communication apparatus 200 automatically provisions the new embedded app user account via an associated embedded application in response to a determination by the embedded application that the user-accessed application associated with the embedded application communication apparatus 200 is included in a registry of authorized user-accessed applications maintained by or otherwise associated with the embedded application. For example, the user-accessed application may transmit a request, via a data-driven connection, to the embedded application that identifies the user (and/or user device) requesting access to the embedded application functionality and the user-accessed application from within which the user is attempting to access the embedded application functionality. Based on the request, the embedded application may determine the user-accessed application is included in a registry of authorized user-accessed applications and the user is not associated with an existing embedded app user account, and subsequently automatically provision the new embedded app user account in response.

At operation 1304, the embedded application communication apparatus 200 includes means, such as the user-accessed application circuitry 210, embedded application circuitry 212, communications circuitry 208, input/output circuitry 206, processor 202, and/or the like, and/or a combination thereof, to associate, via interaction with the embedded application, one or more embedded app data object(s) with the new embedded app user account in response to user interaction with the user-accessed application. In this regard, in some such embodiments, the user interacts with the user-accessed application to initiate functionality for associating one or more embedded app data object(s) with the new embedded app user account. In some embodiments, the user interacts with the user-accessed application to create a new embedded app data object, for example, that is associated with and/or otherwise accessible to the new embedded app user account. It should be appreciated, that the user-accessed application may provide functionality for associating one or more embedded app data object(s) with the new embedded app user account in any of the manners described herein, including sharing by one or more user account(s), creating new embedded app data object(s), and/or the like, via interaction with the embedded application by the user-accessed application utilizing a data-driven connection.

FIG. 14 illustrates a flowchart including example additional operations of another example process for improved data-driven connection application data management in accordance with at least one example embodiment of the present disclosure. Specifically, FIG. 14 depicts an example process 1400 for providing recommended embedded application functionality for use via a user-accessed application. In some embodiments, the process 1400 is embodied by a computer program code stored on a non-transitory computer-readable medium of a computer program product configured for execution to perform the computer-implemented process described.

Alternatively or additionally, in some embodiments, the process 1400 is performed by one or more specially configured computing devices, such as the embedded application communication apparatus 200 and/or user apparatus 250 in communication with one or more external devices. In this regard, in some such embodiments, the embedded application communication apparatus 200 and/or the user apparatus 250 is specially configured by computer program instructions stored thereon, for example in the memory 204 and/or another component depicted and/or described herein, and/or otherwise accessible to the embedded application communication apparatus 200 and/or user apparatus 250, for performing the operations depicted and described. In some embodiments, the specially configured embedded application communication apparatus 200 and/or specially configured user apparatus 250 is in communication with one or more external apparatus(es), system(s), device(s), and/or the like, to perform one or more of the operations as depicted and described. For purposes of simplifying the description, the process 1400 is described with respect to performance by the embedded application communication apparatus 200.

The process 1400 begins at operation 1402. In some embodiments, the process 1400 begins after one or more operations of another process, such as the operation 802 of the process 800 as depicted and described. Additionally or alternatively, in some embodiments, upon completion of the process 1400 flow proceeds to one or more operations of another process, such as the operation 804 of the process 800 as depicted and described. In other embodiments, the flow ends upon completion of the process 1400.

At optional operation 1402, the embedded application communication apparatus 200 includes means, such as the user-accessed application circuitry 210, embedded application circuitry 212, communications circuitry 208, input/output circuitry 206, processor 202, and/or the like, and/or a combination thereof, to receive user interaction associated with accessing user-accessed application functionality of the user-accessed application. In some such embodiments, the user interaction includes various actions performed by the user that utilizes various functionality of the user-accessed application.

In some embodiments, for example, the user interacts with a user device to access the user-accessed application functionality performed by the user-accessed application. In some embodiments, the user-accessed application stores data associated with the user interaction(s) accessing user-accessed application functionality. In this regard, the user-accessed application may store the information associated with the user interaction(s) for further processing, for example performing one or more determinations as described herein with respect to operation 1404. In some embodiments, for example, the user-accessed application logs information embodying each user interaction with user-accessed application functionality. The user-accessed application in some embodiments stores the information associated with each user interaction associated with a particular user-accessed app account data that was utilized to perform the user interaction.

At operation 1404, the embedded application communication apparatus 200 includes means, such as the user-accessed application circuitry 210, embedded application circuitry 212, communications circuitry 208, input/output circuitry 206, processor 202, and/or the like, and/or a combination thereof, to determine, based on user interaction(s) with the user-accessed application, embedded application functionality associated with the embedded application is likely to be utilized. For example, in some embodiments, the user-accessed application processes the user-accessed application functionality that was accessed by the user-accessed app user account to determine related embedded application functionality.

In some embodiments, the user-accessed application maintains data representing associations between user-accessed application functionality and corresponding embedded application functionality, where associations between user-accessed application functionality and embedded application functionality indicates if the user-accessed application functionality is used then the associated embedded application functionality is likely to be utilized. In other embodiments, the user-accessed application is configured to maintain one or more business rule sets for associating user-accessed application functionality that, when used, indicates corresponding embedded application functionality is likely to be used. In other embodiments, the user-accessed application determines associations between user-accessed application functionality and corresponding embedded application functionality that is likely to be utilized based on historical user interactions performed associated with the user-accessed app user account and/or all user-accessed app user accounts. For example, in some embodiments, the user-accessed application utilizes a model trained to identify embedded application functionality likely to be utilized together with corresponding use of particular user-accessed application functionality based on previously performed user interactions for accessing user-accessed application functionality and embedded application functionality performed associated with any number of user-accessed app accounts for the user-accessed application.

At operation 1406, the embedded application communication apparatus 200 includes means, such as the user-accessed application circuitry 210, embedded application circuitry 212, communications circuitry 208, input/output circuitry 206, processor 202, and/or the like, and/or a combination thereof, to cause rendering of a second user interface comprising at least one interface element recommending user of the embedded application functionality. For example, in some embodiments, the user-accessed application causes rendering of the second interface to a user device associated with the user-accessed user account for which the determination of likely to be utilized embedded application functionality was performed, for example at operation 1404. In this regard, the user-accessed application in some embodiments causes rendering of the second user interface including text, image, audio/visual, and/or other interface elements that recommends use of the embedded application functionality determined likely to be used. In one particular example, for example, the second user interface comprises a sub-interface, alert, and/or the like, that includes text recommending use of the embedded application functionality to the user (e.g., an interface element including the text of "Want to share this with your organization? Click here!").

In this regard, by causing rendering of the second user interface, embodiments provide improvements in the user interface provision by incentivizing use of particular embedded application functionality via the user-accessed application. In some such embodiments, the interfaces are configured to incentivize use of additional and/or otherwise advanced functionality associated with the embedded application. In this regard, in some such contexts, the recommendations provide onboarding mechanisms for having the user provision an embedded app user account and/or fully provision an embedded app user account to access the embedded application functionality.

CONCLUSION

Although an example processing system has been described above, implementations of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more modules of computer program instructions, encoded on computer storage medium for execution by, or to control the operation of, information/data processing apparatus. Alternatively, or in addition, the program instructions can be encoded on an artificially-generated propagated signal, e.g., a machine-generated electrical, optical, or electromagnetic signal, which is generated to encode information/data for transmission to suitable receiver apparatus for execution by an information/data processing apparatus.

A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a repository management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or information/data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory or a random access memory or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, e.g., magnetic, magneto-optical disks, or optical disks. However, a computer need not have such devices. Devices suitable for storing computer program instructions and information/data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, e.g., a CRT (cathode ray tube) or LCD (liquid crystal display) monitor, for displaying information/data to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described herein can be implemented in a computing system that includes a back-end component, e.g., as an information/data server, or that includes a middleware component, e.g., an application server, or that includes a front-end component, e.g., a client computer having a graphical user interface or a web browser through which a user can interact with an implementation of the subject matter described herein, or any combination of one or more such back-end, middleware, or front-end components. The components of the system can be interconnected by any form or medium of digital information/data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits information/data (e.g., an HTML page) to a client device (e.g., for purposes of displaying information/data to and receiving user input from a user interacting with the client device). Information/data generated at the client device (e.g., a result of the user interaction) can be received from the client device at the server.

While this specification contains many specific implementation details, these should not be construed as limitations on the scope of any disclosures or of what may be claimed, but rather as descriptions of features specific to particular embodiments of particular disclosures. Certain features that are described herein in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. An apparatus comprising at least one processor and at least one non-transitory memory including computer-coded instructions thereon, the computer coded instructions, with the at least one processor, configure the apparatus to:
   initiate, via a user-accessed application, a data-driven connection with an embedded application, wherein a first executable code base defining the user-accessed application is at least partially distinct from a second executable code base defining the embedded application;
   identify, via the data-driven connection, an embedded app data object that is (1) maintained by the embedded application and (2) structured for processing via the user-accessed application, and
   wherein the embedded application corresponds to a user-accessed app representation maintained within the user-accessed application; and
   cause rendering of an integrated interface by the user-accessed application, the integrated interface comprising an embedded app engagement element associated with the embedded app data object,
   wherein, in response to user interaction with the embedded app engagement element, the apparatus enables managing of the embedded app data object by at least:
      receiving, via the user-accessed application, data indicating update of the embedded app data object; and
      causing, via interaction with the embedded application utilizing the data-driven connection, updating of the embedded app data object.

2. The apparatus according to claim 1, wherein the integrated interface comprises a resource link that enables initiating a second process associated with directly interacting with the embedded application, and wherein the apparatus is further configured to, in response to user interaction with the resource link:
   initiate the second process associated with the embedded application to cause, via the second process, rendering of an embedded application user interface based on the embedded app data object.

3. The apparatus according to claim 1, the apparatus further configured to:
   determine the user-accessed application is associated with at least a threshold number of embedded app data objects; and
   generate an alert for rendering to the integrated interface that indicates user account provisioning associated with the embedded application is required to access at least some functionality of the embedded application.

4. The apparatus according to claim 1, wherein the integrated interface comprises at least one advanced functionality interface element indicating additional embedded application functionality that is accessible in a circumstance that an embedded app user account is provisioned associated with the embedded application, the apparatus further configured to:
receive user input associated with the at least one advanced functionality interface element; and
cause rendering of a provisioning interface to enable the user to provision a new embedded app user account,
wherein provisioning the new embedded app user account enables a user to access the additional embedded application functionality provided by the embedded application.

5. The apparatus according to claim 1, the apparatus further configured to:
authenticate an embedded app user account associated with the embedded application; and
provide access, via the user-accessed application, to embedded application functionality.

6. The apparatus according to claim 1, the apparatus further configured to:
automatically provision, utilizing the user-accessed application via interaction with the embedded application, a new embedded app user account associated with the user-accessed application, wherein the new embedded app user account is provisioned to access a limited set of embedded application functionality.

7. The apparatus according to claim 1, wherein the embedded application maintains the embedded app data object in association with at least one sub-level embedded app data object each mapped to at least one sub-level user-accessed app representation maintained by the user-accessed application, wherein each sub-level embedded app data object is manageable directly via the user-accessed application.

8. The apparatus according to claim 1, wherein the second executable code base comprises a separate code base embedded within the user-accessed application.

9. The apparatus according to claim 1, wherein the second executable code base comprises a separate code base maintained by a server separate from the apparatus.

10. The apparatus according to claim 1, the apparatus further configured to:
determine embedded application functionality associated with the embedded application is likely to be utilized based on user interaction with the user-accessed application; and
cause rendering of a second user interface comprising at least one interface element recommending use of the embedded application.

11. The apparatus according to claim 1, wherein the data-driven connection interacts with the embedded application without execution of a separate process associated with the embedded application on the apparatus.

12. A computer-executed method comprising:
initiating, via a user-accessed application, a data-driven connection with an embedded application, wherein a first executable code base defining the user-accessed application is at least partially distinct from a second executable code base defining the embedded application;
identifying, via the data-driven connection, an embedded app data object that is (1) maintained by the embedded application and (2) structured for processing via the user-accessed application, and
wherein the embedded application corresponds to a user-accessed app representation maintained within the user-accessed application; and
causing rendering of an integrated interface by the user-accessed application, the integrated interface comprising an embedded app engagement element associated with the embedded app data object,
wherein, in response to user interaction with the embedded app engagement element, the computer-executed method comprises managing the embedded app data object by at least:
receiving, via the user-accessed application, data indicating update of the embedded app data object; and
causing, via interaction with the embedded application utilizing the data-driven connection, updating of the embedded app data object.

13. The computer-executed method according to claim 12, wherein the integrated interface comprises a resource link that enables initiating a second process associated with directly interacting with the embedded application, and the computer-executed method further comprising, in response to user interaction with the resource link:
initiating the second process associated with the embedded application to cause, via the second process, rendering of an embedded application user interface based on the embedded app data object.

14. The computer-executed method according to claim 12, the computer-executed method further comprising:
determining the user-accessed application is associated with at least a threshold number of embedded app data objects; and
generating an alert for rendering to the integrated interface that indicates user account provisioning associated with the embedded application is required to access at least some functionality of the embedded application.

15. The computer-executed method according to claim 12, wherein the integrated interface comprises at least one advanced functionality interface element indicating additional embedded application functionality that is accessible in a circumstance that an embedded app user account is provisioned associated with the embedded application, and the computer-executed method further comprising:
receiving user input associated with the at least one advanced functionality interface element; and
causing rendering of a provisioning interface to enable the user to provision a new embedded app user account,
wherein provisioning the new embedded app user account enables a user to access the additional embedded application functionality provided by the embedded application.

16. The computer-executed method according to claim 12, the computer-executed method further comprising:
authenticating an embedded app user account associated with the embedded application; and
providing access, via the user-accessed application, to embedded application functionality.

17. The computer-executed method according to claim 12, the computer-executed method further comprising:
automatically provisioning, utilizing the user-accessed application via interaction with the embedded application, a new embedded app user account associated with the user-accessed application, wherein the new embedded app user account is provisioned to access a limited set of embedded application functionality.

18. The computer-executed method according to claim 12, wherein the embedded application maintains the embedded app data object in association with at least one sub-level embedded app data object each mapped to at least one sub-level user-accessed app representation maintained by the user-accessed application, wherein each sub-level embedded app data object is manageable directly via the user-accessed application.

19. The computer-executed method according to claim 12, the computer-executed method further comprising:
   determining embedded application functionality associated with the embedded application is likely to be utilized based on user interaction with the user-accessed application; and
   causing rendering of a second user interface comprising at least one interface element recommending use of the embedded application.

20. A computer program product comprising at least one non-transitory computer-readable storage medium storing computer program code that, in execution with at least one processor, configures the at least one processor for:
   initiating, via a user-accessed application, a data-driven connection with an embedded application, wherein a first executable code base defining the user-accessed application is at least partially distinct from a second executable code base defining the embedded application;
   identifying, via the data-driven connection, an embedded app data object that is (1) maintained by the embedded application and (2) structured for processing via the user-accessed application, and
   wherein the embedded application corresponds to a user-accessed app representation maintained within the user-accessed application; and
   causing rendering of an integrated interface by the user-accessed application, the integrated interface comprising an embedded app engagement element associated with the embedded app data object,
   wherein, in response to user interaction with the embedded app engagement element, enable managing of the embedded app data object by at least:
      receiving, via the user-accessed application, data indicating update of the embedded app data object; and
      causing, via interaction with the embedded application utilizing the data-driven connection, updating of the embedded app data object.

\* \* \* \* \*